United States Patent [19]
Furuya et al.

[11] Patent Number: 5,805,297
[45] Date of Patent: Sep. 8, 1998

[54] MULTIFUNCTIONAL APPARATUS WITH SELECTABLE FUNCTIONS AND A COMMON PRINTER FOR FACSIMILE RECEPTION

[75] Inventors: Yoji Furuya, Inagi; Kenichiro Sugiura, Funabashi; Toshio Sugino; Hideyuki Kobayashi, both of Tokyo; Michihei Murayama, Tachikawa; Shigehiro Kadota, Kawasaki; Hiroo Teraichi, Fujisawa; Naoshi Inoue; Masanao Yasuda, both of Tokyo, all of Japan

[73] Assignee: Canon Kabushiki Kaisha, Tokyo, Japan

[21] Appl. No.: 440,474

[22] Filed: May 12, 1995

Related U.S. Application Data

[62] Division of Ser. No. 127,479, Sep. 28, 1993, abandoned, which is a continuation of Ser. No. 834,984, Feb. 14, 1992, abandoned, which is a continuation of Ser. No. 269,733, Nov. 10, 1988, abandoned.

[30] Foreign Application Priority Data

Nov. 11, 1987 [JP] Japan .................................. 62-283171

[51] Int. Cl.⁶ ....................................................... G06F 3/00
[52] U.S. Cl. ........................... 358/400; 395/114; 395/115; 345/349
[58] Field of Search .................................... 395/155–161, 395/775, 153, 200.09, 872, 873, 309, 112, 114–116, 200.47; 379/110, 100, 110.01, 100.08, 100.01; 345/147, 117–120, 902, 326–358

[56] References Cited

U.S. PATENT DOCUMENTS

| | | | |
|---|---|---|---|
| 4,414,621 | 11/1983 | Bown et al. | 395/155 X |
| 4,415,981 | 11/1983 | Cutter et al. | 358/400 X |
| 4,692,858 | 9/1987 | Redford et al. | 395/157 |
| 4,702,630 | 10/1987 | Igi et al. | 358/400 X |
| 4,727,589 | 2/1988 | Hirose et al. | 395/200.09 |
| 4,827,410 | 5/1989 | Corren | 395/155 |
| 4,855,936 | 8/1989 | Casey et al. | 395/775 |
| 4,862,389 | 8/1989 | Takagi | 395/157 |
| 4,885,704 | 12/1989 | Takagi et al. | 395/156 |
| 4,899,136 | 2/1990 | Beard et al. | 395/159 X |
| 4,910,607 | 3/1990 | Kita et al. | 358/400 |
| 4,916,607 | 4/1990 | Teraichi et al. | 379/100 X |
| 4,952,932 | 8/1990 | Sugino et al. | 345/173 X |
| 4,974,097 | 11/1990 | Kaneko et al. | 358/442 X |
| 4,992,779 | 2/1991 | Sugino et al. | 345/147 X |
| 5,060,135 | 10/1991 | Levine et al. | 395/159 X |
| 5,153,829 | 10/1992 | Furuya et al. | 379/110 X |

OTHER PUBLICATIONS

Birrell et al, "Grapevine An Exercise in Distributed Computing", Com. of AMC, Apr. 1982, pp. 260–274.

Microsoft Window User's Guide v.2.0, Microsoft Corp., 1987, p. 157.

Katzan, "Operating Systems", Van Nostrand Reinhold Co. Inc, 1973, pp. 46–65, 96–115, 260–265.

Rosenberg, "Dictionary of Computers, Information Processing and Telecommunications" John Wiley & Sons, Inc., 1987, pp. 279, 378.

*Primary Examiner*—John E. Breene
*Attorney, Agent, or Firm*—Fitzpatrick, Cella, Harper & Scinto

[57] ABSTRACT

A multifunctional information processing apparatus includes a selection unit consisting of a CRT display and a touch panel, for selecting a desired function of a plurality of executable functions, a plurality of function programs for executing different functions, respectively, a memory for storing data formed upon execution of the function program selected by the selecting unit so as to allow subsequent use of the data by other function programs, and a CPU for controlling to cause another function program selected by the selecting unit to utilize the data stored in the memory.

7 Claims, 83 Drawing Sheets

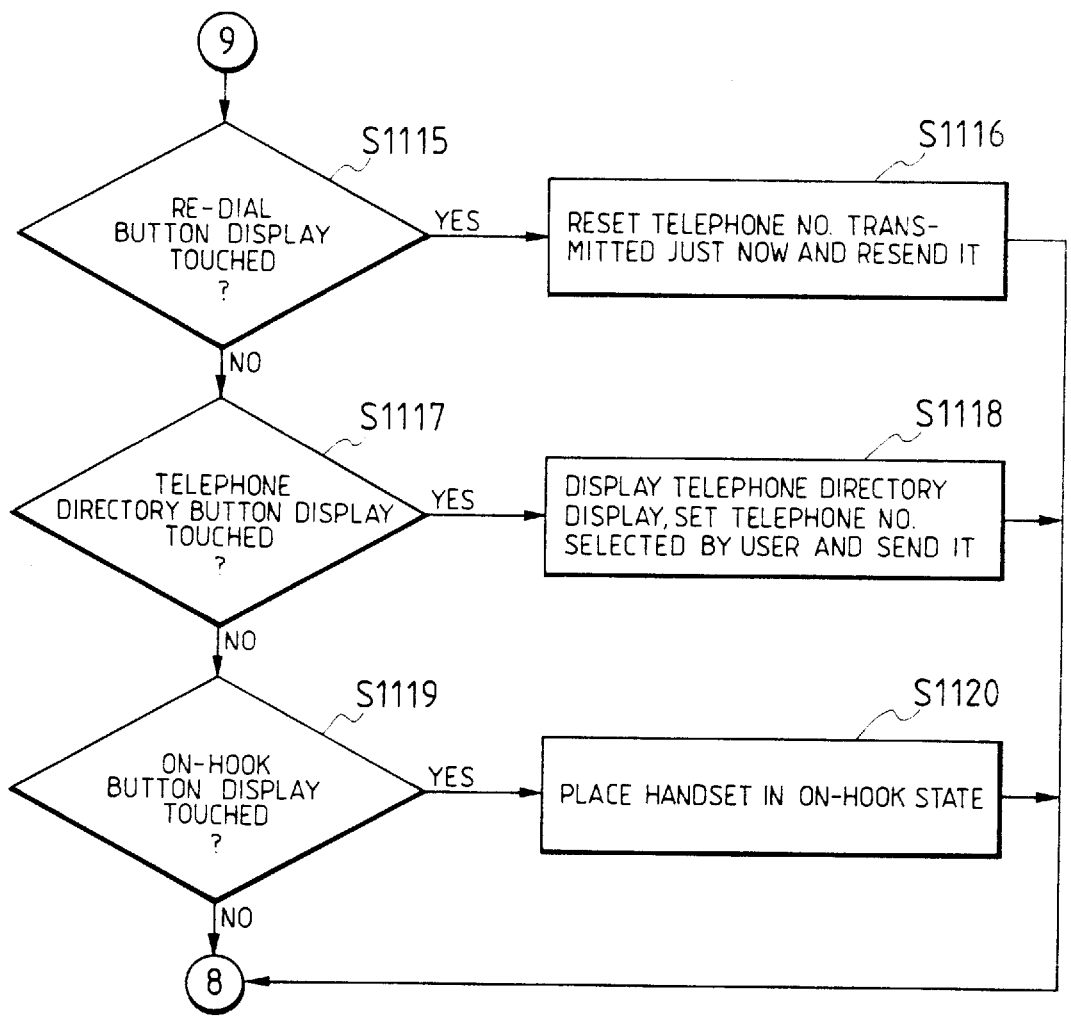

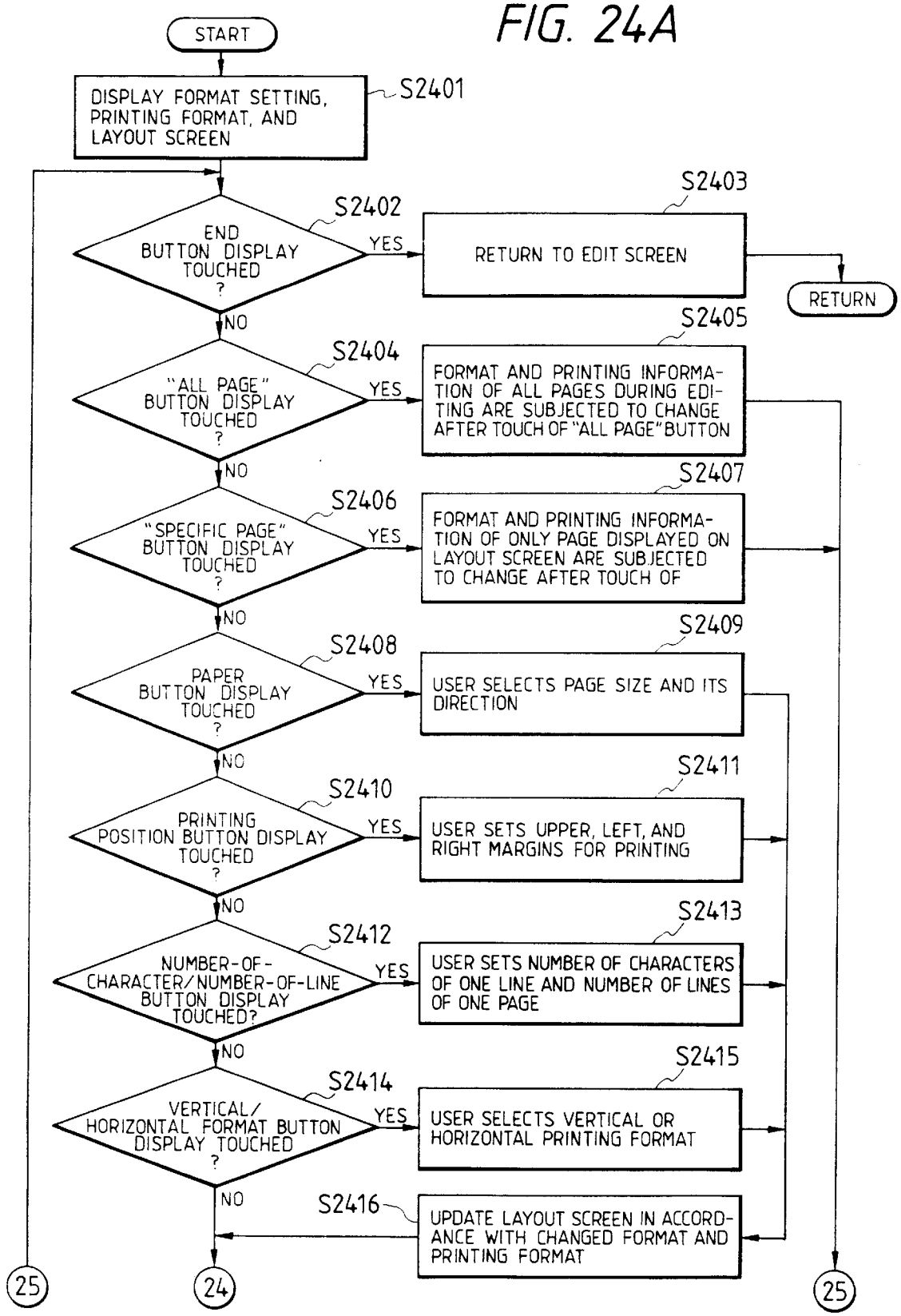

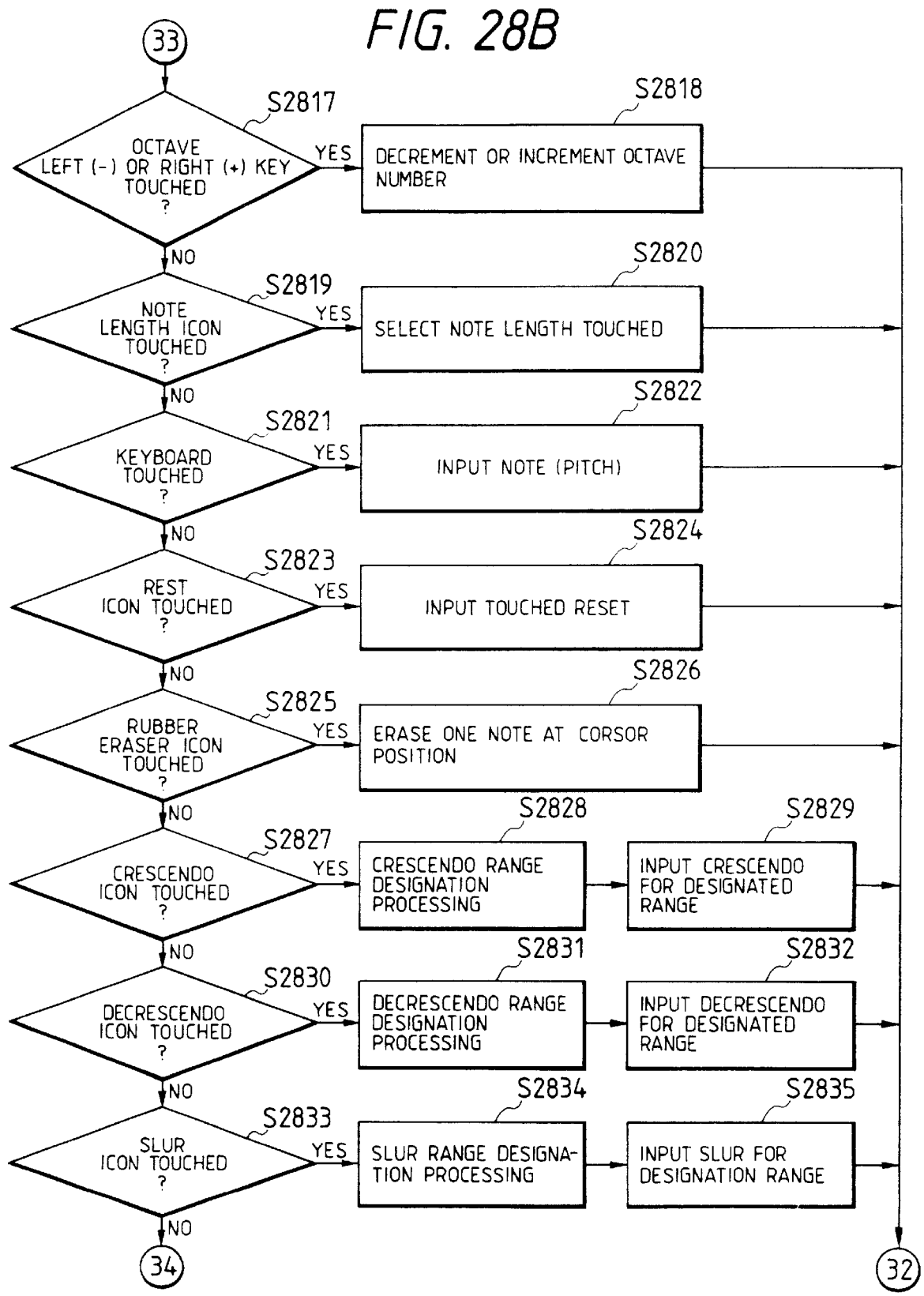

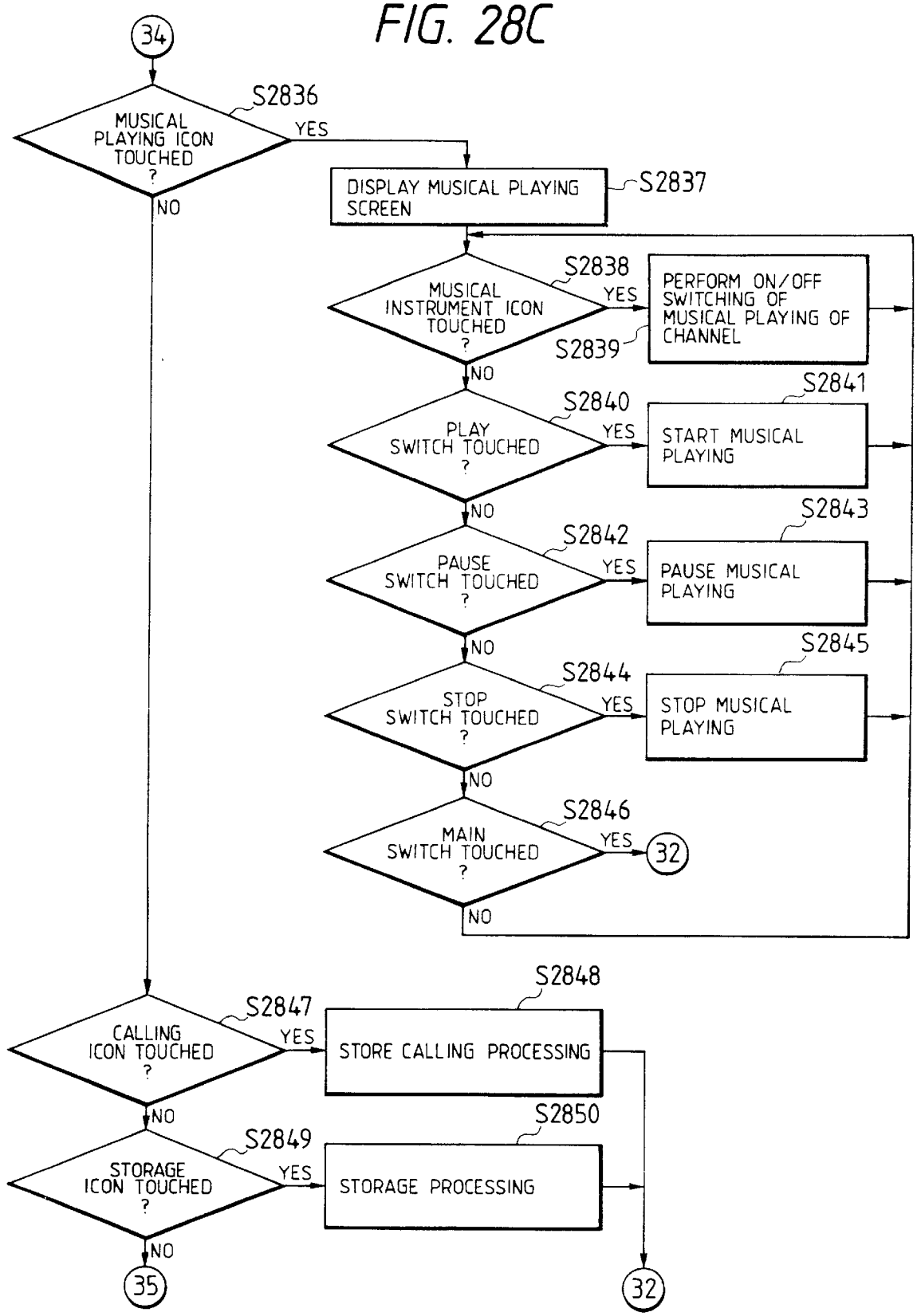

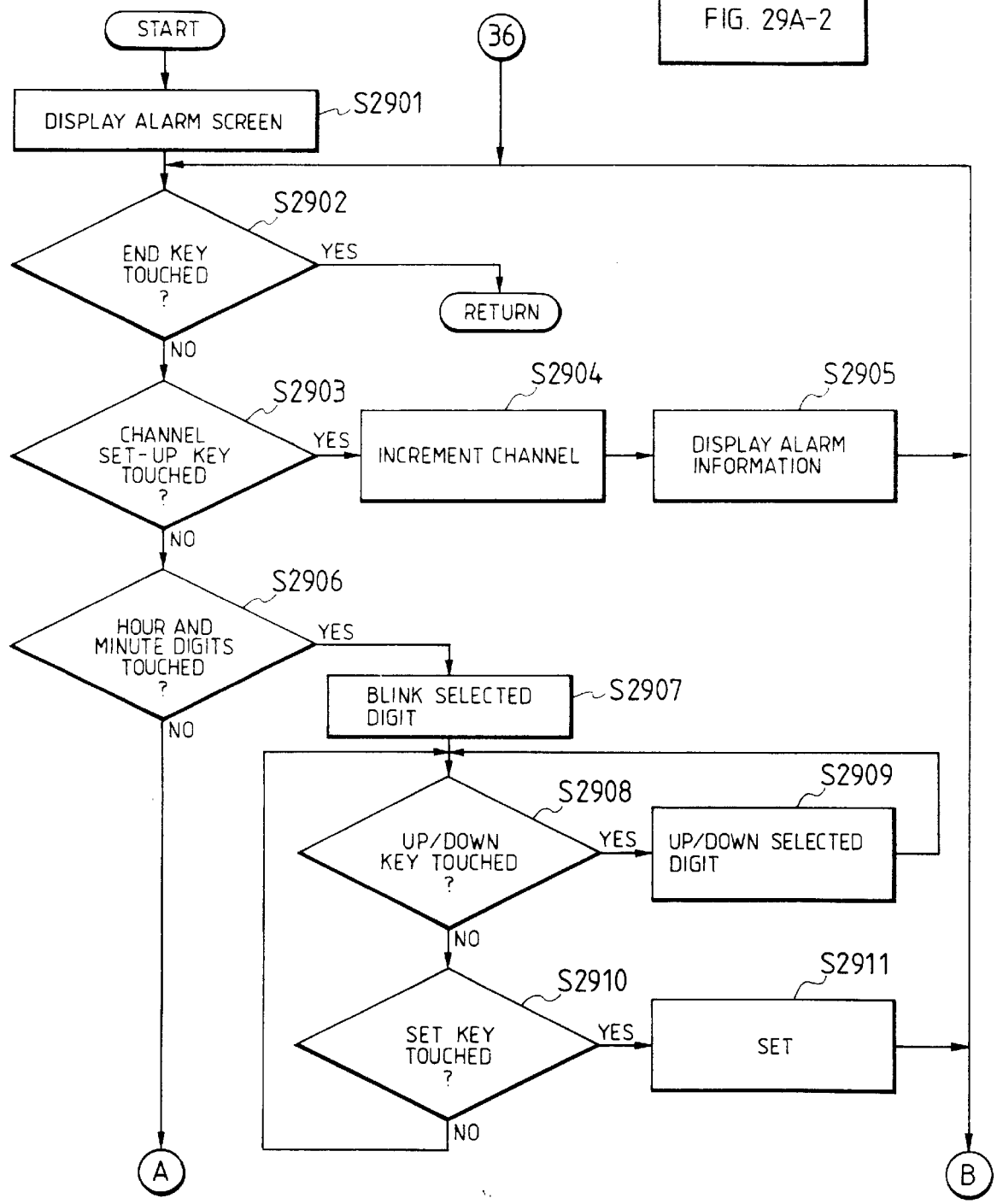

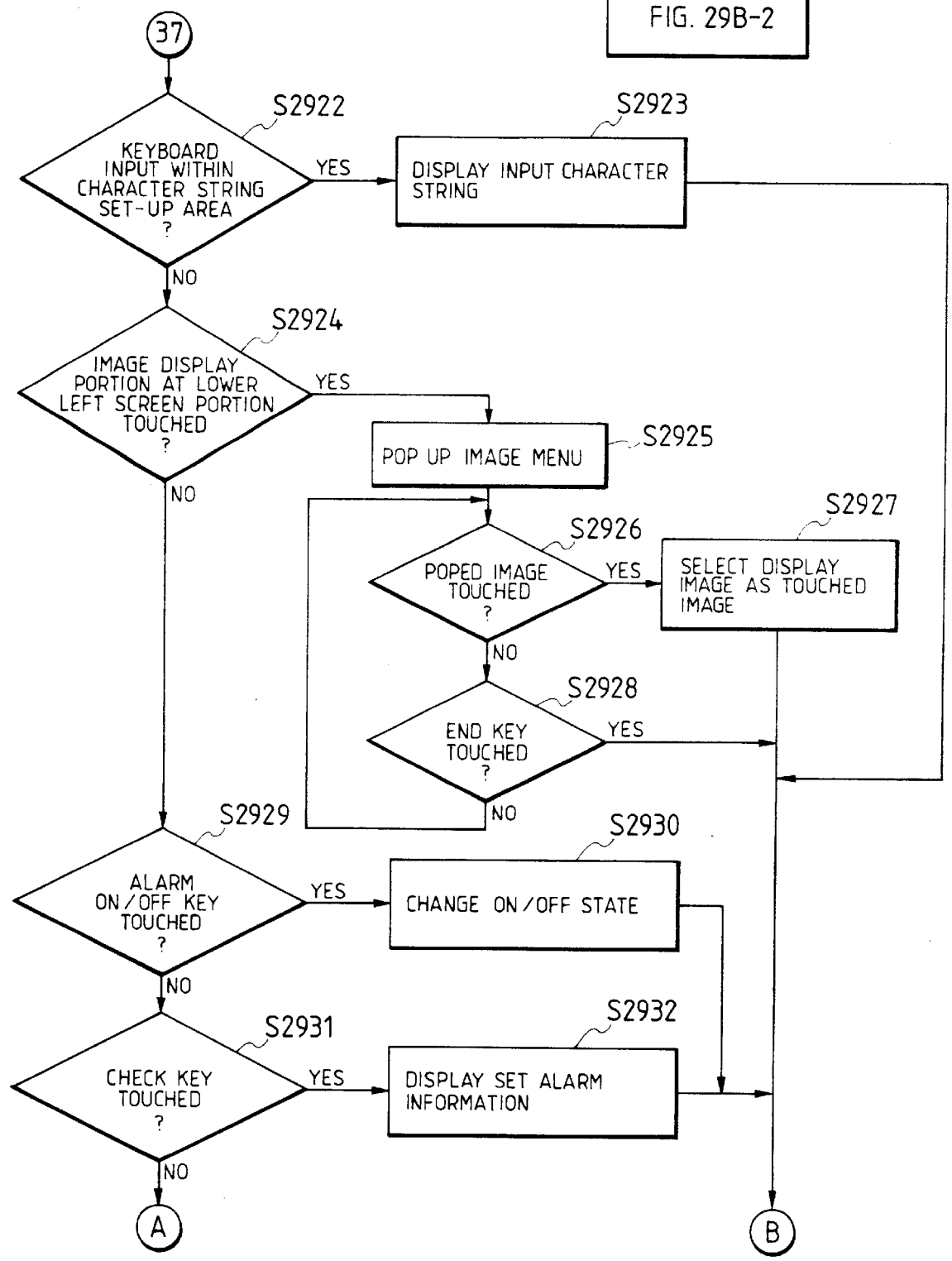

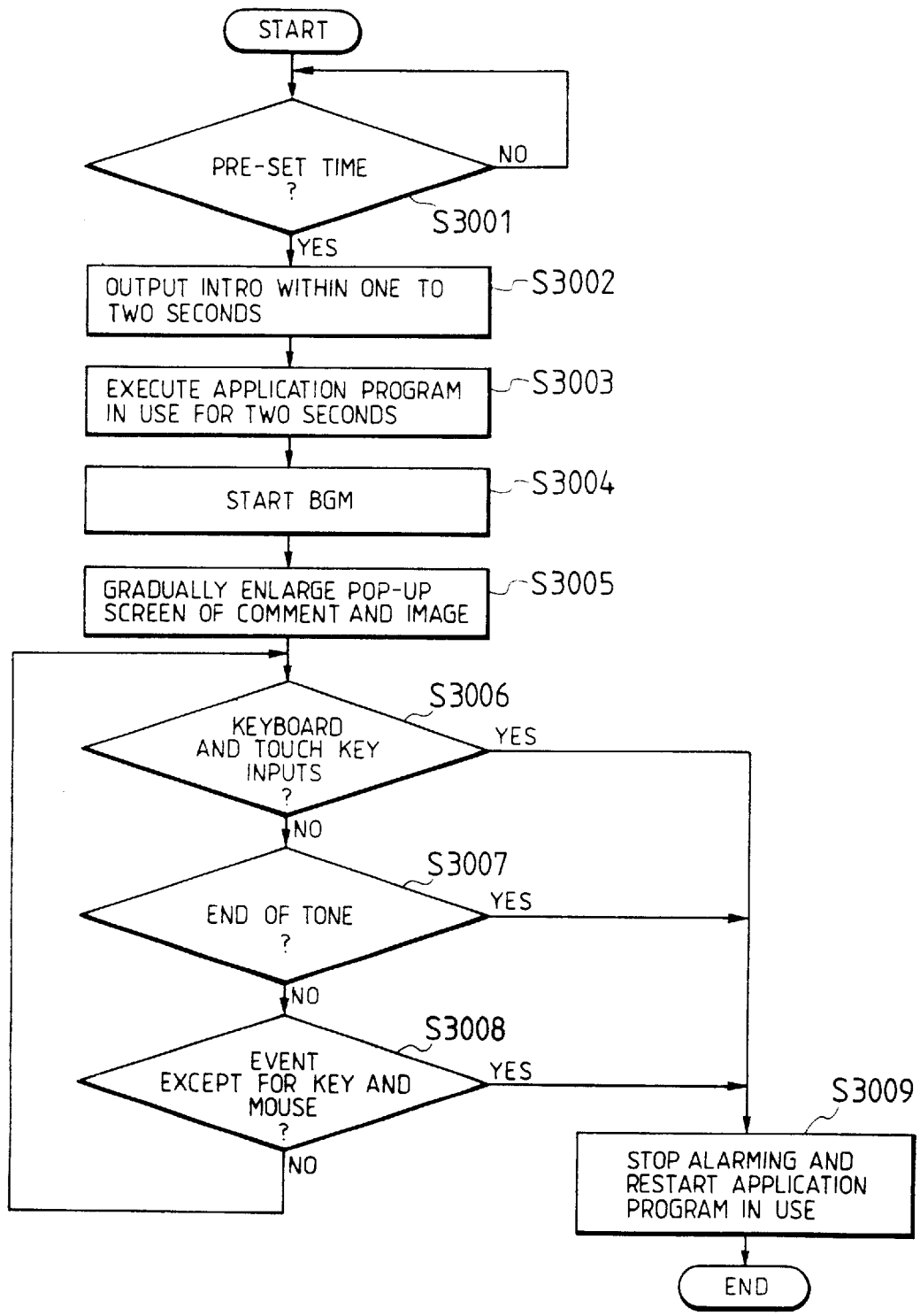

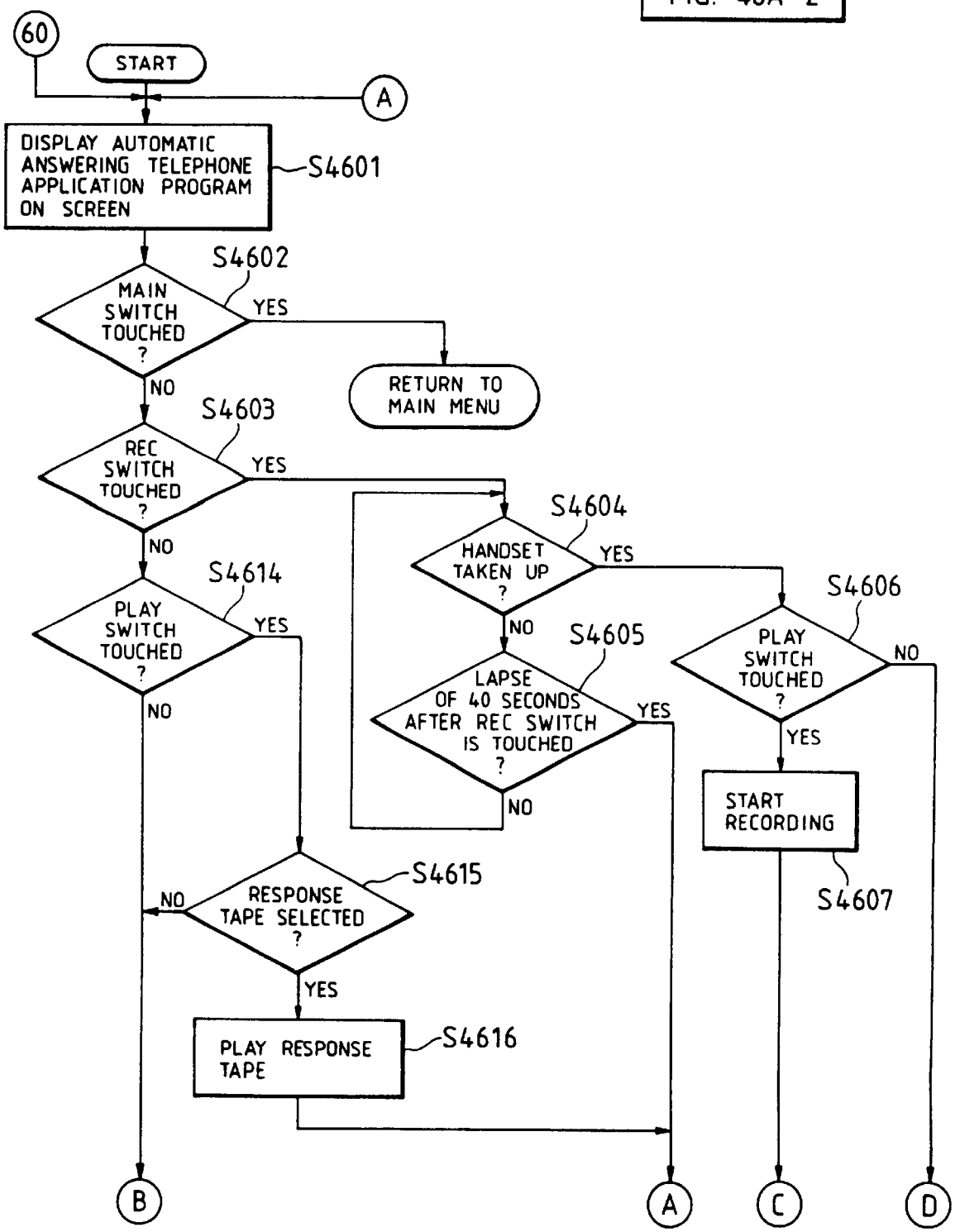

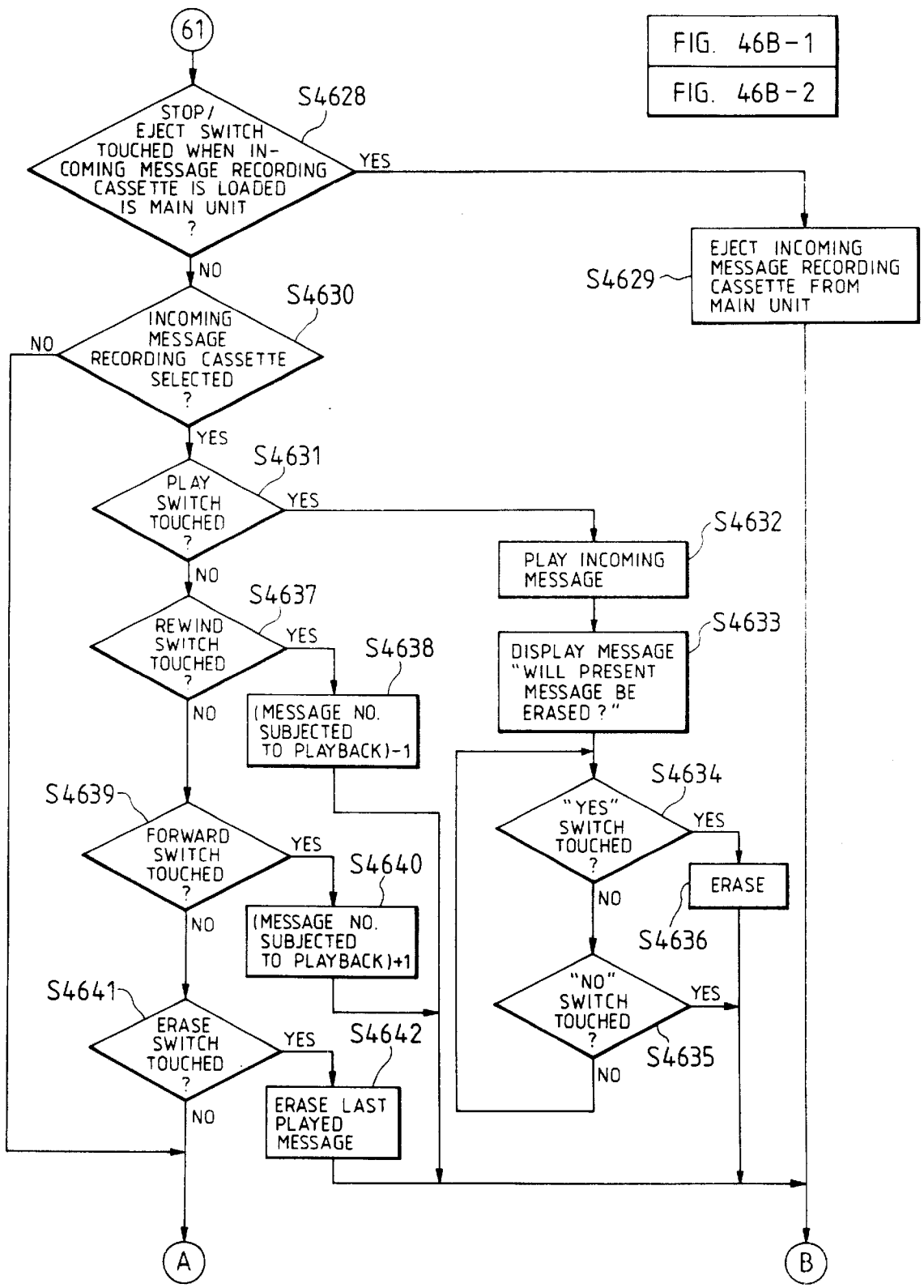

MULTIFUNCTIONAL APPARATUS WITH SELECTABLE FUNCTIONS AND A COMMON PRINTER FOR FACSIMILE RECEPTION

This application is a division of application Ser. No. 08/127,479 filed Sep. 28, 1993, now abandoned, which is a continuation of application Ser. No. 07/834,984 filed Feb. 14, 1992, now abandoned, which is a continuation of application Ser. No. 07/269,733 filed Nov. 10, 1988, now abandoned.

BACKGROUND OF THE INVENTION:

(a) Field of the Invention

The present invention relates to a multifunctional information processing apparatus which can be used as, e.g., a telephone set and a facsimile machine as well as a word-processor or a desk-top electronic computer or calculator.

(b) Related Background Art

A desk-top facsimile machine having a telephone set and a facsimile unit integrally arranged therewith is commercially available. In addition, available are programs such as wordprocessor software for performing document processing using a commercially available personal computer and the like and a communication program for performing communication through a public communication network by connecting a modem to a personal computer. By using the above programs, data communications and document processing are performed by using a personal computer.

However, there is no conventional single apparatus which realizes all functions, i.e., functions of a telephone set, a desk-top electronic calculator, a facsimile machine, and a document processing apparatus. For example, in a conventional personal computer, application programs must be loaded from a floppy disk or a hard disk, resulting in cumbersome operations.

SUMMARY OF THE INVENTION

It is an object of the present invention to provide a multifunctional information processing apparatus as a single unit which can be used as a telephone set, a facsimile machine, a document processing apparatus, and the like and which can easily change its function.

It is another object of the present invention to provide a multifunctional information processing apparatus wherein data formed by using a given function can be utilized for another function such that image data read by an image reader used in a facsimile function can be utilized for a document processing function or music information formed by a music function can be used for a telephone set holding tone or morning call music, thereby further improving operability.

It is still another object of the present invention to provide a multifunctional information processing apparatus having good operability wherein when a function having a higher priority than a given function, e.g., telephone reception or facsimile reception, is requested, the function having the higher priority is effected, and processing prior to this is automatically restored, thereby reducing an operator's load with respect to program changes and data storage operations.

BRIEF DESCRIPTION OF THE DRAWINGS

FIGS. 11A to 11C are schematic flow charts of a telephone function;

FIGS. 24A to 24C are schematic flow charts of a format and a printing function in the wordprocessor function;

FIGS. 28A to 28D are schematic flow charts of a music editor function;

FIGS. 29A, 29B, 29A-1, 29A-2, 29B-1, 29B-2 are schematic flow charts of alarm function set-up processing;

FIG. 30 is a schematic flow chart of tone generating processing of an alarm function;

FIGS. 46A, 46B, 46A-1, 46A-2, 46B-1, 46B-2 are schematic flow charts of an automatic answering telephone set-up function;

DETAILED DESCRIPTION OF THE PREFERRED EMBODIMENT

A preferred embodiment of the present invention will be described in detail with reference to the accompanying drawings.

(General Description of Apparatus (FIG. 1))

Figure 1:
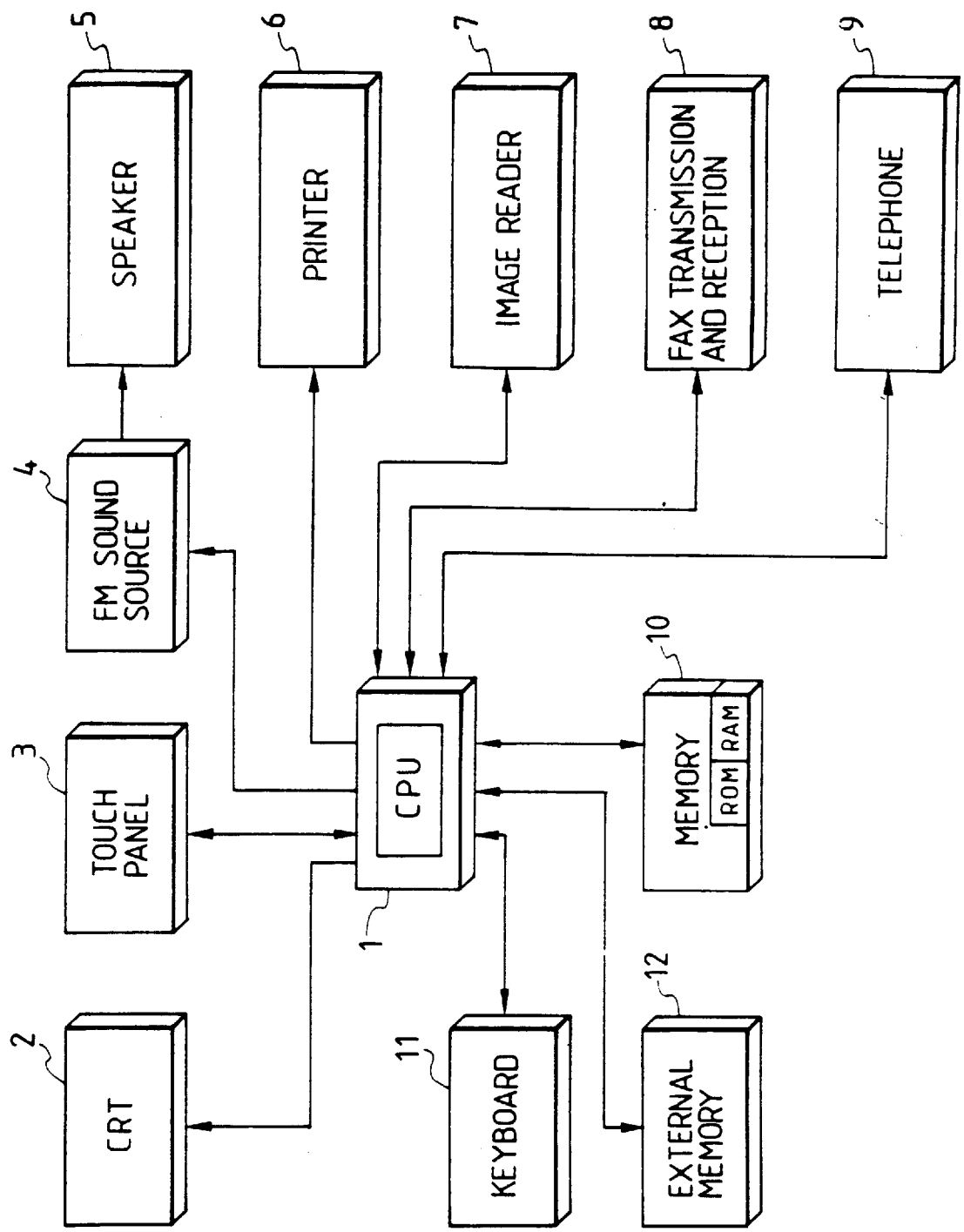
FIG. 1 is a block diagram showing a schematic arrangement of a multifunctional information processing apparatus according to an embodiment of the present invention.

FIG. 1 is a block diagram showing a schematic arrangement of a multifunctional information processing apparatus according to an embodiment of the present invention.

A controller 1 controls the overall operation of the apparatus and comprises a CPU (e.g., a microprocessor) and various I/O ports. The controller 1 outputs various control signals and data signals to the respective components and receives control singals and data signals therefrom to perform the overall control operation. A CRT 2 is connected to the controller 1 and displays various menu items, document information, and image information read by an image reader 7. A touch panel 3 is connected to the controller 1 and comprises a transparent pressure-sensitive touch panel arranged on the CRT 2. An item or coordinates can be input on the CRT 2 upon depression of its surface with a finger or the like.

An FM (Frequency Modulation) sound source 4 is also connected to the controller 1. Music information generated by a music editor or the like is stored in a memory 10 or an external memory 12 in the form of digital data. The digital data is read out from the memory 10 or the external memory 12 and is FM-modulated by the FM sound source 4. An electrical signal from the FM sound source 4 is converted into an audible tone by a speaker 5. A printer 6 includes a serial thermal transfer printer and a thermal line printer for printing facsimile information and the like on heat-sensitive paper.

The image reader 7 photoelectrically reads original data and is arranged midway along a path of recording paper of the thermal transfer printer. The image reader 7 reads images of a facsimile original and various types of original. A FAX transmission and reception unit 8 performs FAX transmission of original data read by the image reader 7 and FAX reception of a facsimile signal. A telephone set 9 has various telephone functions such as a normal telephone function and an automatic answering telephone function.

Figure 2:
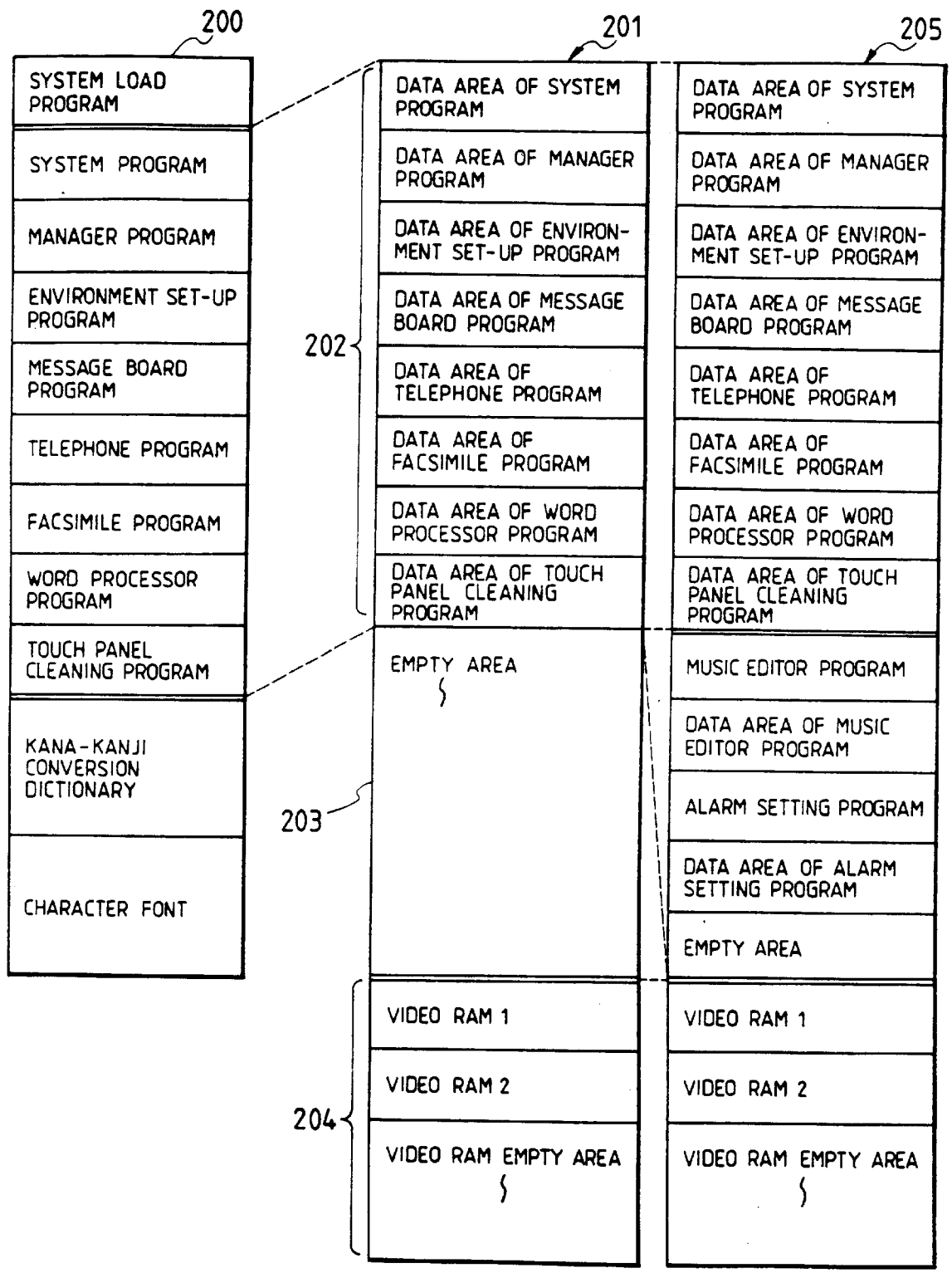
FIG. 2 is a memory map of the information processing apparatus of the embodiment shown in FIG. 1.

The memory 10 includes a ROM for storing a system program, a manager program, and other application programs as well as character fonts and a dictionary, and a RAM for storing application programs externally loaded from the external memory 12 and document information. A memory map of this memory 10 is illustrated in FIG. 2. A keyboard 11 is used to input document information and various commands. A joystick for designating a position on the screen of the CRT 2 is mounted on the keyboard 11. The external memory 12 such as a microfloppy disk or a hard disk stores document information, music or speech information, and user application programs.

(Description of Memory Map (FIG. 2))

FIG. 2 is a memory map of the memory 10 in the information processing apparatus.

The memory map includes programs and data which are represented by reference numeral 200 and stored in the ROM of the memory 10. These programs and data include a system program including an operating system (OS) program, and a manager program for controlling task management of each program. The ROM also stores an environment set-up program for setting a printing density of a printer and a volume level of a speaker sound, a message board program for signalling messages of various pieces of information to a user, a telephone program for effecting a telephone function, a facsimile program for effecting a facsimile function, a wordprocessor program, and a touch panel cleaning program.

The ROM also stores a kana-kanji conversion dictionary and character fonts for character pattern information.

The RAM of the memory 10 has a data structure 201 immediately after system initialization. The data structure 201 includes a data area (working area) 202 used by the programs stored in the ROM, an area 203 for storing programs loaded from the external memory 12 such as a disk, and a video RAM area 204 for storing data to be displayed on the CRT 2. A plurality of video RAM frames are prepared in the video RAM area 204 so as to display a plurality of windows.

A RAM state 205 is obtained when a music editor program or an alarm function program is loaded in the RAM from the external memory 12 such as a disk. These programs are stored in an empty area 203 in the data structure 201. The data area of these programs is set in the data structure 201.

(Description of Outer Appearance of Apparatus (FIG. 3))

Figure 3:
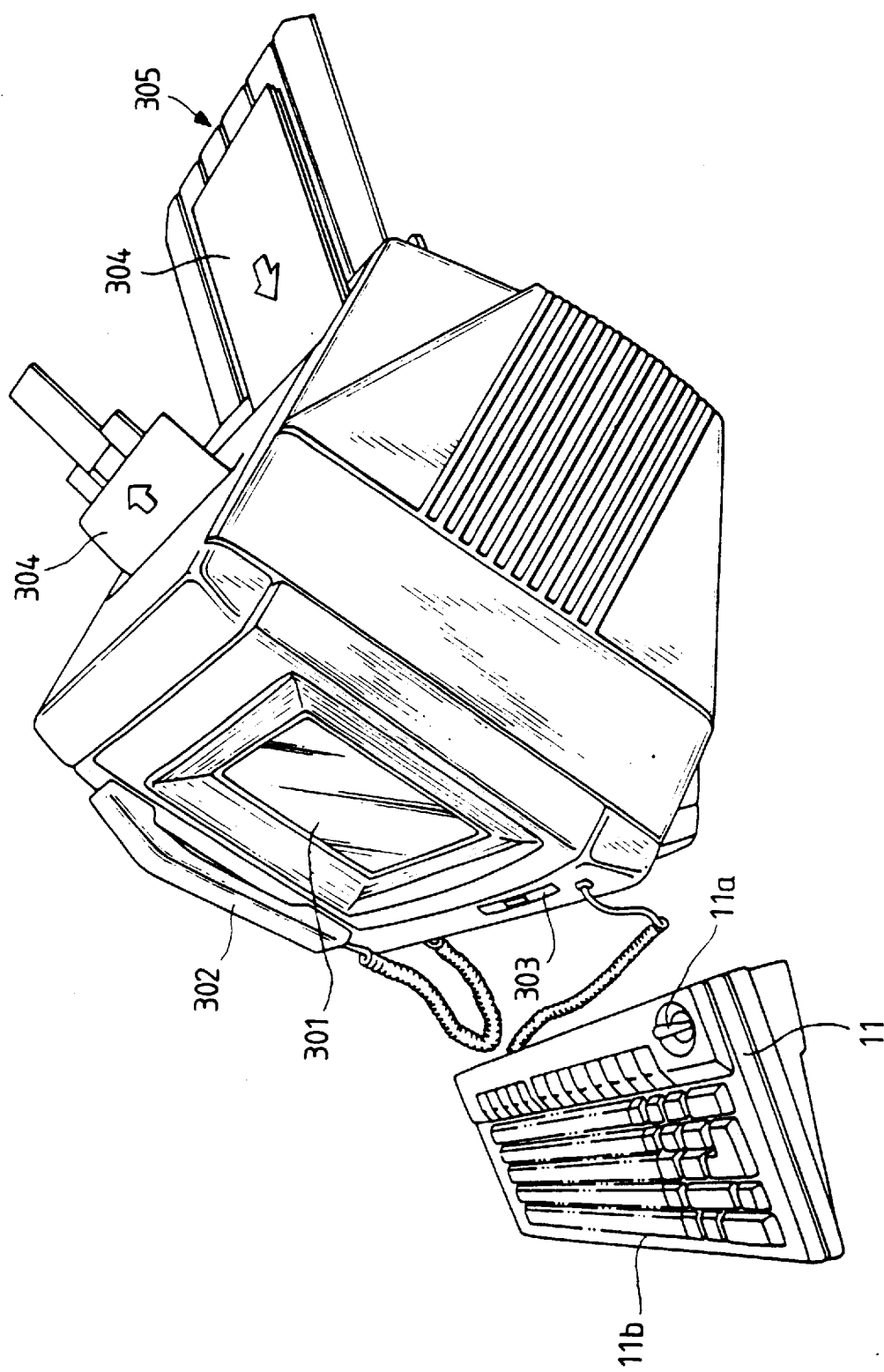
FIG. 3 is a perspective view of the information processing apparatus shown in FIG. 1.

FIG. 3 is a perspective view showing an outer appearance of the information processing apparatus. A CRT screen 301 displays various types of menu, graphic information, and document information. A touch panel 3 is formed on the CRT screen 301. Coordinates or an item can be input upon depression of the surface of the touch panel 3 with a finger or the like. A handset 302 is used when the apparatus is used as a telephone set. The keyboard 11 is detachably connected to the main unit through a cord and is used to input various types of document information and various types of data. A joystick 11*a* for inputting coordinate data and various function keys 11*b* are arranged in the keyboard 11. The apparatus also has a microfloppy insertion port 303.

A sheet table 305 supports recording sheets 304 printed at a thermal transfer printer and an original 304 read by the image reader 7. The scanned original and the printed sheet are delivered from the upper portion of the apparatus. In facsimile reception or the like, heat-sensitive paper recorded at the thermal line printer is delivered backward from the sheet table 305 located at the lower rear portion of the apparatus.

(Description of Program System (FIG. 4))

Figure 4:
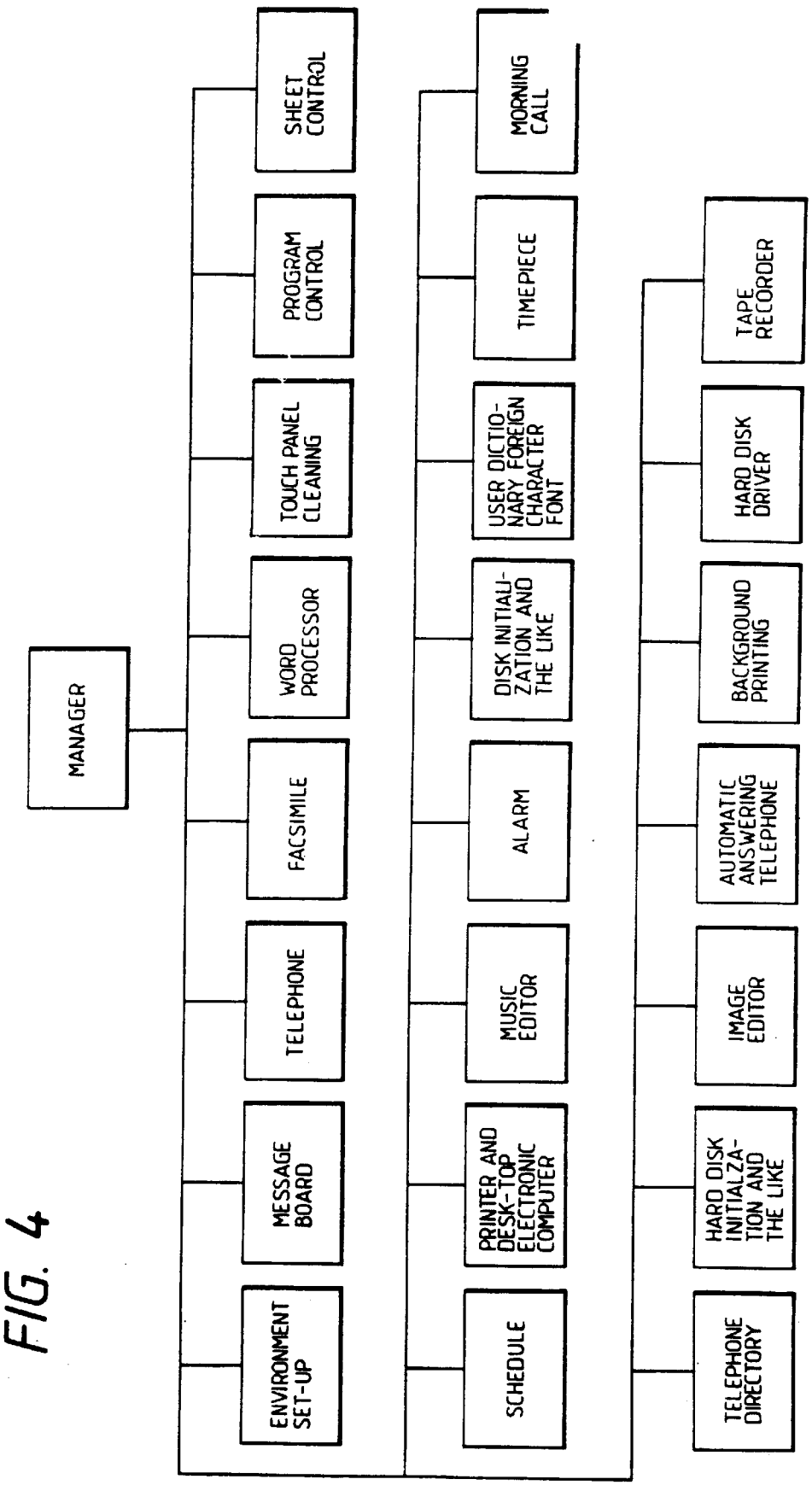
FIG. 4 is a functional block diagram showing functions of the information processing apparatus in FIG. 1.

FIG. 4 shows a relationship between a control program (to be referred to as a manager hereinafter) for controlling the respective programs in the apparatus of this embodiment and other function programs.

The manager is a task management program for executing a plurality of illustrated function programs (tasks) and switching between the execution programs.

The operations of the function programs will be described with reference to the operation of the manager.

(Description of Manager (FIG. 5))

Figure 5A:
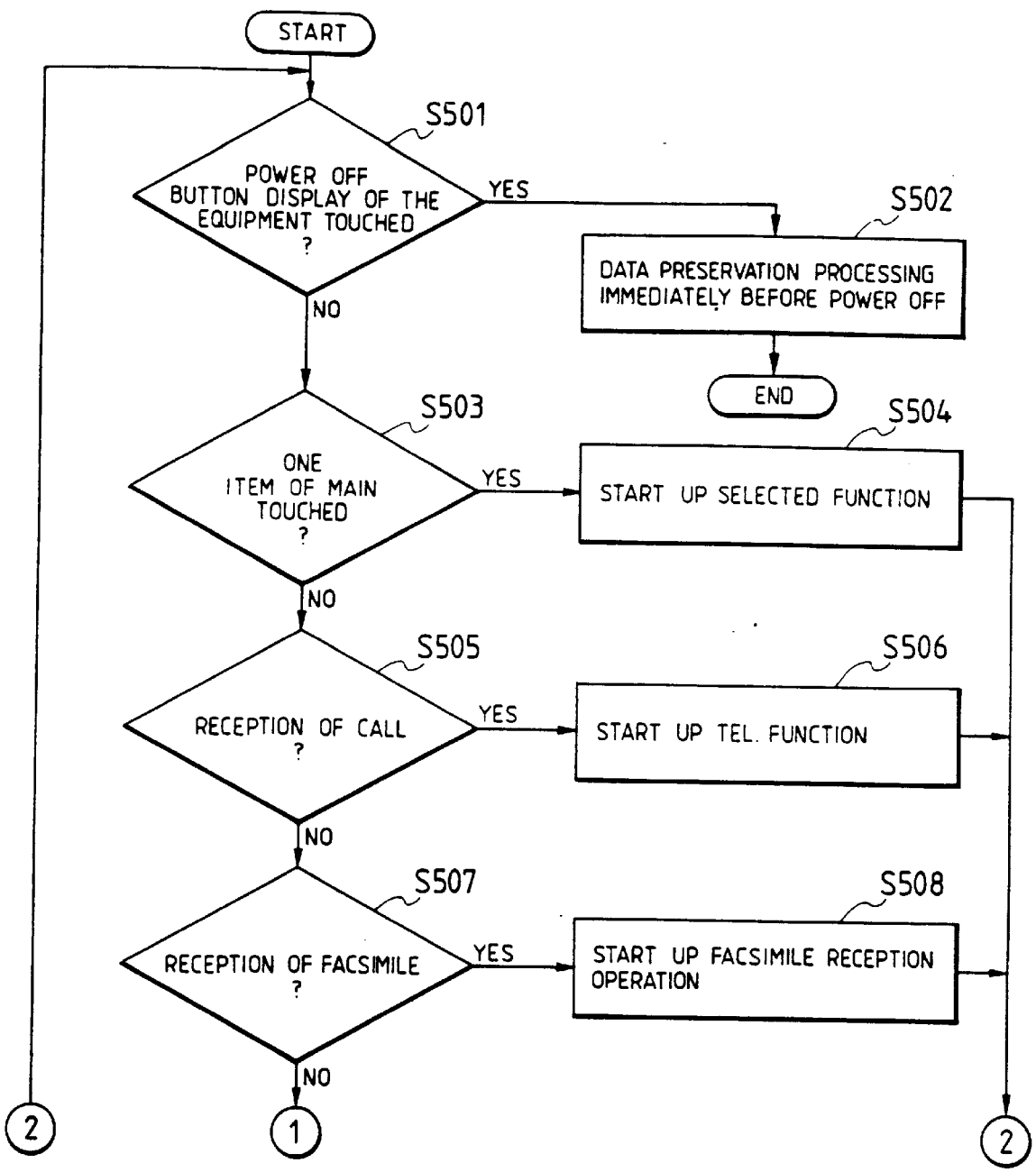
FIGS. 5A and 5B are schematic flow charts of a manager program.
Figure 5B:
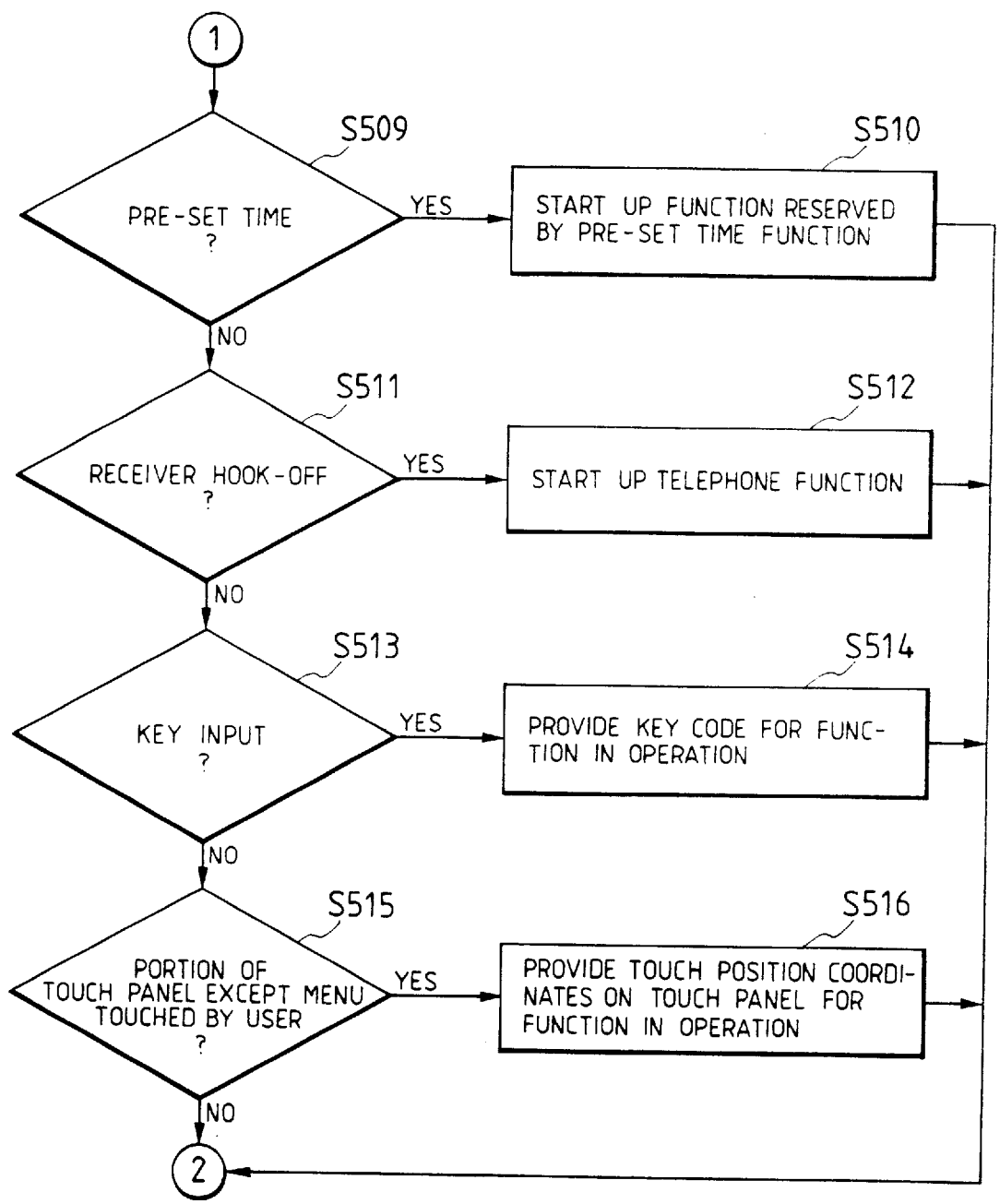
Figure 6A:
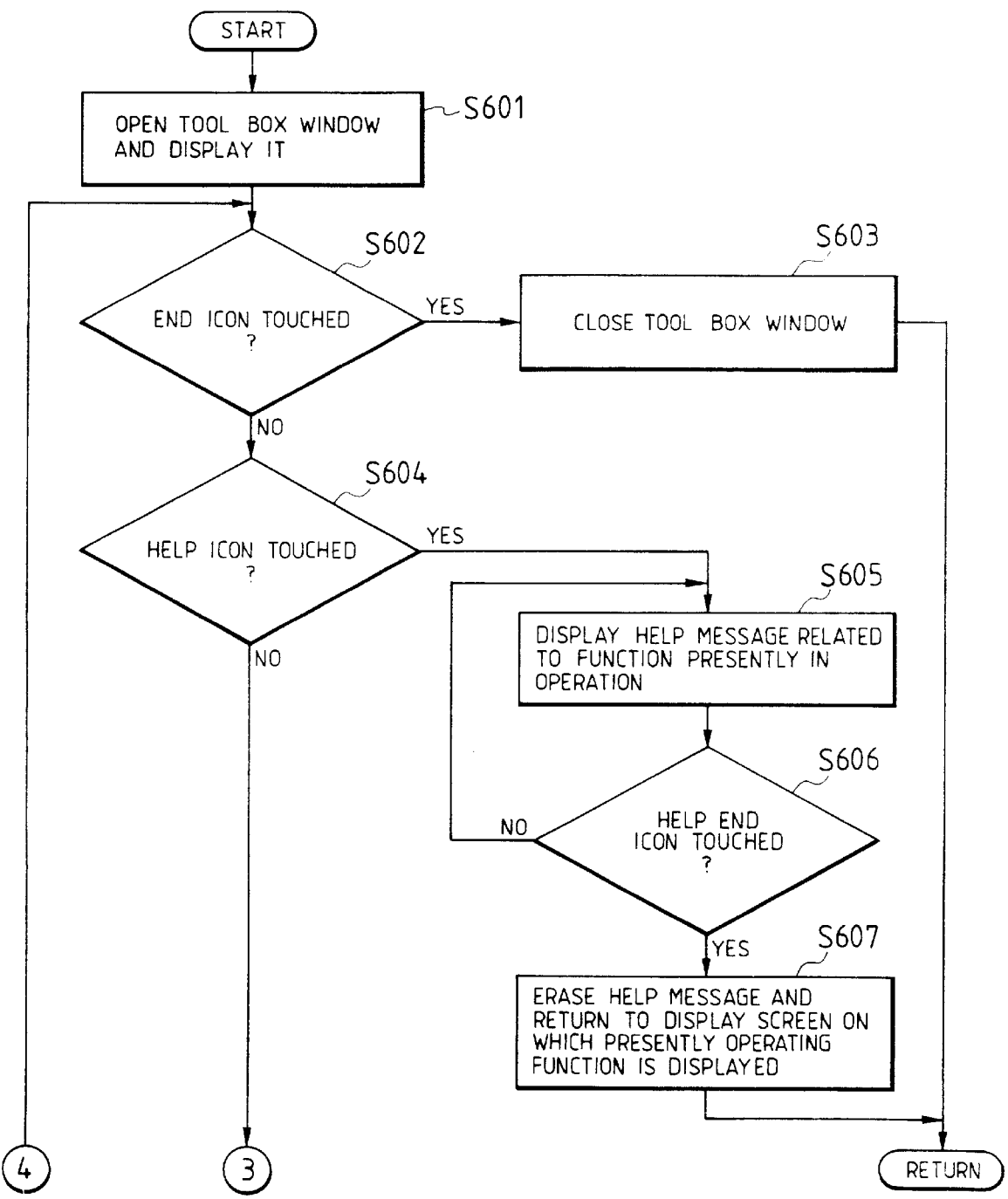
FIGS. 6A to 6D are schematic flow charts of a tool box function.
Figure 6B:
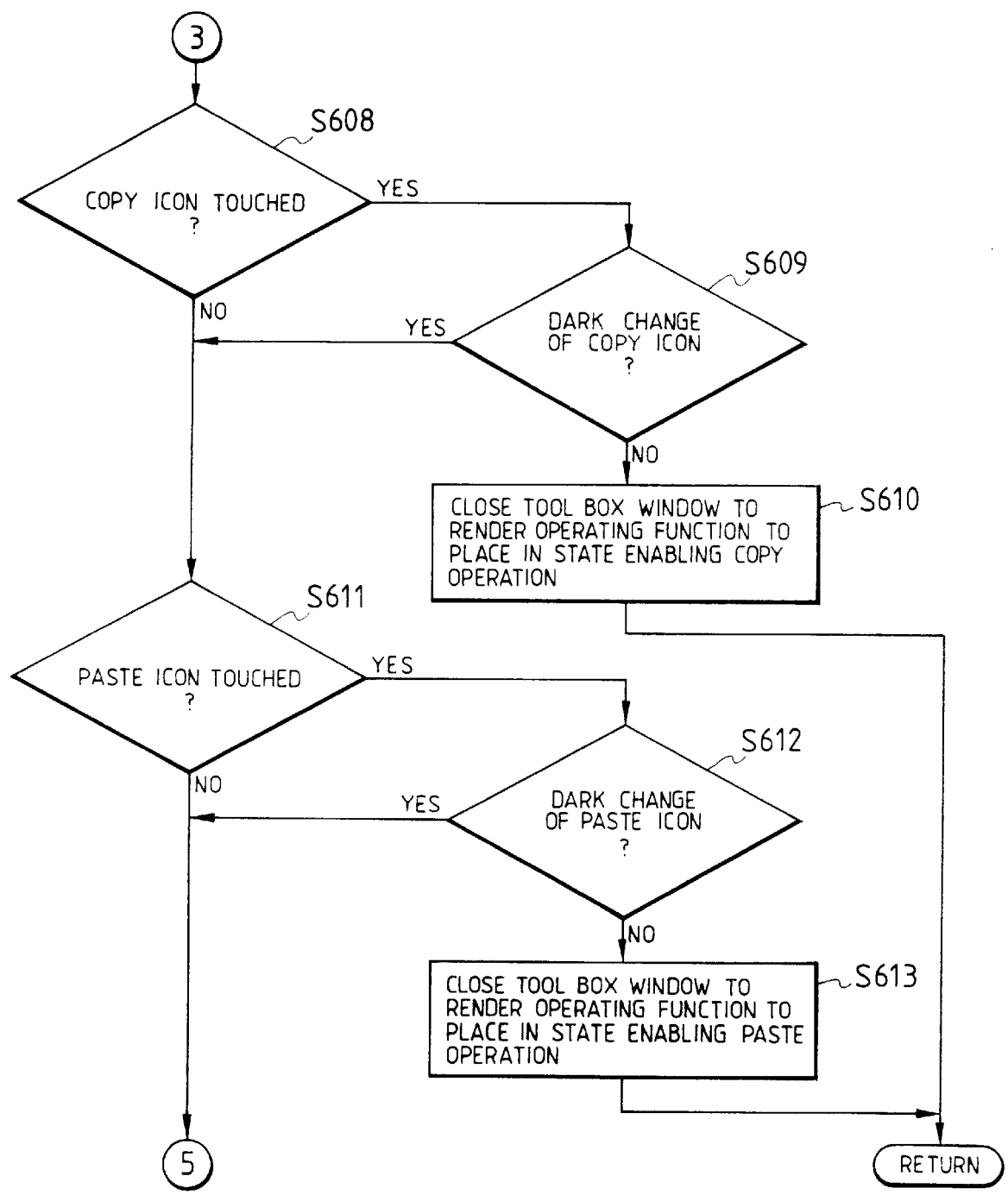
Figure 6C:
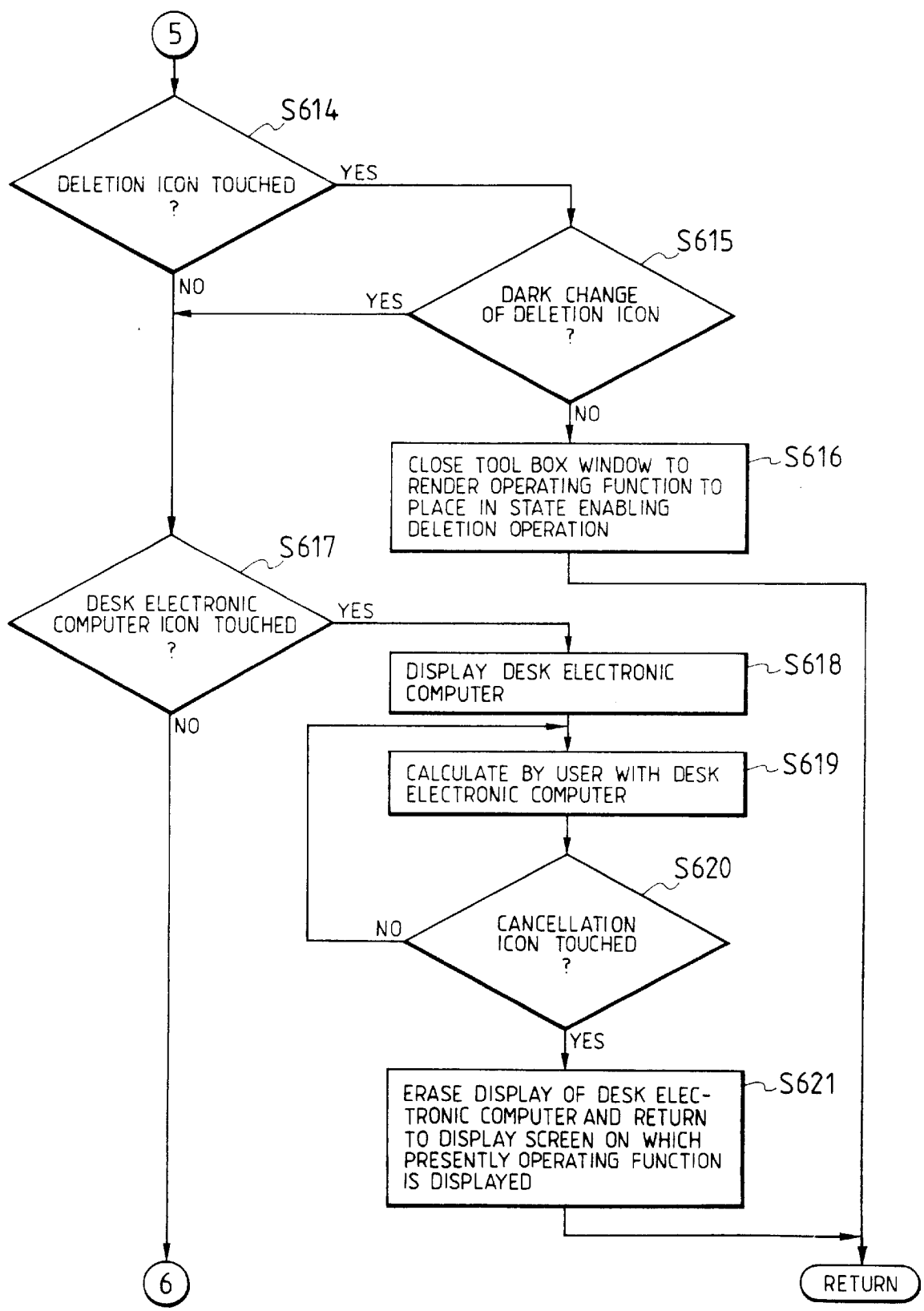
Figure 6D:
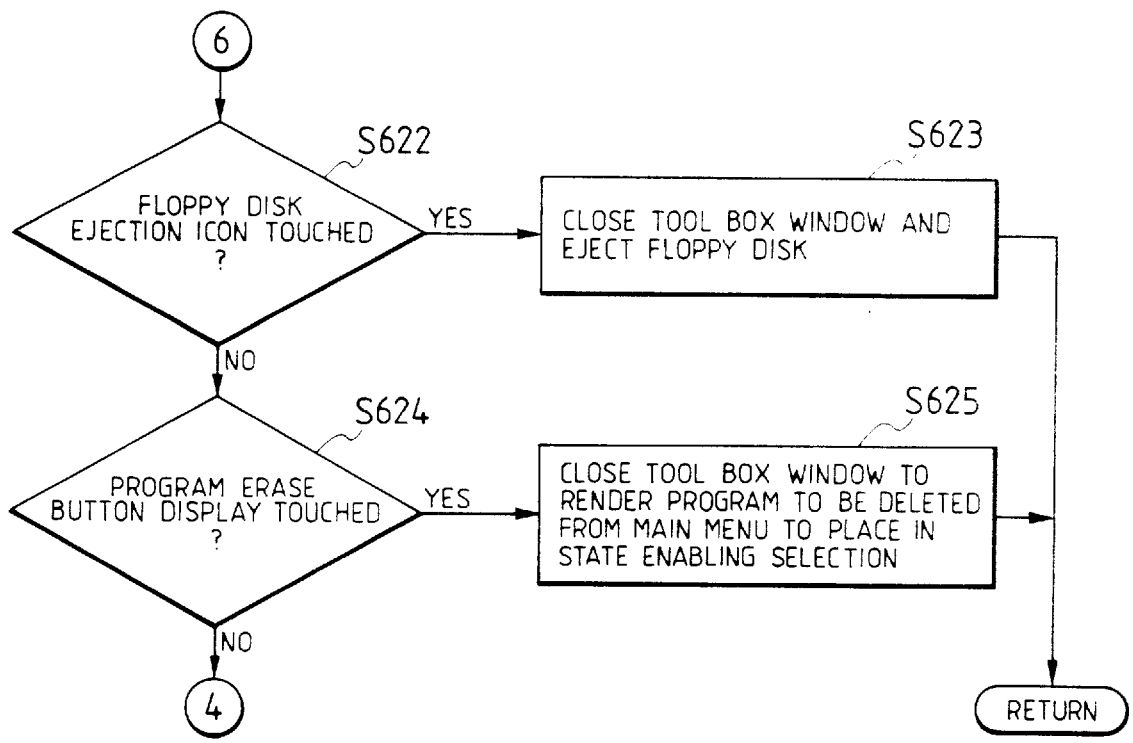

FIG. 5 is a flow chart for explaining the operation of the manager.

In step S501, a power ON/OFF state of the apparatus is detected. If the power switch is turned off, the flow advances to step S502. Data prior to the power OFF state is preserved in the external memory 12. If NO in step S501, the flow advances to step 503. A main menu item displayed on the CRT 2 and a touch by a user on the touch panel 3 is detected. If one function of the menu is designated by the main menu, the flow advances to step S504, and a program of the function designated by the user is started.

The manager determines in step S505 whether an incoming call is received. If YES in step 505, the flow advances to step S506, and a telephone function is started up. Similarly, the manager determines in step S507 whether a reception of a facsimile signal is detected. If YES in step S507, a facsimile reception operation is started in step S508, and facsimile reception is performed. The manager determines in step S509 whether the pre-set time has elapsed. If a time is preset and a lapse of the pre-set time is detected, the flow advances to step S510. A reserved function program to be started upon a lapse of the pre-set time is started. The pre-set functions are exemplified by timer facsimile transmission, a morning call, and an alarm.

The manager determines in step S511 whether the handset 302 of the telephone set is set in the off-hook state. If YES in step S511, the telephone function program is started in step S512. At the time of starting of operations in steps S506, S508, S510, and S512, the addresses and various data of the presently executed program are temporarily saved, and this program is restored at the end of the reception processing function (including an outgoing call and transmission).

The manager determines in step S513 whether a key input from the keyboard 11 is detected. If YES in step S513, an input key code is transferred to the operating function. If the user touches a portion of the touch panel 3 other than the menu (step S515), touch position coordinates on the touch panel are provided for the function in operation in step S516.

As described above, the manager detects an event and causes the corresponding function (program) to start up. The next event is searched immediately after start of a given function, and the searched function can be effected independently of the operating function. Therefore, if an incoming call is made during a wordprocessor operation and the handset is set in the off-hook state, the display can be immediately changed into a telephone display, and the telephone function can be effected.

(Description of Tool Box Function (FIG. 6))

FIGS. 6A to 6D are flow charts for explaining a tool box function. The tool box function is effected during execution of each function. For example, a "help" message (operation instruction) of a present operating function is performed. Data or the like formed by a given function can be cut and pasted, and the cut and pasted data can be used in another function.

When a tool box icon displayed on the CRT 2 is touched by the user, the tool box function is effected. In step S601, a tool box window is opened and displayed on the CRT 2. Whether an icon representing an end is designated by the user on the touch panel 3 is determined in step S602. If YES in step S602, the tool box window is closed to cancel the tool box function in step S603.

When the user touches a "help" icon in step S604, a help message (function description) associated with an operating function is displayed on the CRT 2 in step S605. These operations continue until the end of the help function is designated in step S606. When the end icon for the help message is touched in step S606, the help message is erased in step S607, and the screen of the present operating function is restored.

In the operations in steps S608 to S610, a copy icon on the display screen of the CRT 2 is touched, data of the present operating function is cut and stored, and a ready state is obtained in which the cut data can be repeatedly used in this function or any other function. When a paste icon is designated in the operations of steps S611 to S613, the already cut data is pasted to the present operating function (the operating function is placed in a state enabling paste operation). In copying, the original data is kept stored. However, in deletion, the original data is cut and deleted from the original position.

Similarly, in operations in steps S614 to S616, data designated in the operating function can be deleted. If an icon is subjected to a dark change during copy, paste, or deletion function designation, the present operating function cannot be used. In this case, no operation is performed, and the flow advances to the next step.

When an electronic calculator icon is touched in step S617, a calculator operation panel is displayed on the CRT 2. When a key position displayed on the touch panel 3 is touched, the display can be used in the same manner as a normal desk-top electronic calculator. This operation continues until a cancel icon is input in step S620. In step 622, an icon is touched to automatically eject a microfloppy disk from the insertion port 303 to the outside of the apparatus. In step S624, an icon is touched to erase a program in an empty area in the memory. Program erase is performed to erase an application program loaded from the floppy disk or hard disk to the memory and executed in the memory so as to replace it with another program in the disk. These programs include a morning call program, an automatic answering telephone function program, and an alarm timepiece function program. In addition, various programs formed by the user may be registered in a disk and can be loaded in the empty area of the memory 10 of the apparatus and can be executed. It should be noted that the program erase function is displayed in only the main menu and can be executed.

(Description of Environment Set-Up Processing (FIG. 7))

Figure 7:
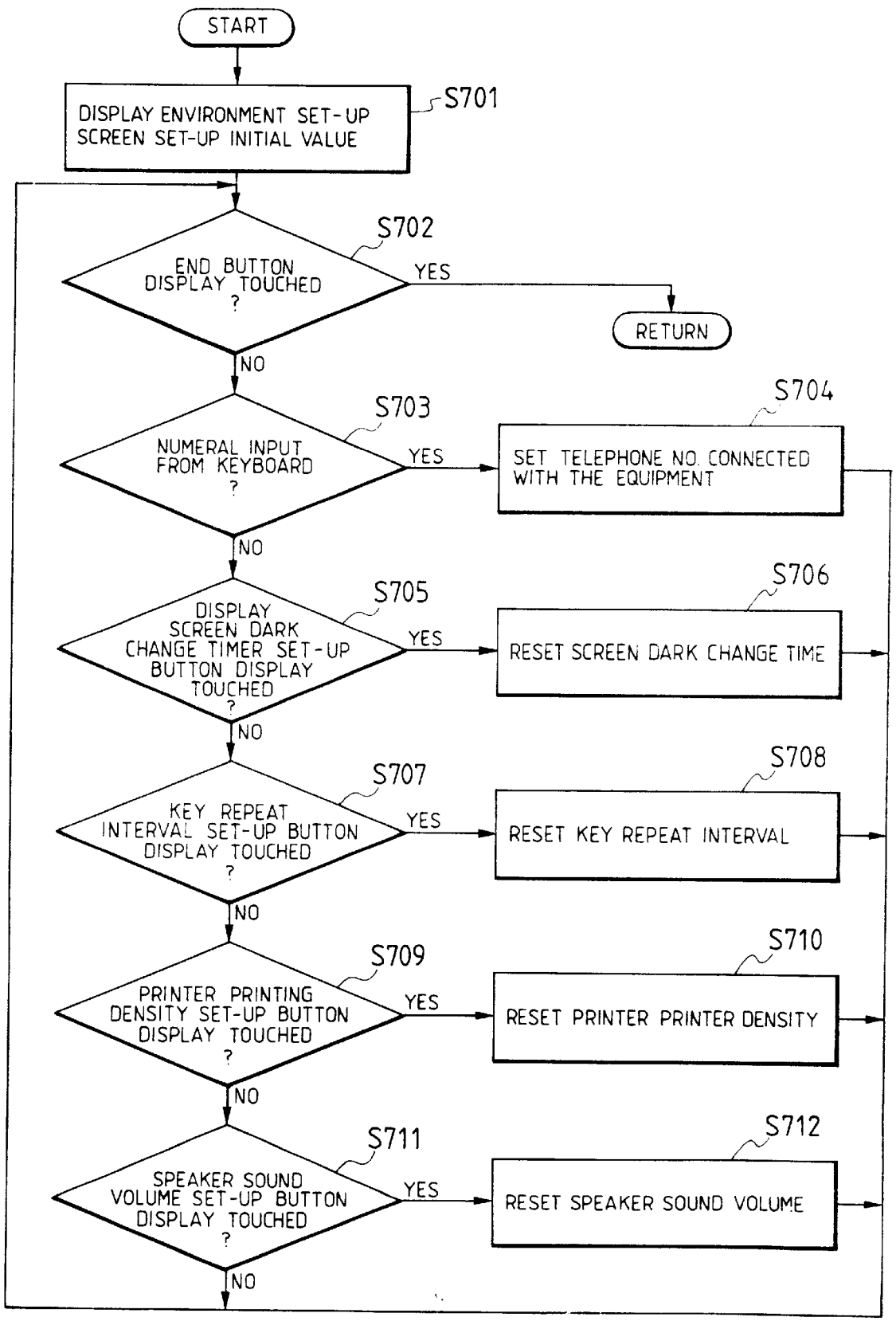
FIG. 7 is a schematic flow chart of an environment set-up function.

FIG. 7 is a flow chart showing set-up processing of an environment in which the information processing apparatus of this embodiment is used. When an environment set-up command is input, an environment set-up screen is displayed on the CRT 2 in step S701.

Environment set-up includes setting (steps S703 and S704) of a telephone number of the apparatus, setting (steps S705 and S706) of a dark change timer for setting a dark change time of the screen, setting (steps S707 and S708) of key input time interval of a key repeat function for repeating a key input upon continuous depression of a given key on the keyboard 11, and setting (steps S711 and S712) for controlling the volume of sound of the speaker 5 for outputting music and speech information.

(Description of Message Board Function (FIGS. 8 to 10))

Figure 8:
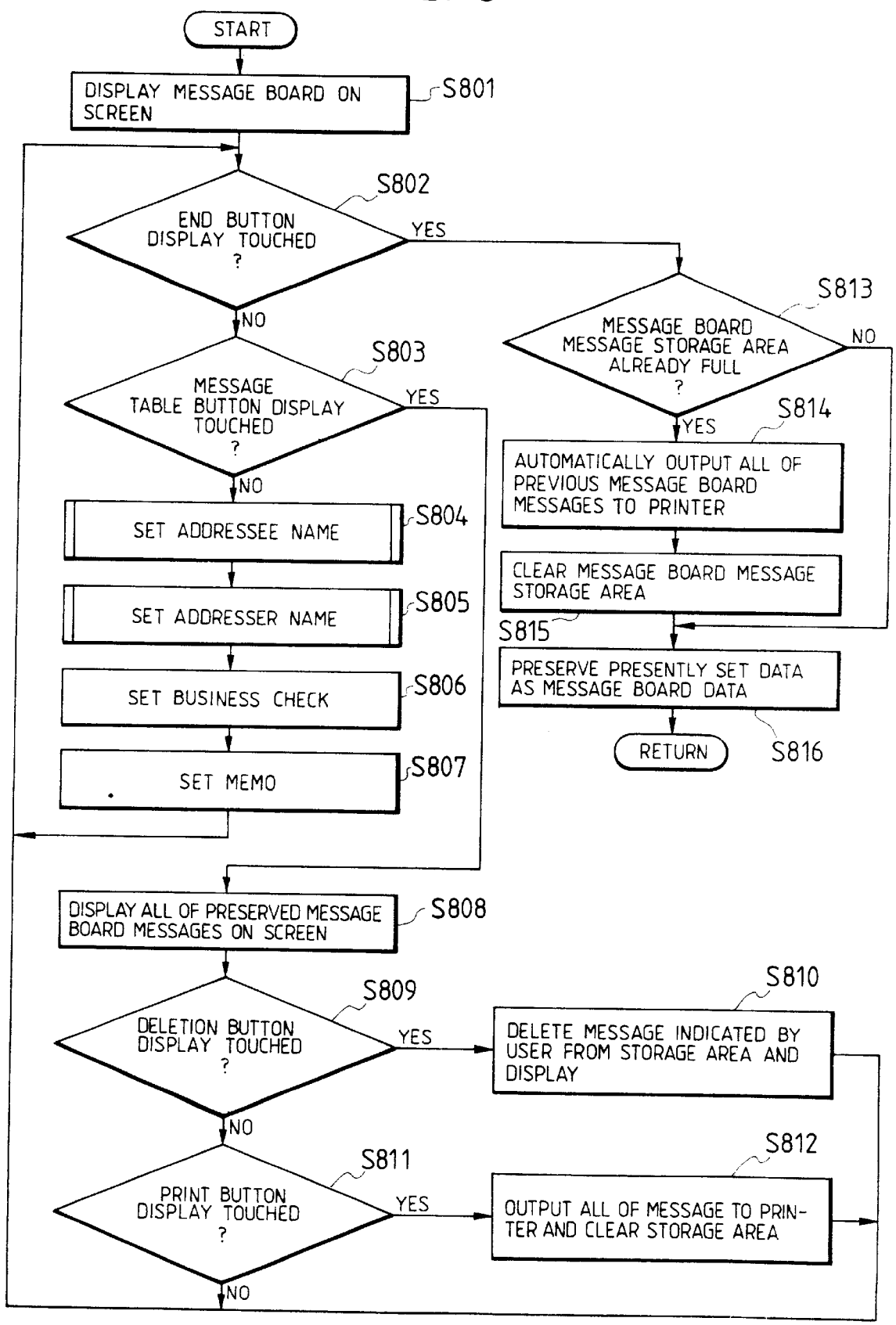
FIG. 8 is a schematic flow chart of a message board function.
Figure 9:
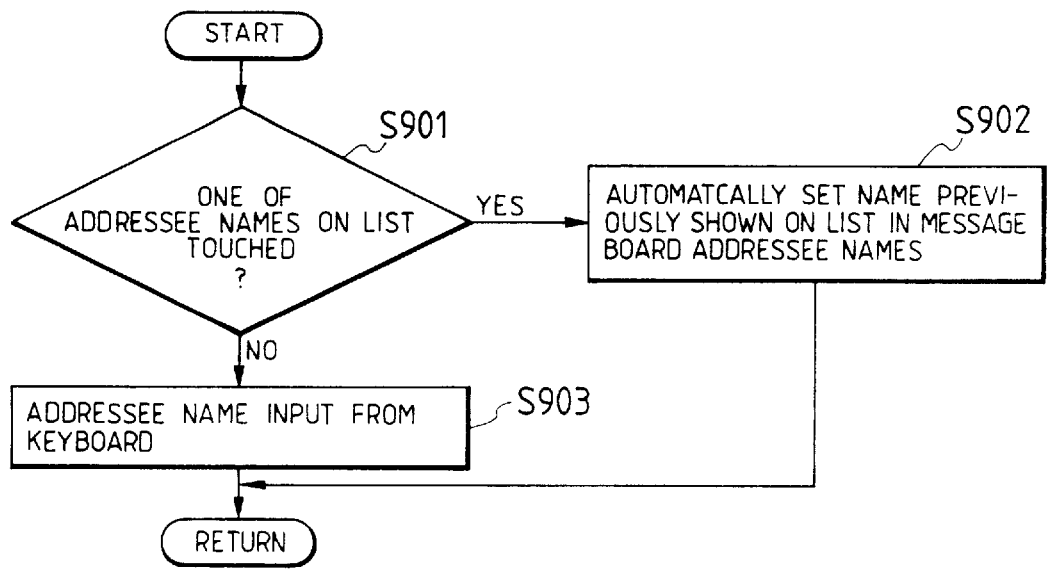
FIG. 9 is a flow chart for explaining a method of setting a name of an addressee (receiver or sendee) in the message board function.
Figure 10:
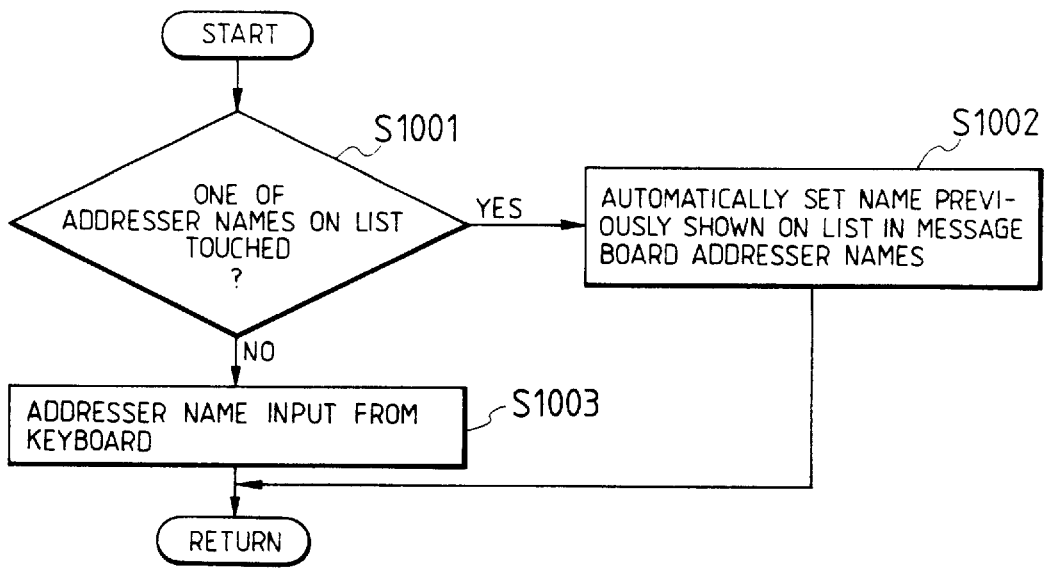
FIG. 10 is a flow chart for explaining a method of setting a name of an addresser (sender) in the message board function.

FIGS. 8 to 10 are flow charts for explaining the message board function.

The message board is used to send a message from one operator to another operator. For example, when an error occurs during facsimile transmission/reception, an error message is signalled to the operator.

FIG. 8 is a schematic flow chart of the message board function. As shown in steps S803 to S807, a name of an addresser and a name of an addressee are designated by a user (operator), and a message is input to register it in the message board. In addition, a message to an operator can be accessed by the operator. The confirmed message can be deleted in steps S809 and S810. Furthermore, the message can be printed at the printer 6 in steps S811 and S812.

As shown in the operations of steps S813 to S816, when the message board is in a full state, all the previous messages can be automatically output at the printer 6 in step S814. The storage area of the message board is cleared in step S815. The present message is then registered and stored as new message data.

When a printed sheet is pasted on the side wall surface of the apparatus, other operators can check the message data deleted from the memory 10.

FIG. 9 is a flow chart showing input processing of names of addressees in the message board function, and FIG. 10 is a flow chart of input processing of addresser names.

If a list of addressers or addressees has already been registered, the user touches this column on the touch panel (steps S901 and S1001). However, when such a list is not registered, an addressee or addresser name can be input from the keyboard 11 by kana-kanji conversion in the same manner as in the message for the message board (steps S903 and S1003).

(Description of Telephone Function (FIGS. 11A to 12B))

FIGS. 11A to 12B are flow charts for explaining the telephone function. This function is started by the manager when an incoming call is detected or the handset 302 is picked up.

When the telephone function is effected, push buttons are displayed on the CRT 2 (step S1101). When numerical buttons are designated or touched on the touch panel 3 in step S1103, the flow advances to step S1106 to output a call signal corresponding to the designated telephone number onto the telephone line to make a call if the handset is picked up (an OFF-hook state is set). The telephone function includes a normal telephone function such as an ON-hook function, redialing, and a holding tone function. The same operations as in the normal telephone set can be performed by the touch panel 3 and the handset 302.

The telephone function also includes a telephone directory function shown in steps S1117 and S1118. By this function, a telephone directory is displayed, and the user touches a destination, i.e., a party to be called, on the telephone directory on the touch panel 3, thereby making a phone call to the desired party.

Figure 11A:
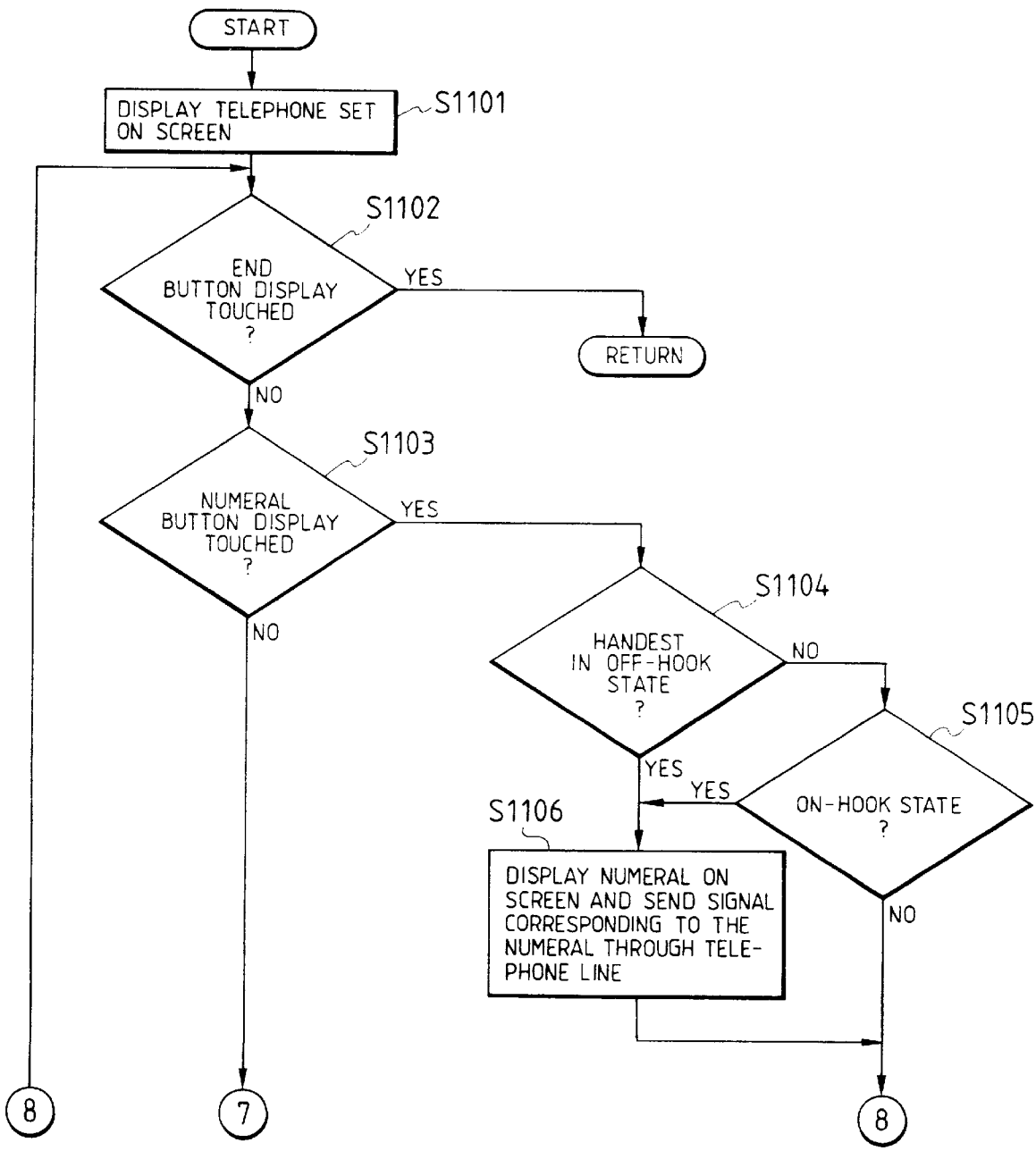
Figure 11B:
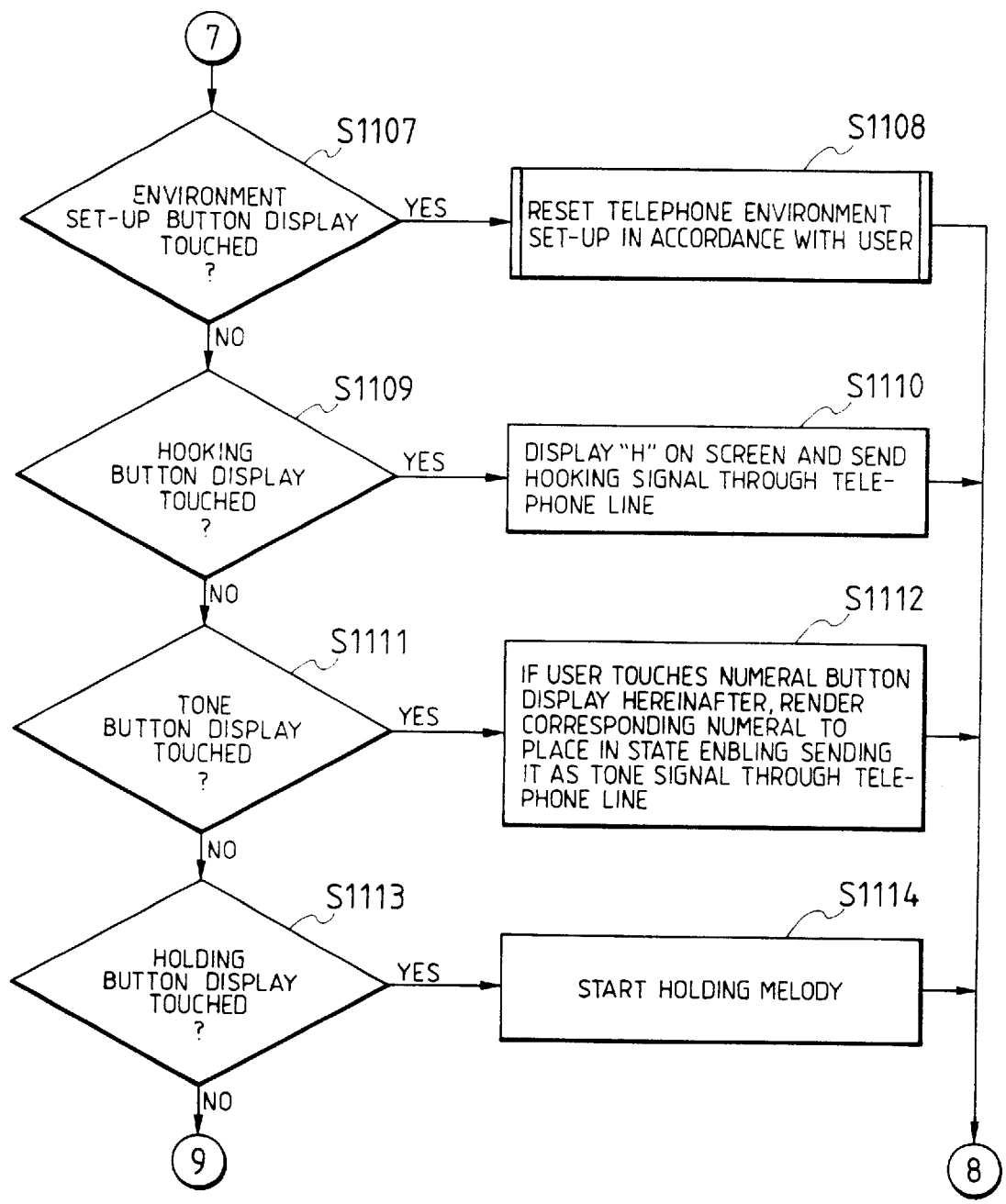
Figure 12A:
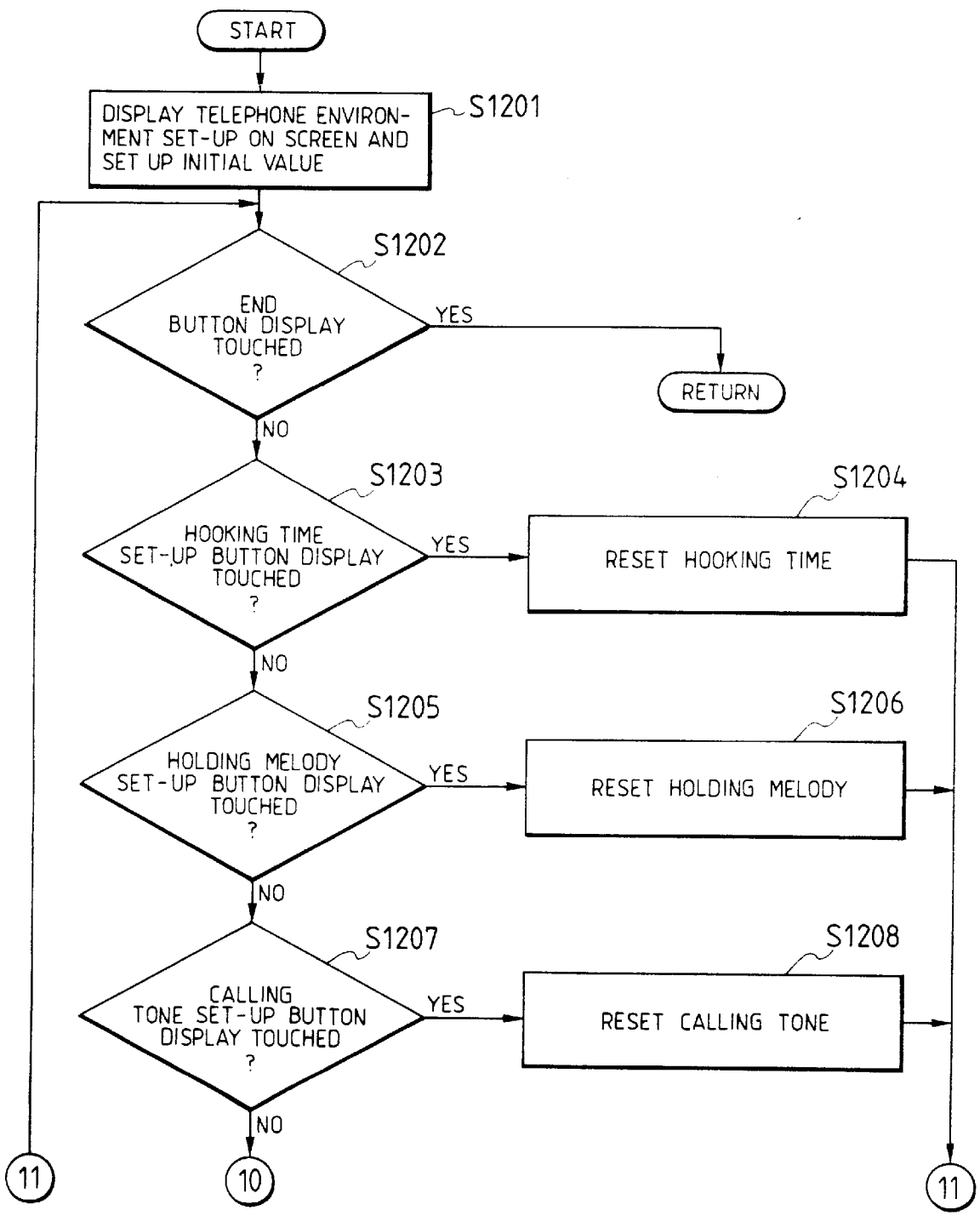
FIGS. 12A and 12B are schematic flow charts of environment set-up processing in the telephone function.
Figure 12B:
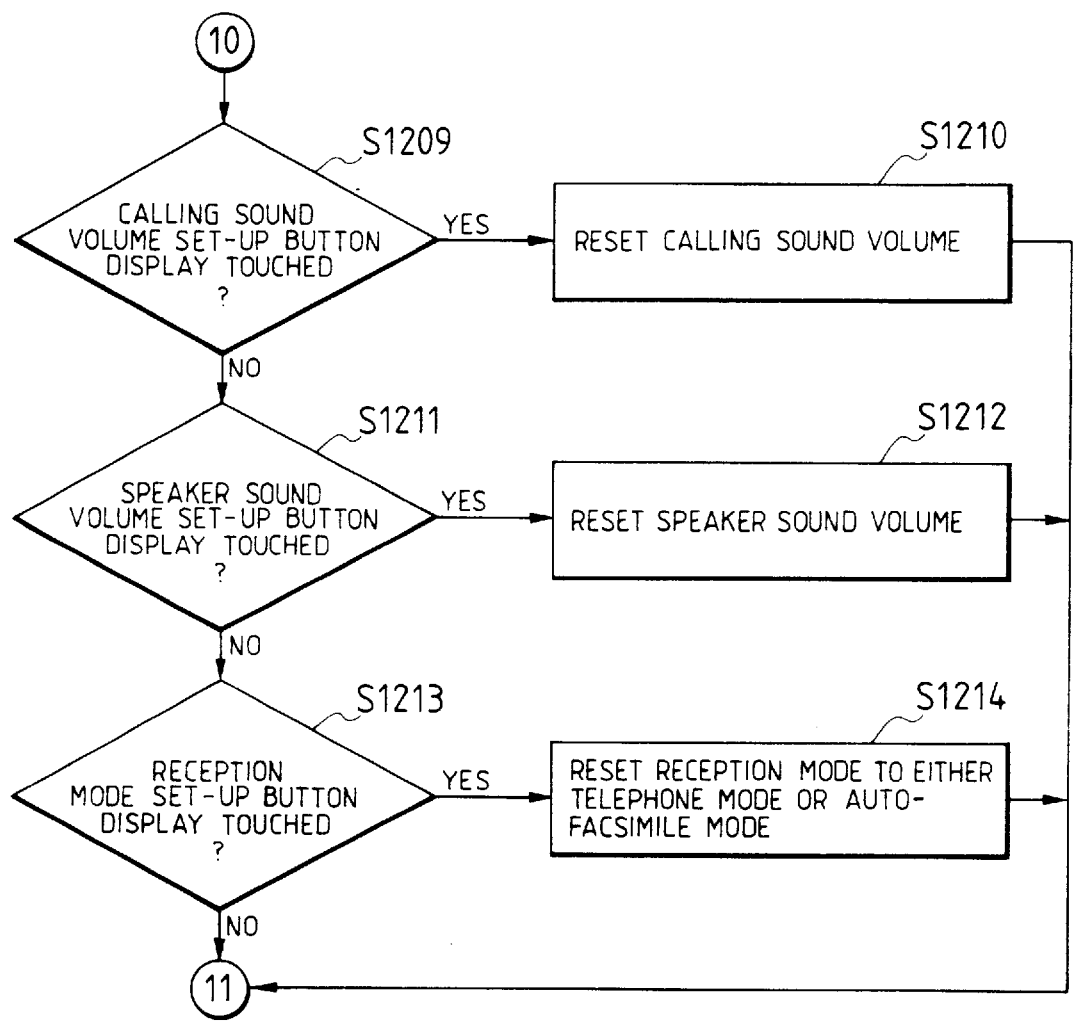
Figure 13A:
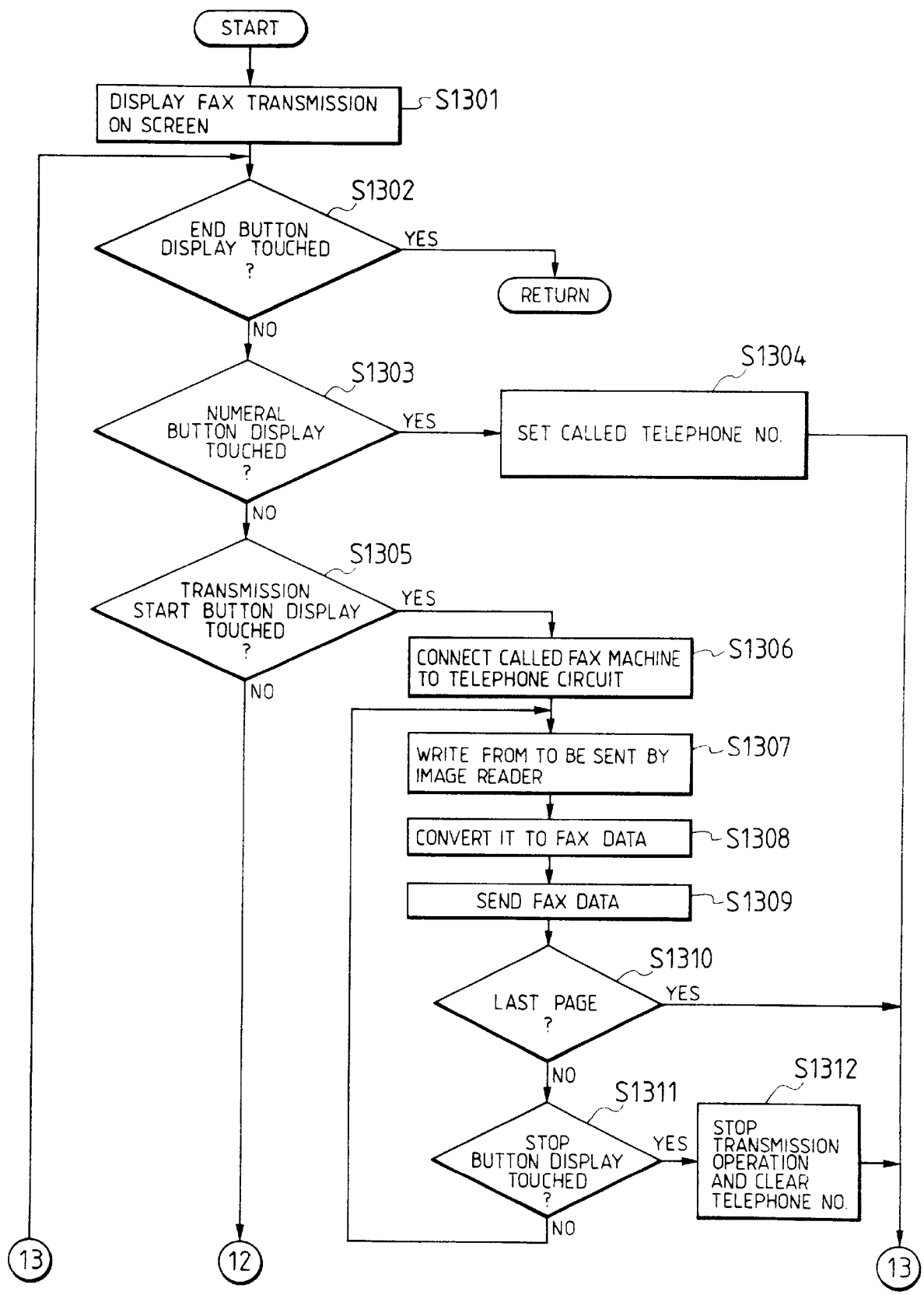
FIGS. 13A and 13B are schematic flow charts of a facsimile transmission function.
Figure 13B:
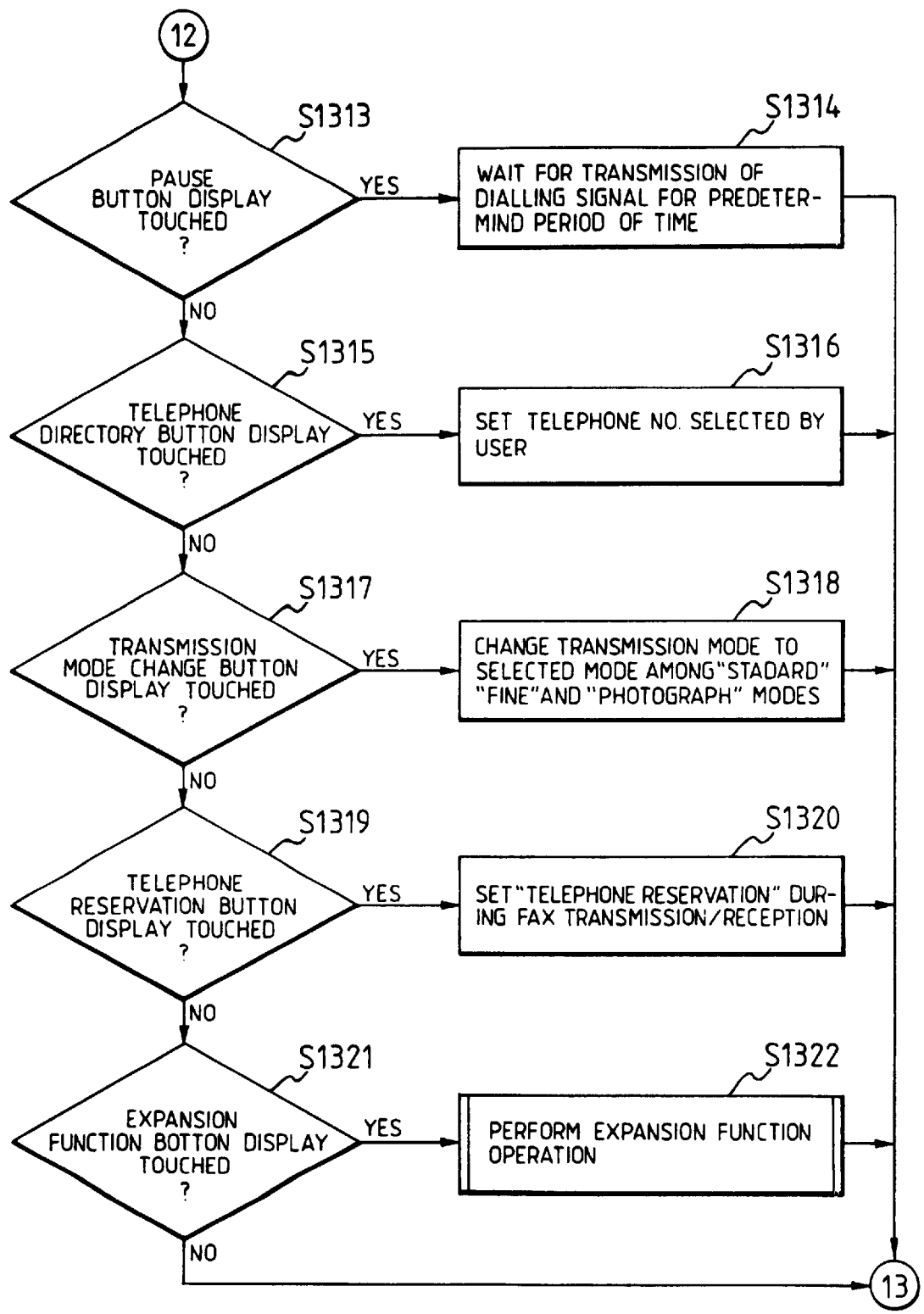

FIGS. 12A and 12B are flow charts for explaining environment set-up (step S77) in the telephone function of FIGS. 11A to 11C.

This environment set-up includes setting (steps S1203 and S1204) of a hooking time, setting (steps S1205 and S1206) of a holding tone melody, setting (steps S1207 and S1208) of a call tone color of a telephone set, setting (steps S1209 and S1210) of a call tone volume of the telephone set, setting (steps S1211 and S1212) of volume of the speaker, and setting (S1213 and S1214) of a reception mode of an auto facsimile mode).

(Description of Facsimile Transmission/Reception Function (FIGS. 13A to 18))

FIGS. 13A to 18 are flow charts for explaining the facsimile transmission/reception function in the apparatus. This function is started by the manager upon reception/ transmission designation (including timer transmission) of the facsimile signal.

In the facsimile transmission mode, an original is read by the image reader 7 and converted into a facsimile signal which is then transmitted (steps S1305 to S1310). A called telephone number in the transmission mode may be input as numerical values or designated by a telephone directory in the same manner as in the telephone function (steps S1315 and S1316).

The facsimile transmission functions include functions assigned to the normal facsimile machine, e.g., multi-address transmission, timer transmission, "confidential" transmission, polling transmission, and setting of a transmission mode to a standard, fine, or photographic mode.

The above functions are known to those skilled in the art, and a description thereof is limited to that in the flow charts.

Figure 14A:
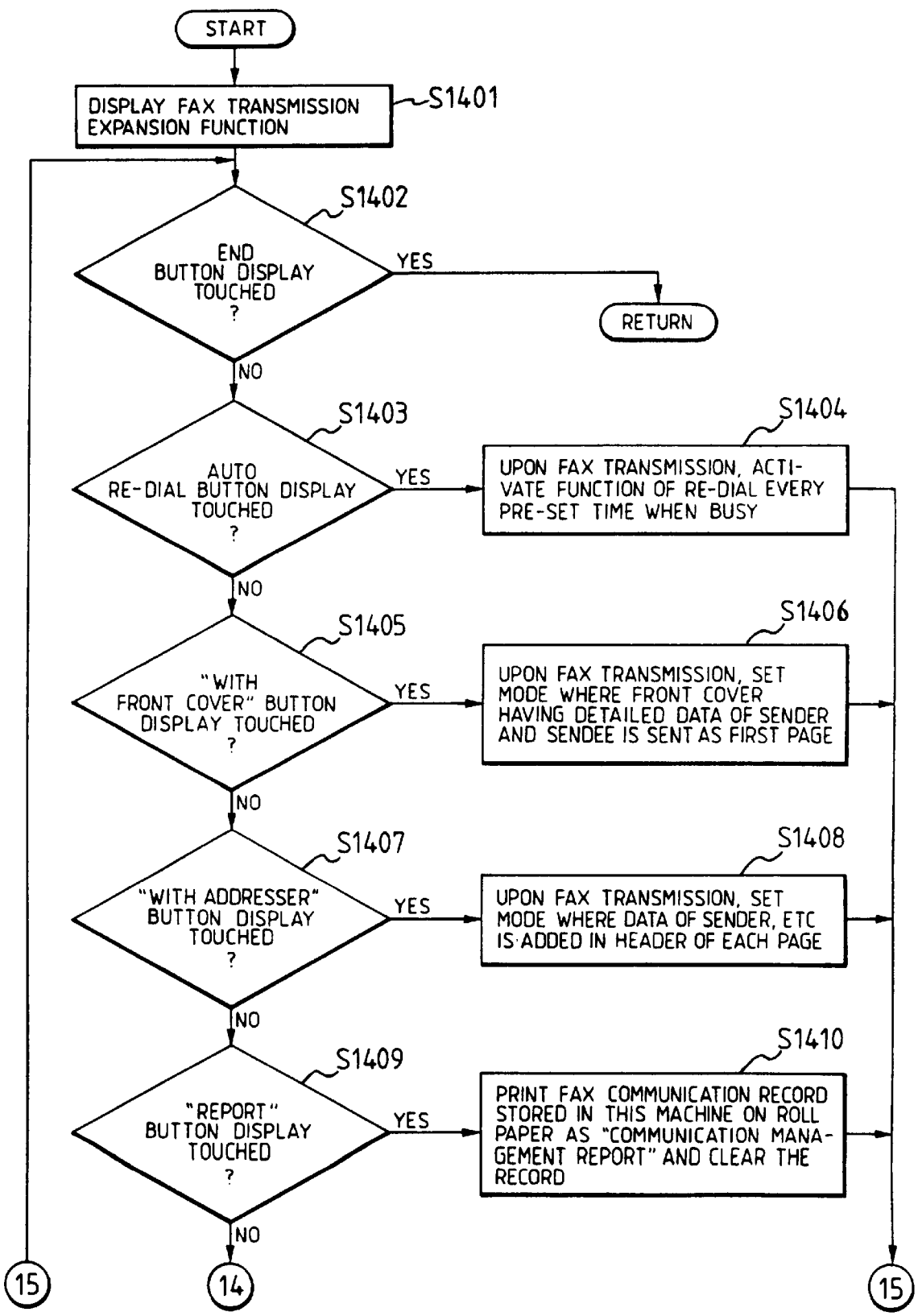
FIGS. 14A and 14B are schematic flow charts for explaining an expansion function operation in the facsimile transmission function.
Figure 14B:
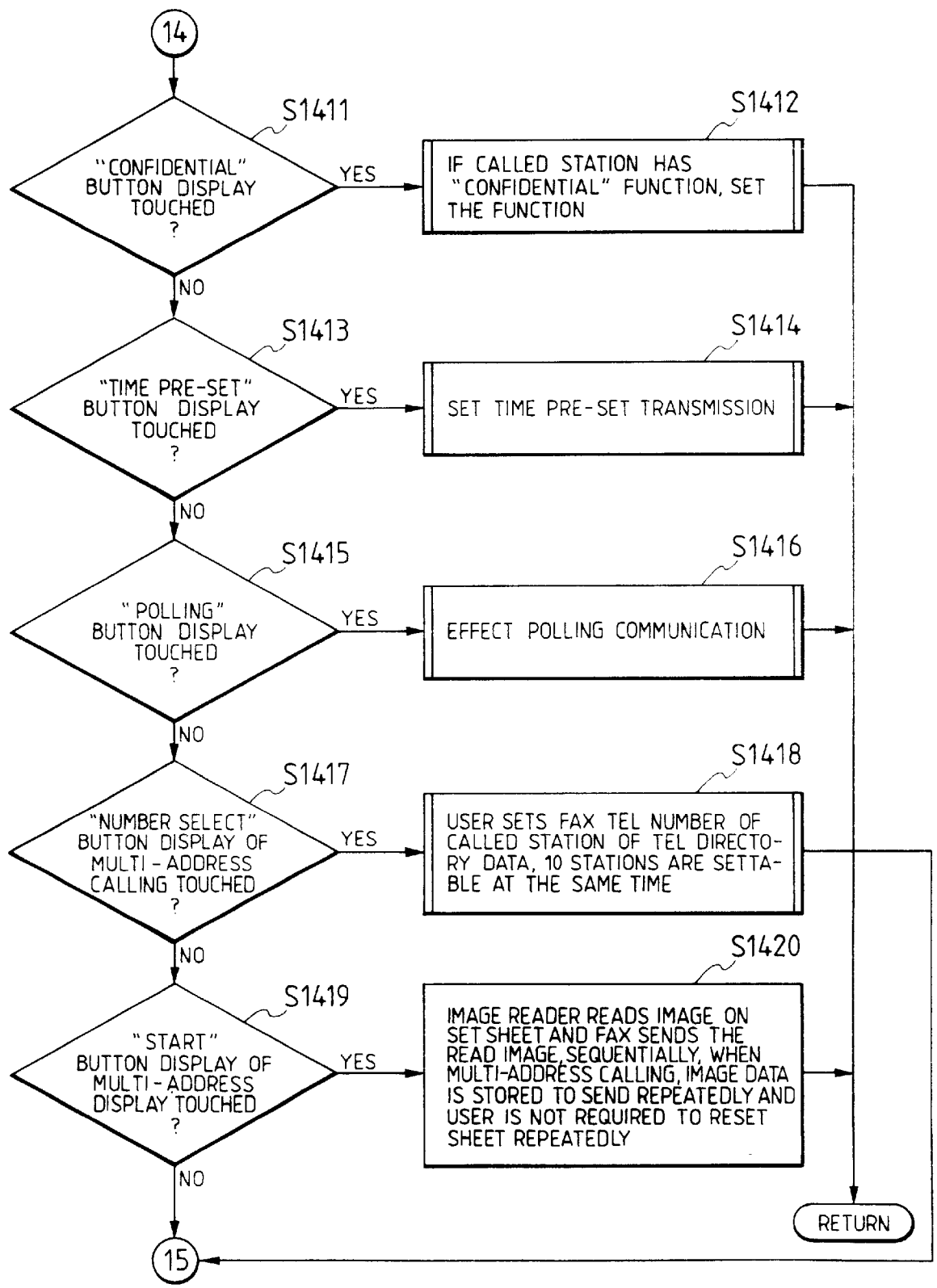

FIGS. 14A and 14B are flow charts for setting an expansion function in the facsimile transmission function.

In the operations of FIGS. 14A and 14B, an auto redialing function (steps S1403 and S1404), a function (step S1405 and S1406) for attaching a cover filled with names of a destination and a transmission source to the first page of the transmission original, a function (steps S1407 and S1408) of filling transmission source information at the upper portion of each page, and a report function (steps S1409 and S1410) can be effected.

Figure 15:
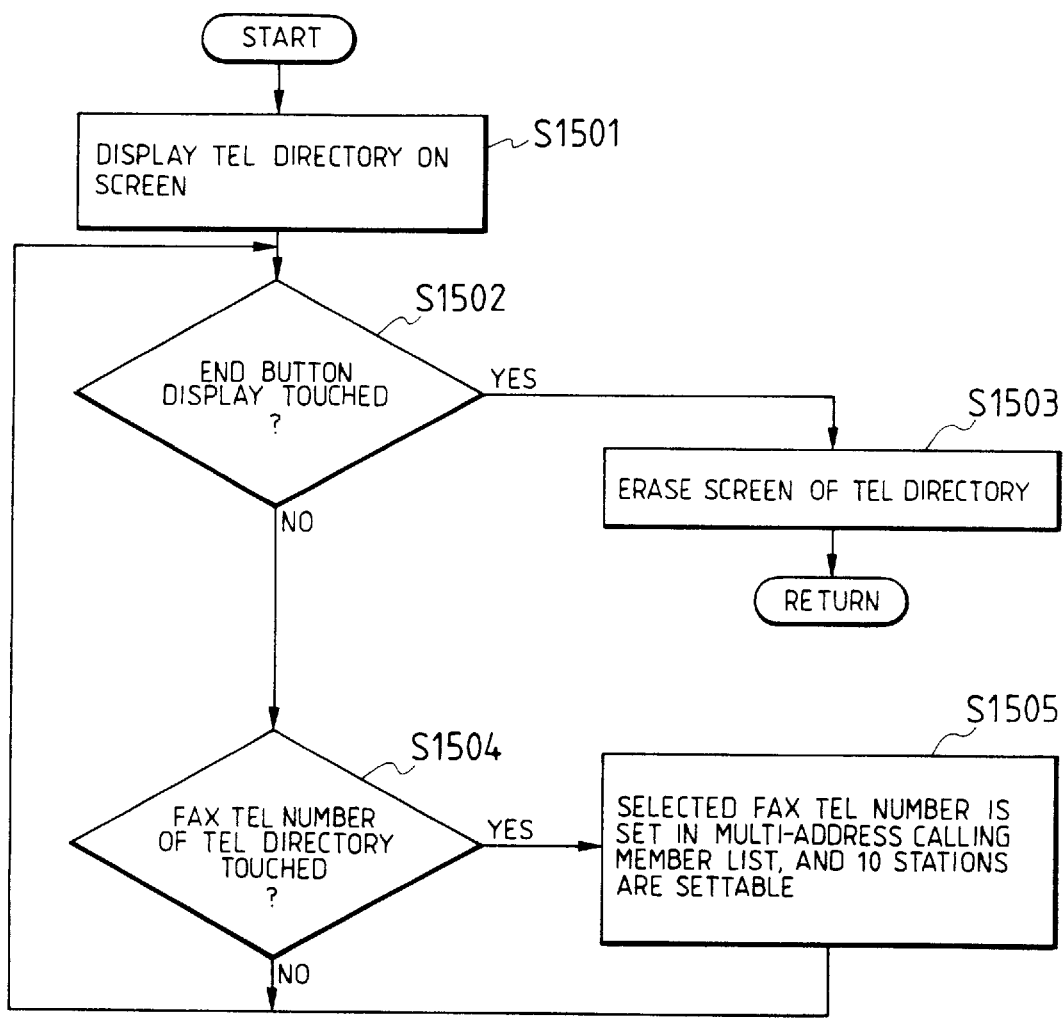
FIG. 15 is a schematic flow chart for member selection of the expansion function in the facsimile transmission function.
Figure 16:
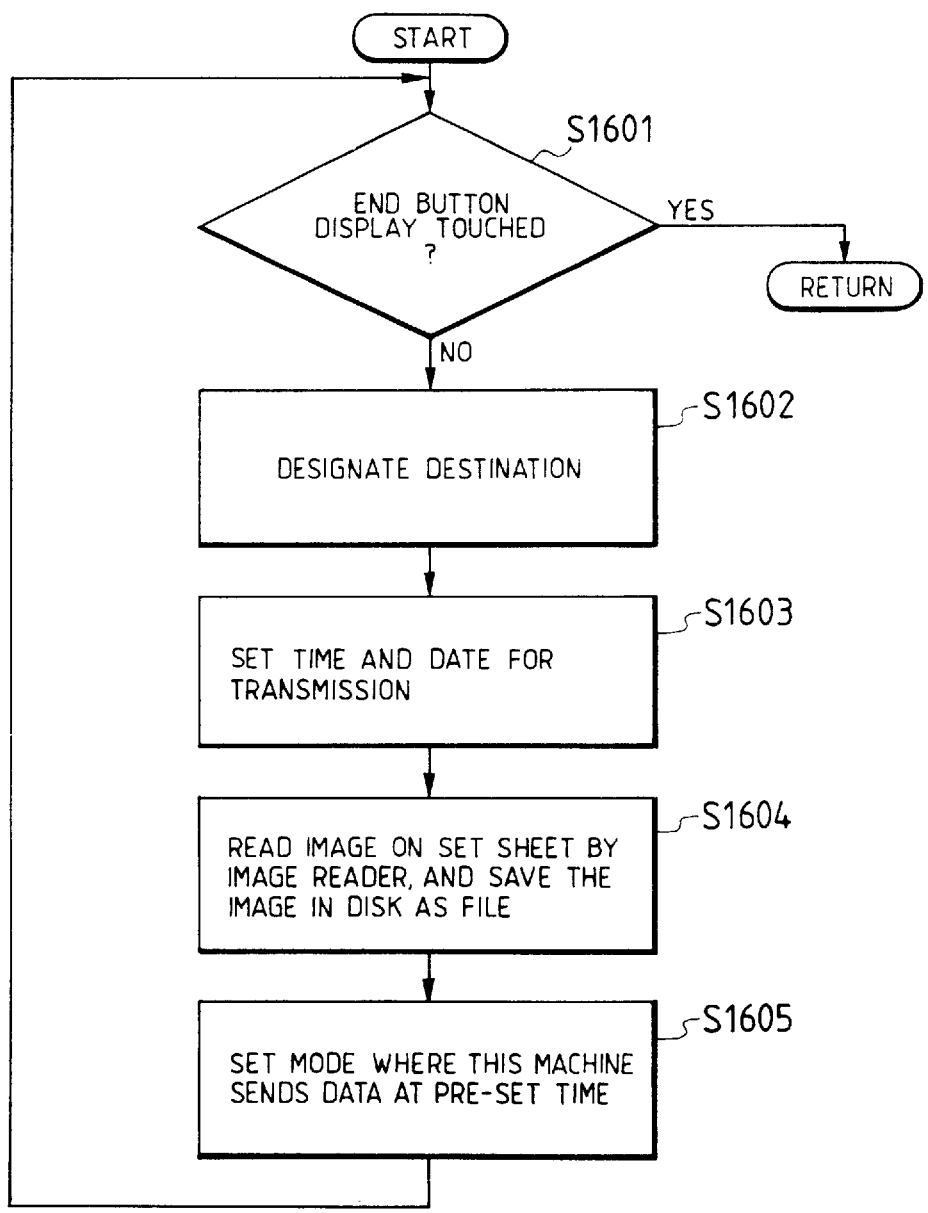
FIG. 16 is a schematic flow chart of pre-set time transmission of the expansion function in the facsimile transmission function.
Figure 17:
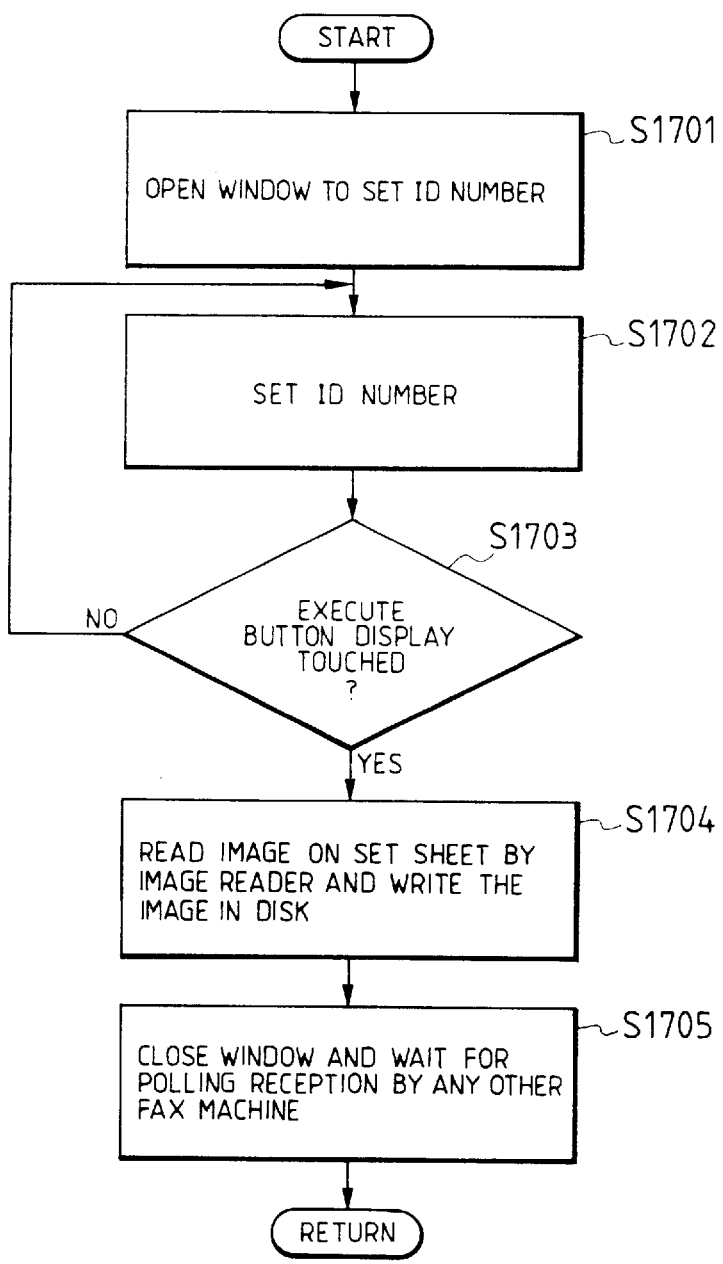
FIG. 17 is a schematic flow chart of a polling transmission function of the expansion function in the facsimile transmission function.

FIG. 15 is a flow chart of processing for selecting multi-address members in the multi-address transmission mode, FIG. 16 is a flow chart of pre-set time transmission (timer transmission), and FIG. 17 is a flow chart of polling transmission. These operations are known to those skilled in the art, and a description thereof will be omitted.

Figure 18:
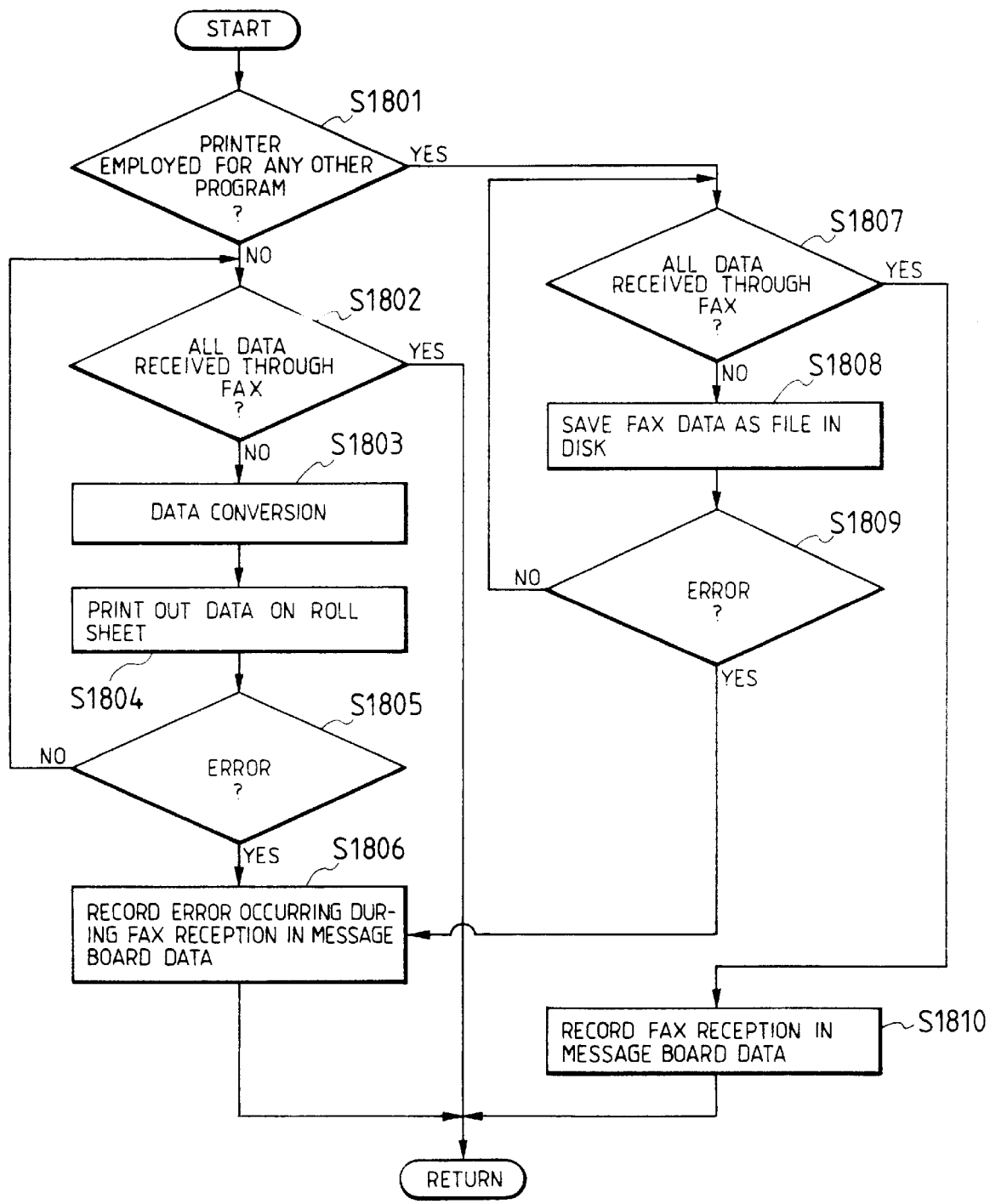
FIG. 18 is a schematic flow chart of a facsimile reception function.

FIG. 18 is a flow chart of reception processing of the facsimile signal. When a facsimile signal is received, whether a line printer of the printer 6 is used is determined in step S1801. If NO in step S1801, a facsimile reception image is printed on rolled heat-sensitive paper in steps S1802 to S1805. When a reception error is detected in step S1805, generation of the facsimile reception error is recorded on the message board in step S1806.

When use of the line printer by another program is detected in step S1801, facsimile reception data is stored in a file in a disk of the external memory 12 in steps S1807 to S1809. When reception is completed, the flow advances to step S1810. In this step, reception is recorded on the message board. The data written on the message board is displayed at the upper right corner on the CRT screen. If a reception error is detected in step S1809, the flow advances to step S1806, and an error message is recorded on the message board.

Since this facsimile function is operated in a background mode, document information can be input by the wordprocessor function during reception of the facsimile signal.

(Description of Wordprocessor Function)

Figure 19A:
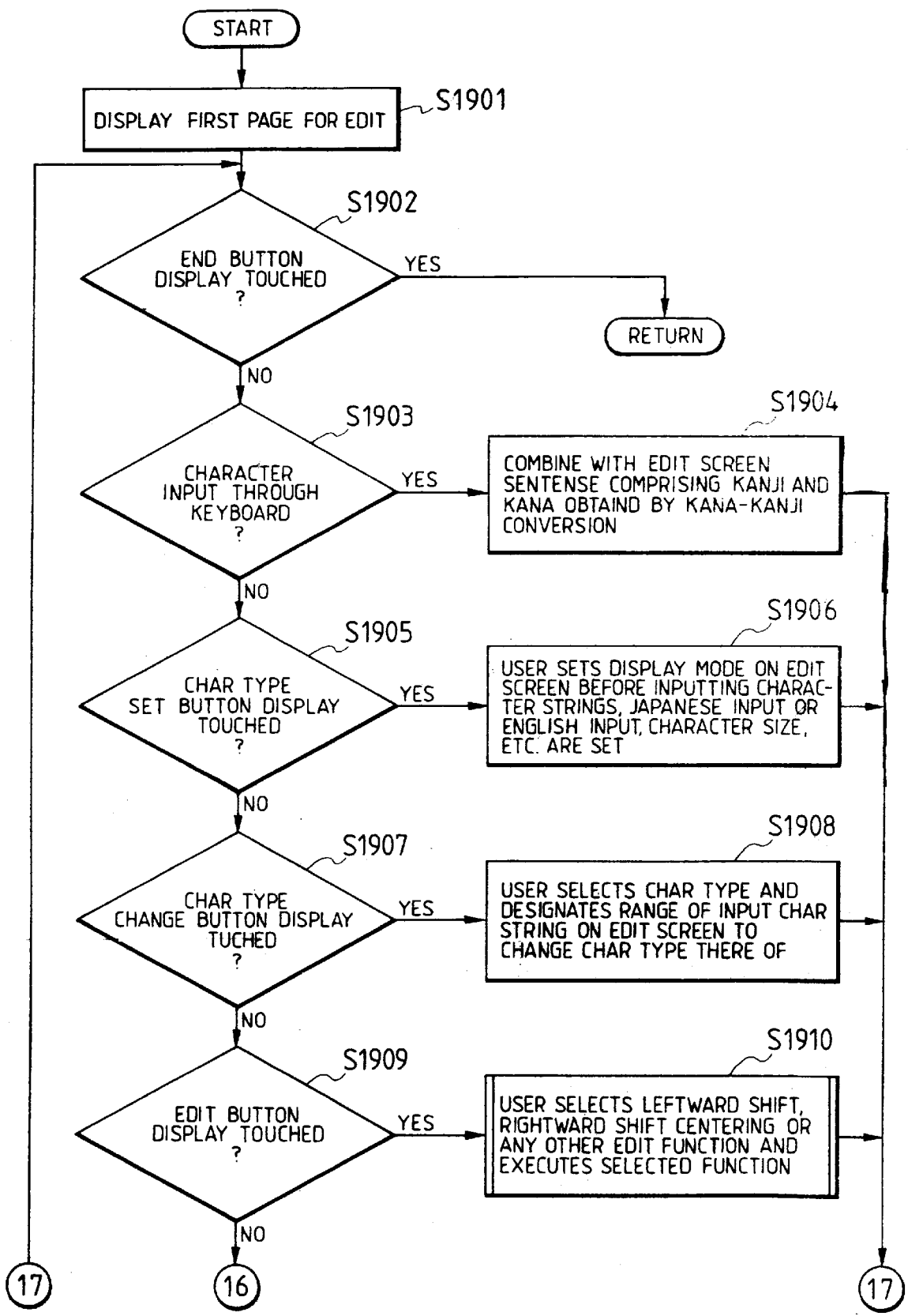
FIGS. 19A and 19B are schematic flow charts of a wordprocessor function.
Figure 19B:
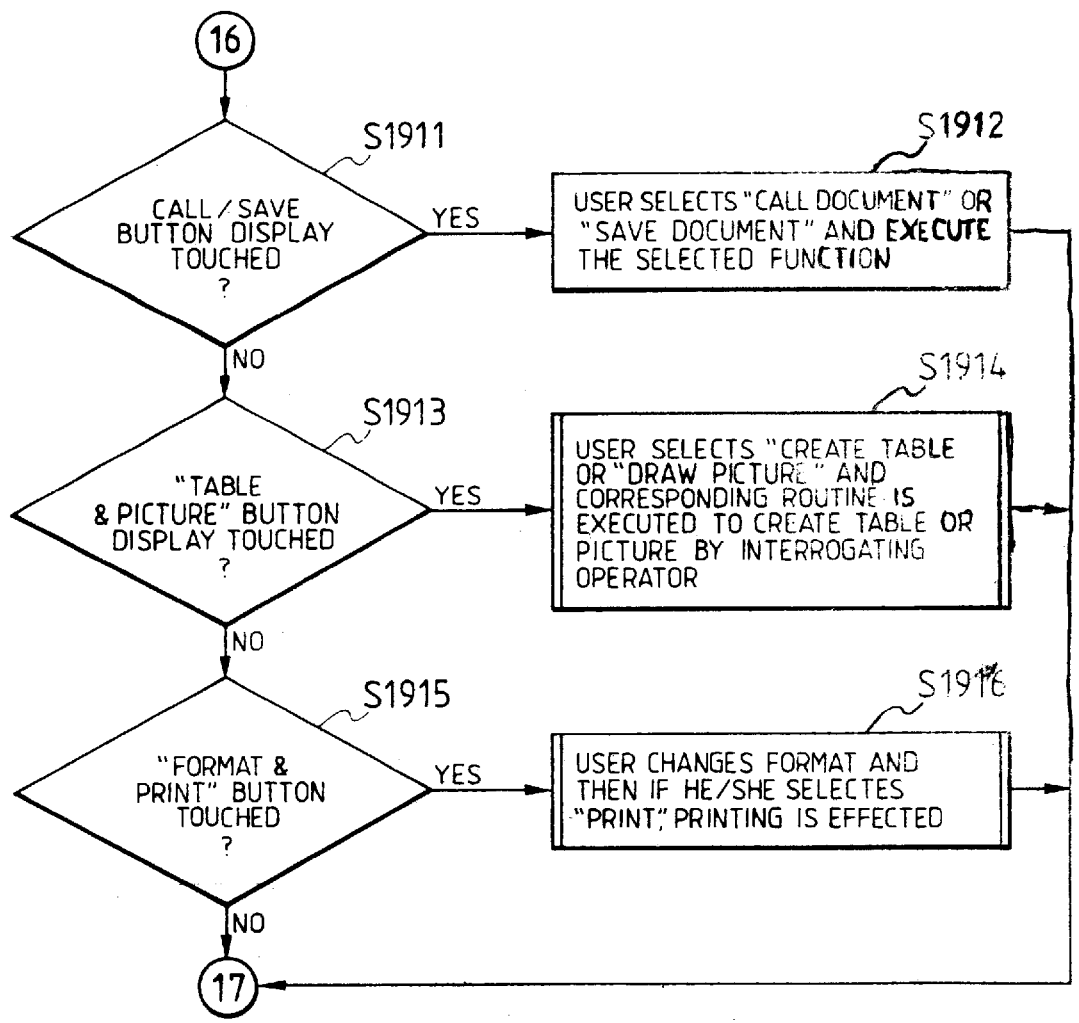

FIGS. 19A and 19B are schematic flow charts of the wordprocessor function. This function program is started upon designation in main menu on the touch panel 3.

In steps S1903 and 1904, a character code input from the keyboard is converted by kana-kanji conversion to generate a sentence including both kana and kanji characters. In steps S1905 and S1906, initialization prior to character string inputs is performed. That is, a display mode of an edit screen at the time of document inputs and an input mode are initially set. In steps S1907 and S1908, the type of character is selected, and a range of character string on the edit screen is designated to change the type of character of the character string within the designated range.

When an edit button display is touched in steps S1909 and S1910, editing such as leftward shift, rightward shift, or centering is executed. In steps S1911 and S1912, storage and read access of the document information are performed. In steps S1913 and S1914, a table and a picture are formed. In steps S1915 and S1916, a format is changed and printing is performed.

Figure 20A:
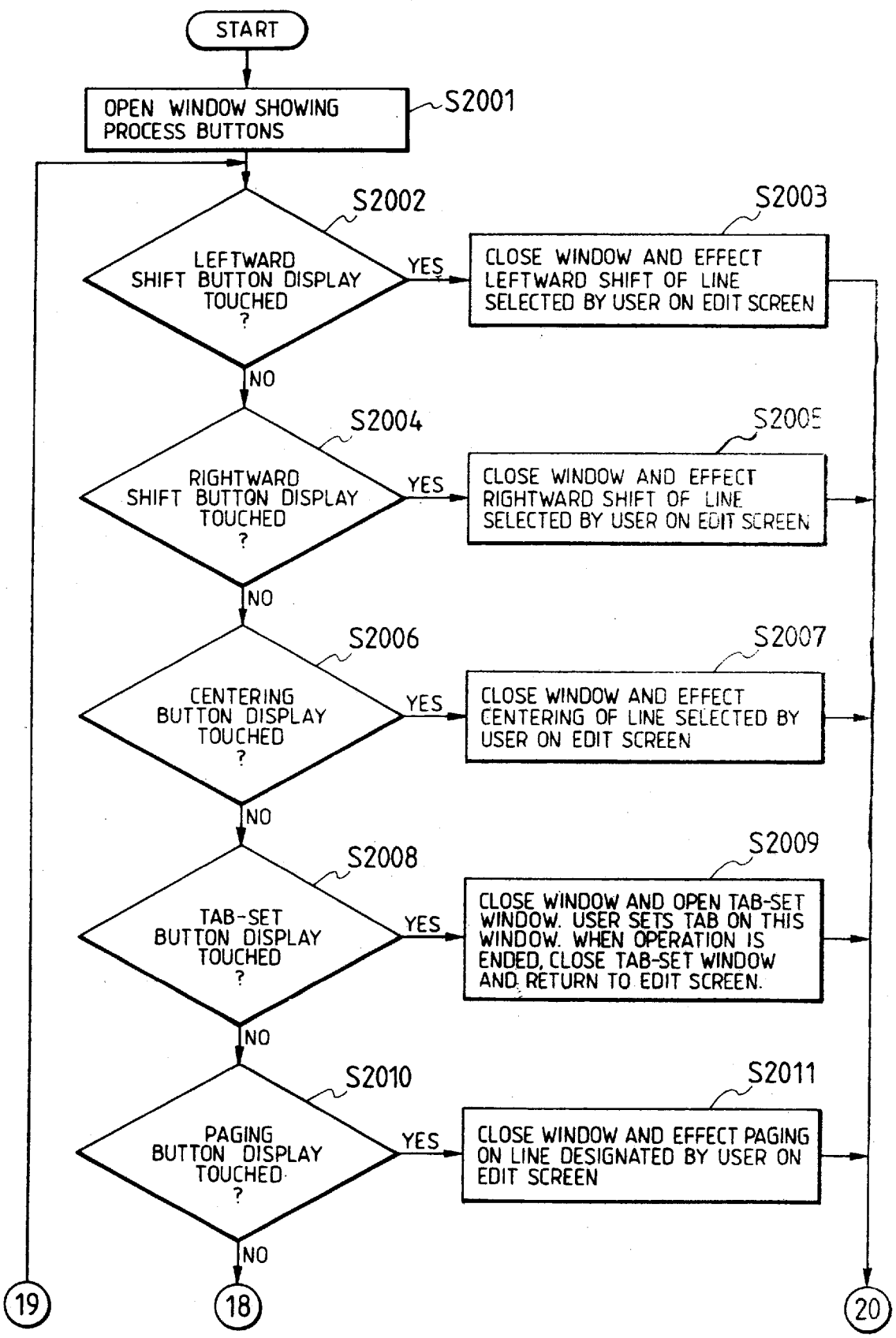
FIGS. 20A and 20B are schematic flow charts of an editing function in the wordprocessor function.
Figure 20B:
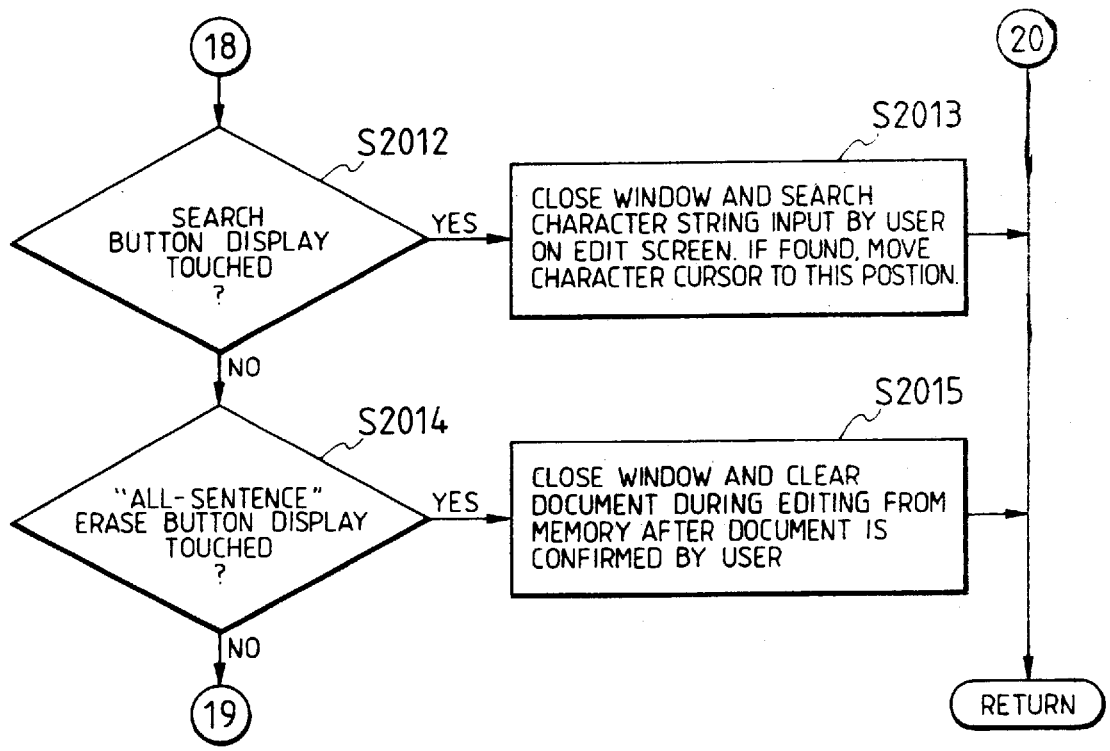

FIGS. 20A and 20B are schematic flow charts of editing processing in step S1910 in FIG. 19A.

In FIGS. 20A and 20B, editing operation, i.e., leftward shift, rightward shift, centering, tab-set, page feed, character search, all-sentence delete operations of designated lines are performed.

Figure 21:
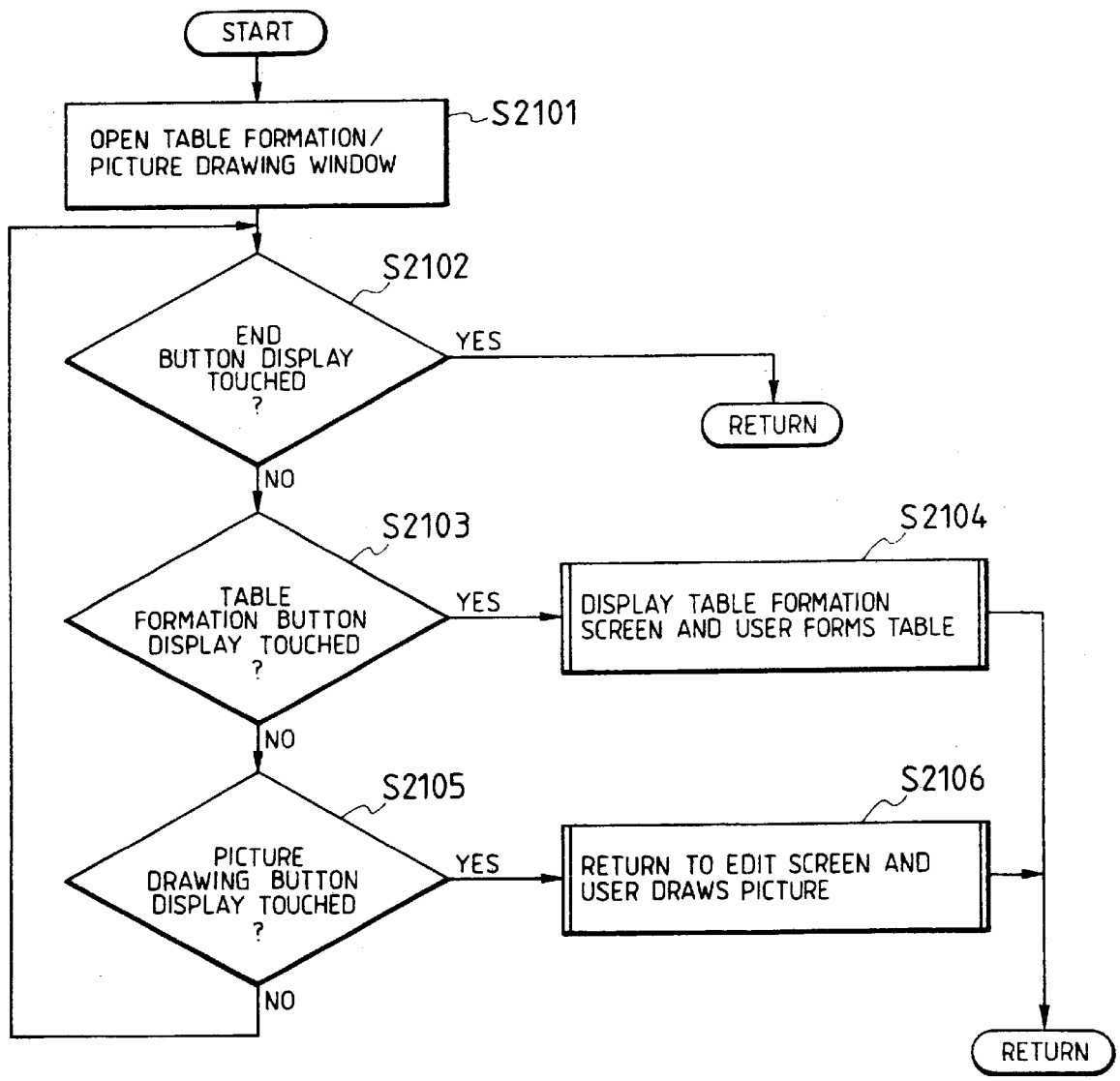
FIG. 21 is a schematic flow chart for an operation for forming a table and a picture in the wordprocessor function.
Figure 22A:
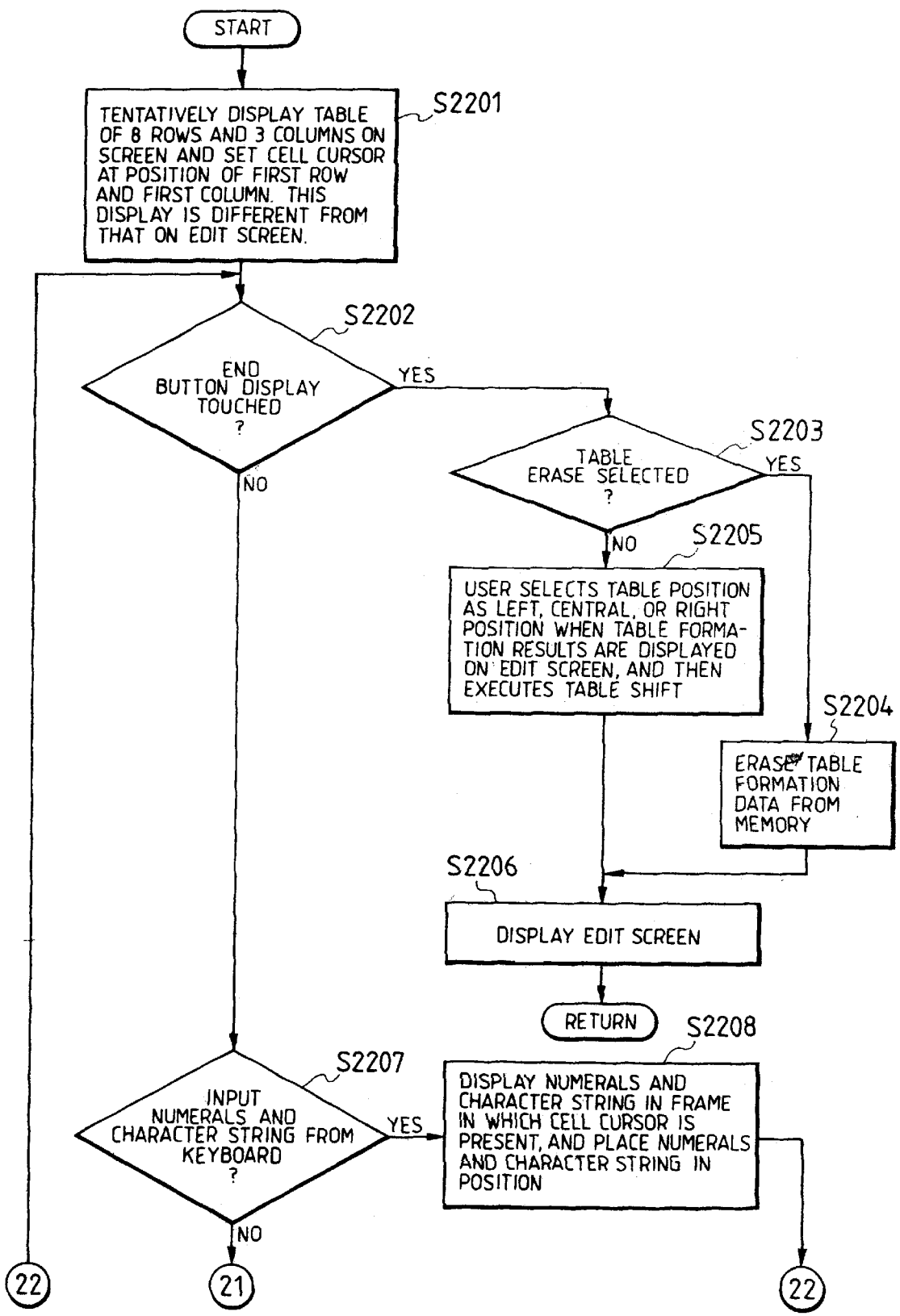
FIGS. 22A to 22C are schematic flow charts of table formation processing in the wordprocessor function.
Figure 22B:
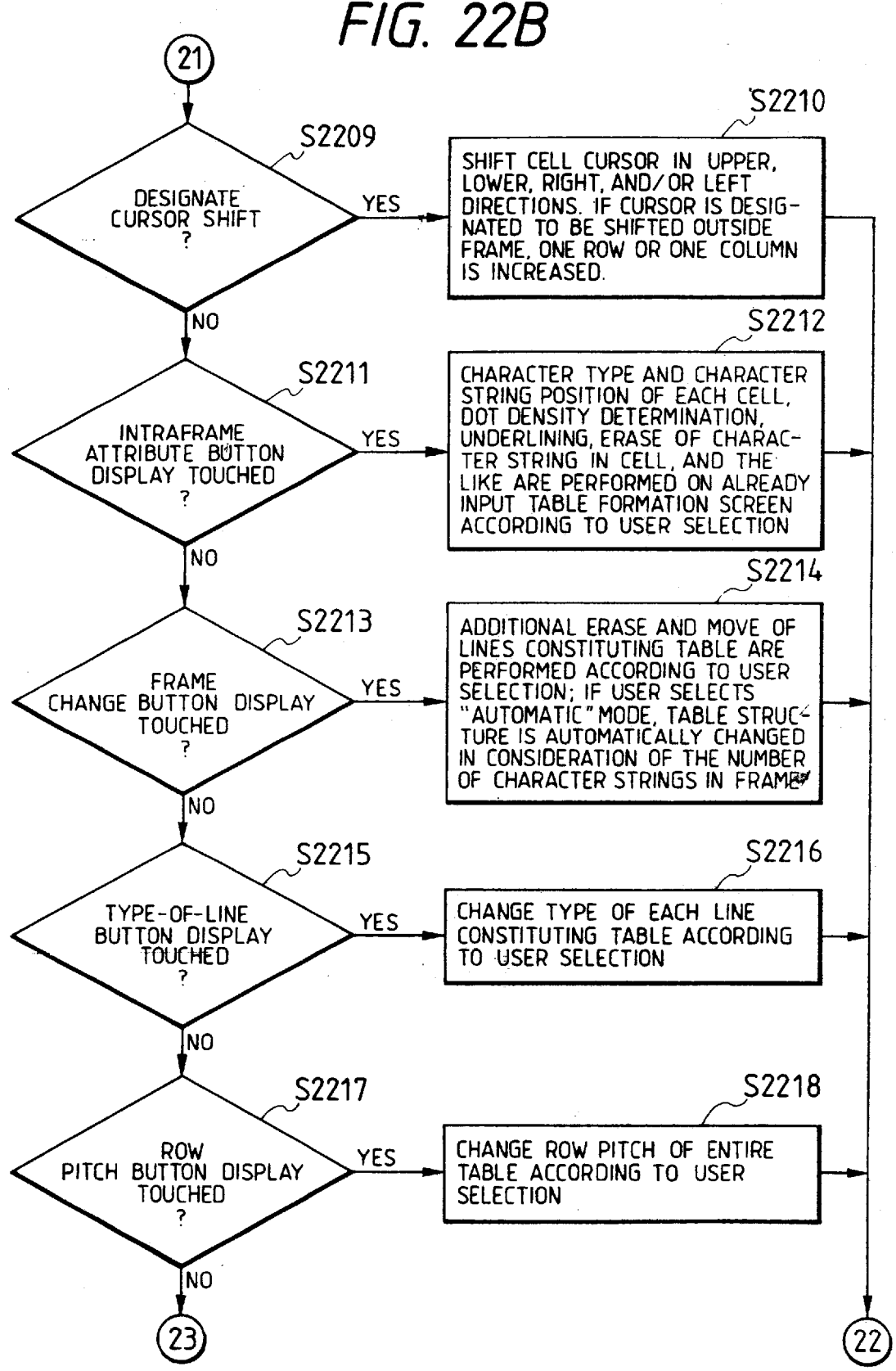
Figure 22C:
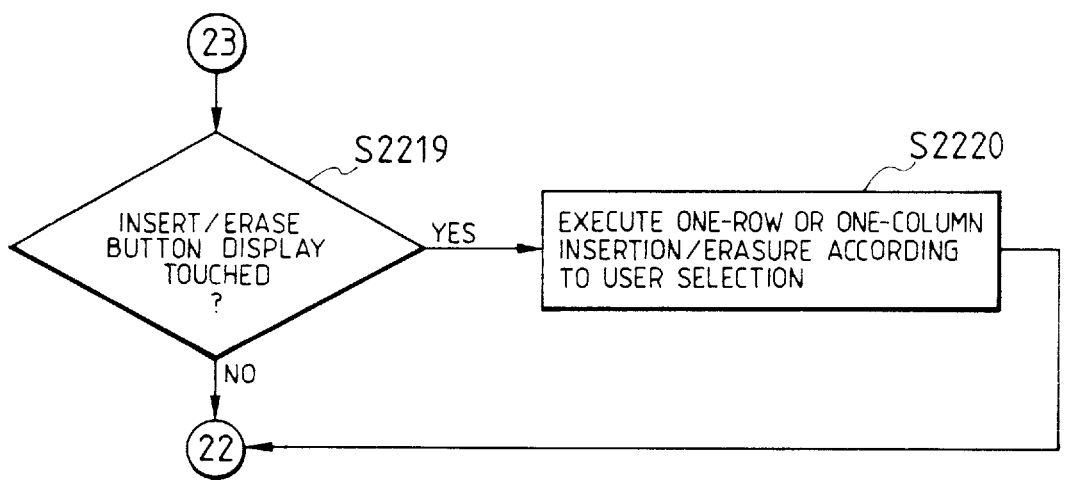
Figure 23:
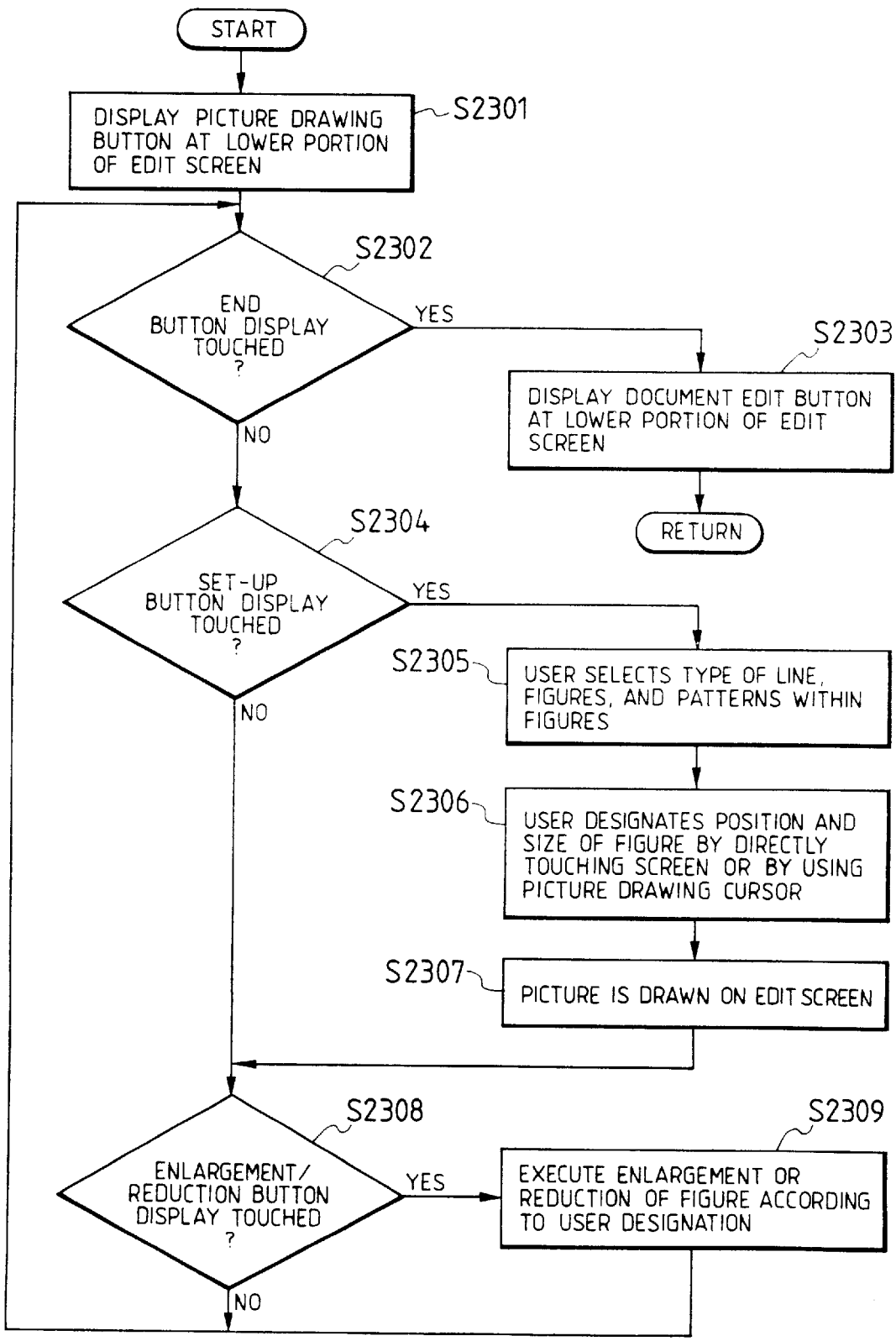
FIG. 23 is a schematic flow chart of picture drawing processing in the wordprocessor function.

FIG. 21 is a flow chart for table formation and picture drawing processing in step S1914 (FIG. 19B), FIGS. 22A to 22C are flow charts of table formation processing, and FIG. 23 is a schematic flow chart of picture drawing processing.

When table formation processing in FIGS. 22A to 22C is started, a table of 8 rows and 3 columns is tentatively displayed on the screen, and the cell cursor is moved to a position of the first row and the first column (step S2201). Thereafter, table data are generated (steps S2207 to S2220) in accordance with a change in table position, a character or numeral input to a position designated by the cell cursor, a change in the type of character of each cell, a change in frame, a change in the type of line of the frame, a change in line pitch, and the like.

FIG. 23 is a flow chart of picture drawing processing. The type of line of a picture, a figure (graphic data), a graphic pattern within a figure are selected. The position, size, shape, and the like of the figure are designated on the touch panel 3 or by a picture drawing cursor. In addition, expansion or reduction of the designated figure can be performed.

Figure 24B:
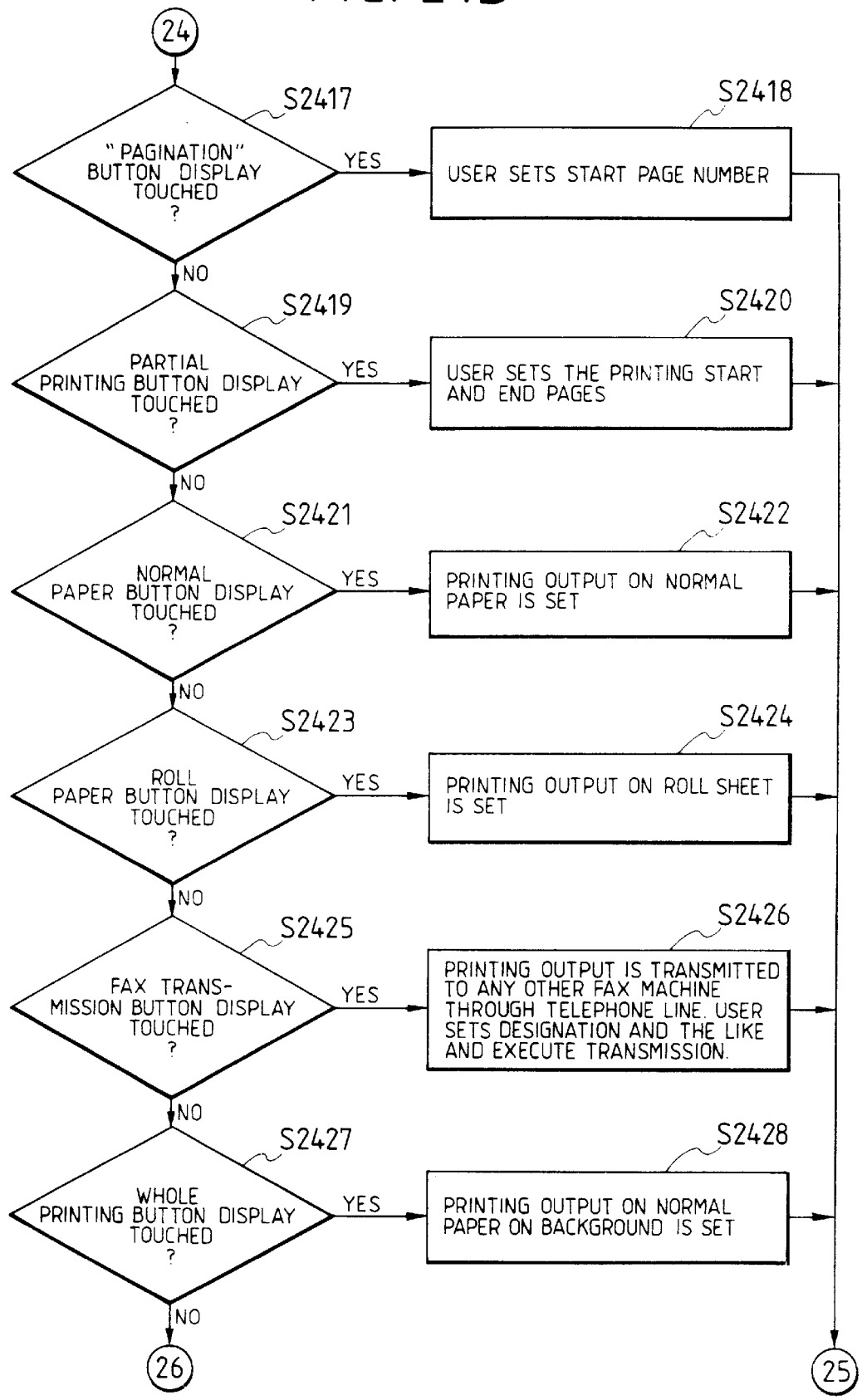
Figure 24C:
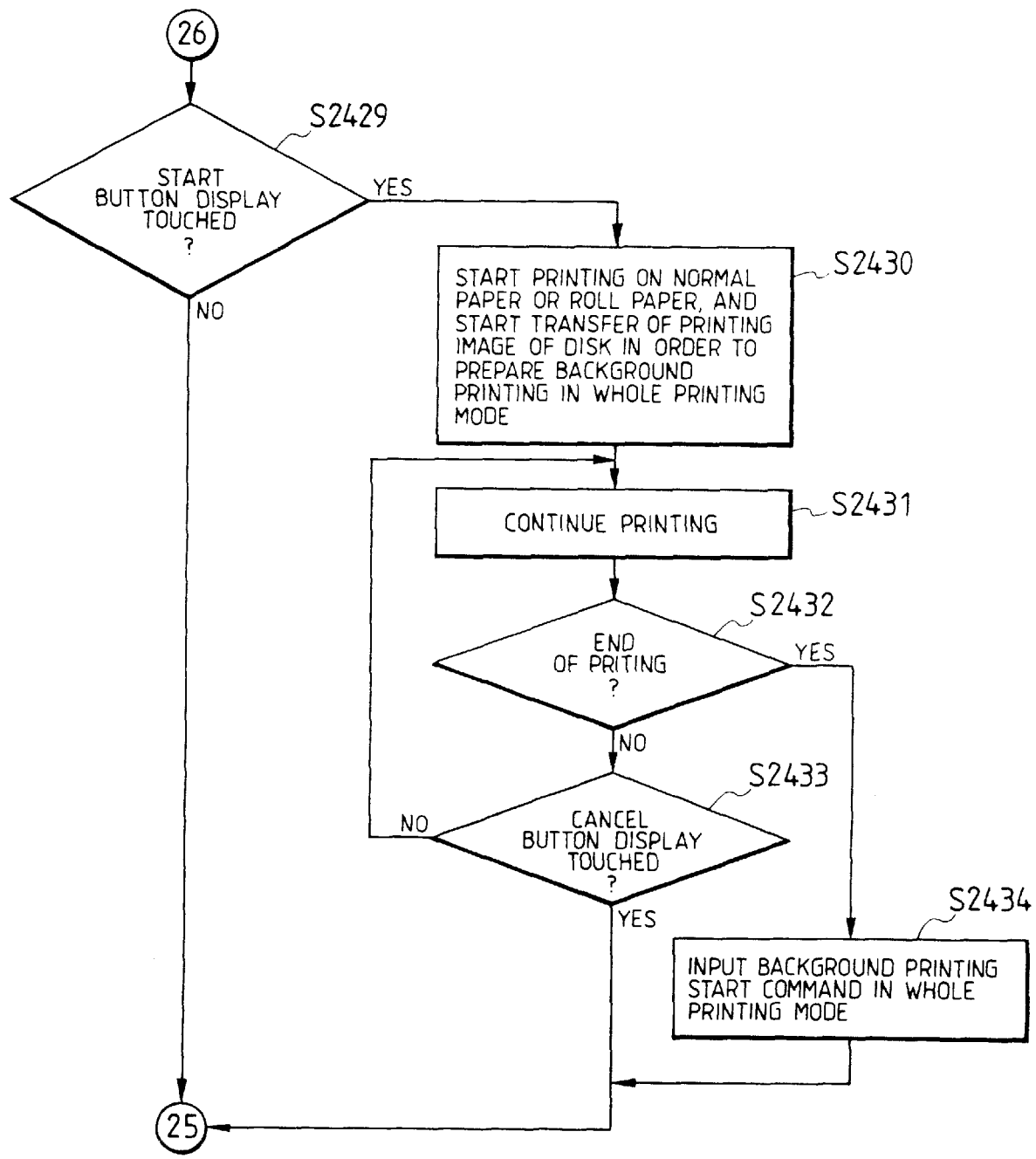

FIGS. 24A to 24C are schematic flow charts of format setting and printing processing in step S1916 of FIG. 19B.

A page for format setting is designated. A sheet size, a printing position, and the number of characters/lines are set. In addition, a vertical or horizontal layout format and the like are input. A layout screen is changed by the above pieces of information. Partial printing and printing with pages can also be designated.

Since the printer 6 includes two printers as a main feature of the apparatus of this embodiment, these two printers can be selectively used. The printing function of the information processing apparatus of this embodiment allows printing at another facsimile machine through a telephone line, and a document input while printing is performed on normal paper at the thermal transfer printer.

(Description of Touch Panel Cleaning Function (FIG. 25))

Figure 25:
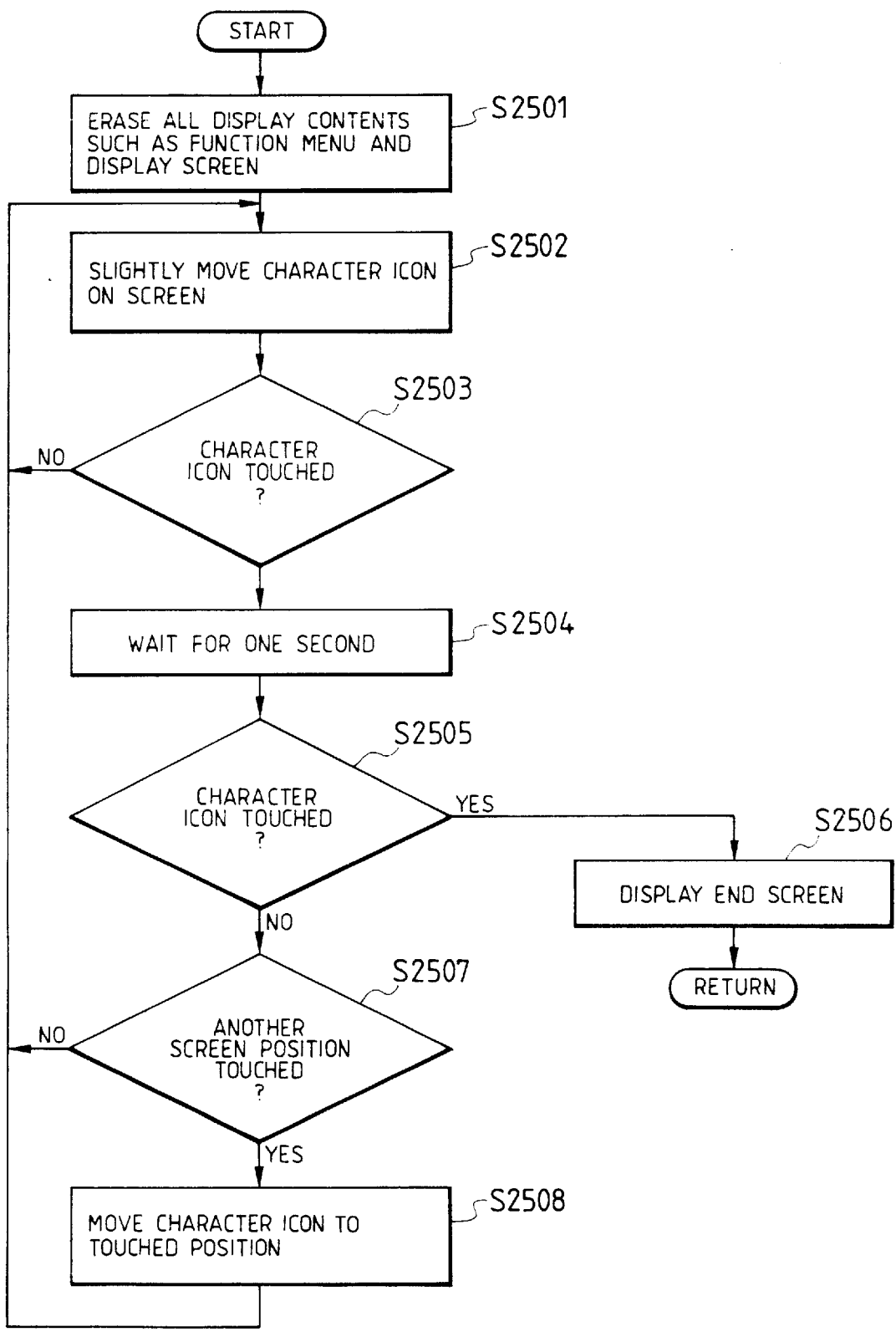
FIG. 25 is a schematic flow chart of a cleaning function of a touch panel.

FIG. 25 is a flow chart showing processing of a cleaning mode of the touch panel 3. This function is effected upon designation in the main menu.

Since the touch panel 3 is touched by a hand of an operator, fingerprints and the like are attached to the surface of the touch panel 3 to contaminate the surface. When an operator wipes the surface of the touch panel 3 with a cloth, a function input is made by a pressure acting on the touch panel 3 against the will of the operator. In order to prevent such an erroneous input in the information processing apparatus of this embodiment, when a cleaning mode is designated, an icon of a doll is displayed on the screen and is moved on the screen. Inputs on the touch panel 3 except for this icon are neglected, and therefore, an erroneous input during cleaning of the touch panel 3 can be prevented.

When the cleaning mode is designated in FIG. 25, an initial screen from which the function menu is entirely erased is displayed (step S1501). The icon of a doll is displayed on the screen and is slightly moved on the screen in one direction (step S1502). When the icon is touched by the operator, it is stopped for one second (step S2504). When the icon is touched again, the cleaning mode is ended (step S2506). However, when the icon is touched once and another position on the screen is touched by the operator (step S2507), the icon is moved to this position and is displayed (step S2508). In this manner, the cleaning mode is not ended and the icon continues to be moved on the screen until an icon position is consecutively touched twice.

(Description of Program Control Function (FIG. 26))

Figure 26:
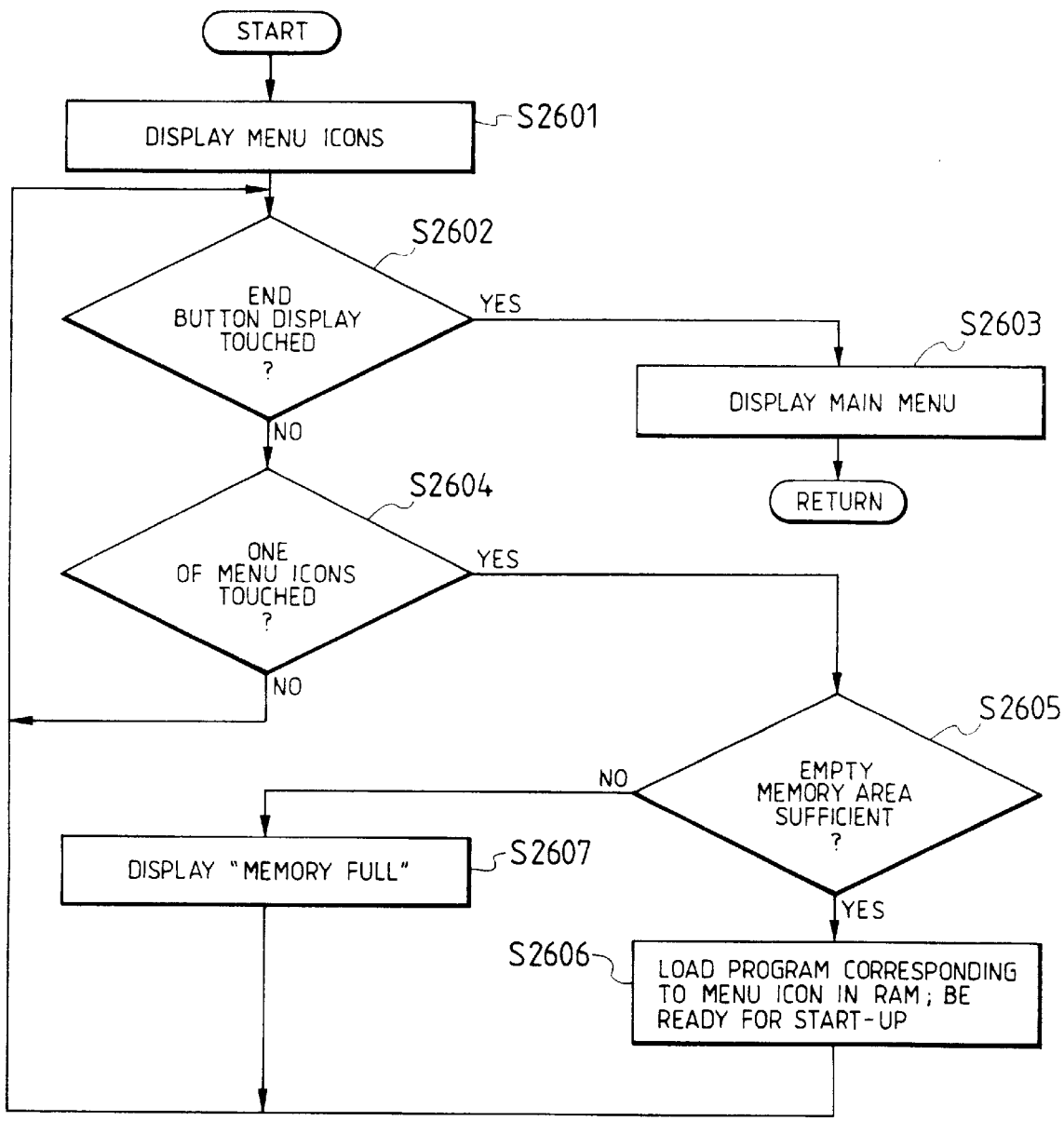
FIG. 26 is a schematic flow chart of a program control function.

FIG. 26 is a schematic flow chart of a program control function.

Programs stored in the microfloppy disk or the hard disk which serves as the external memory 12 are read out or data in the memory 10 is deleted. Menu icons representing programs stored in the disk are displayed (step S2601). When one of the icons is touched on the touch panel 3 by the operator (step S2604), whether an empty area enough to store the designated program is available in the memory 10 is checked in step S2605. If YES in step S2605, this program is read out from the disk and loaded in the empty area (step S2606). If a sufficient empty area is not available in the memory 10, a shortage of a memory area is displayed.

(Description of Sheet Control Function (FIGS. 27A and 27B))

Figure 27A:
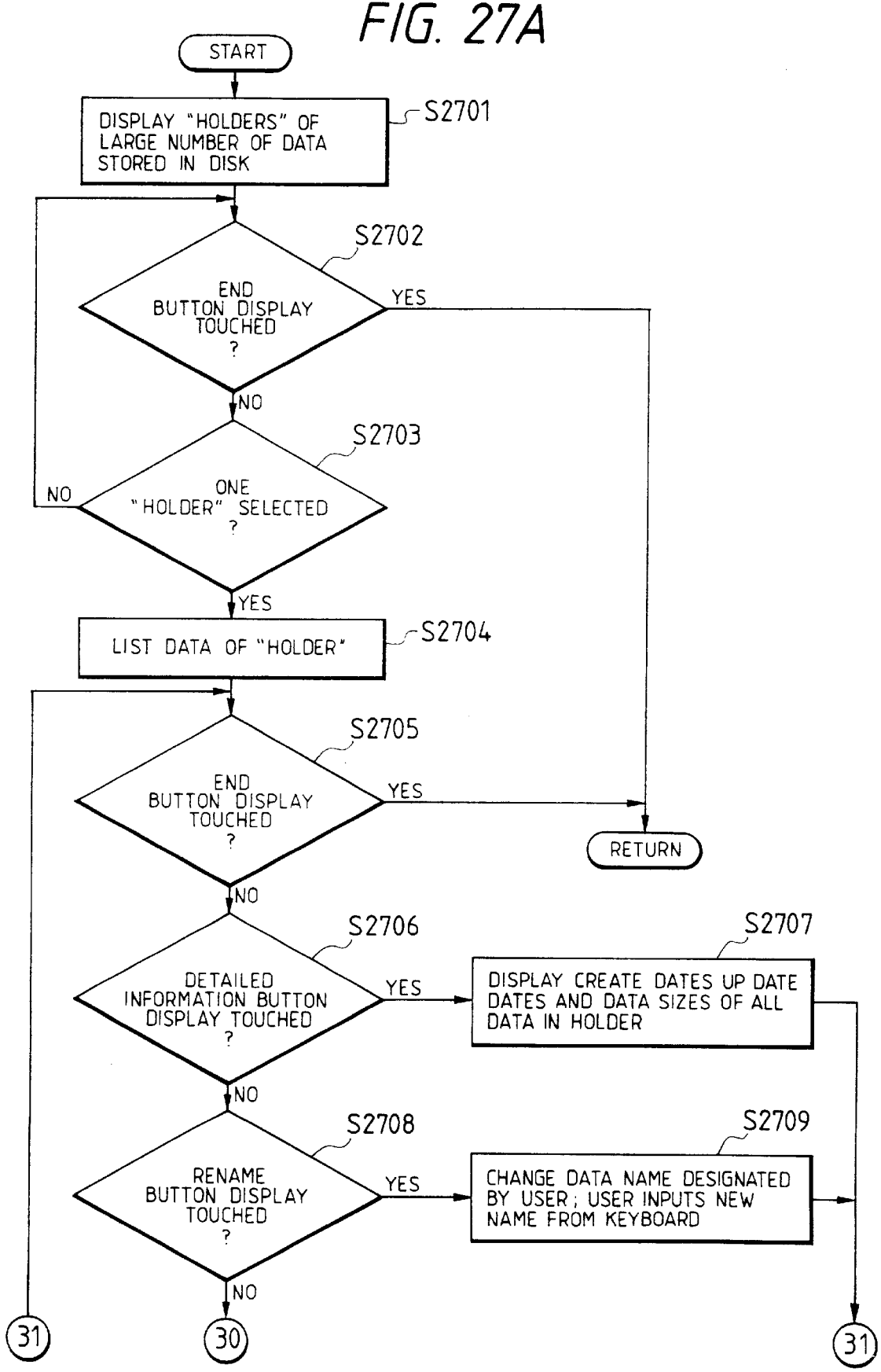
FIGS. 27A and 27B are schematic flow charts of a sheet control function.
Figure 27B:
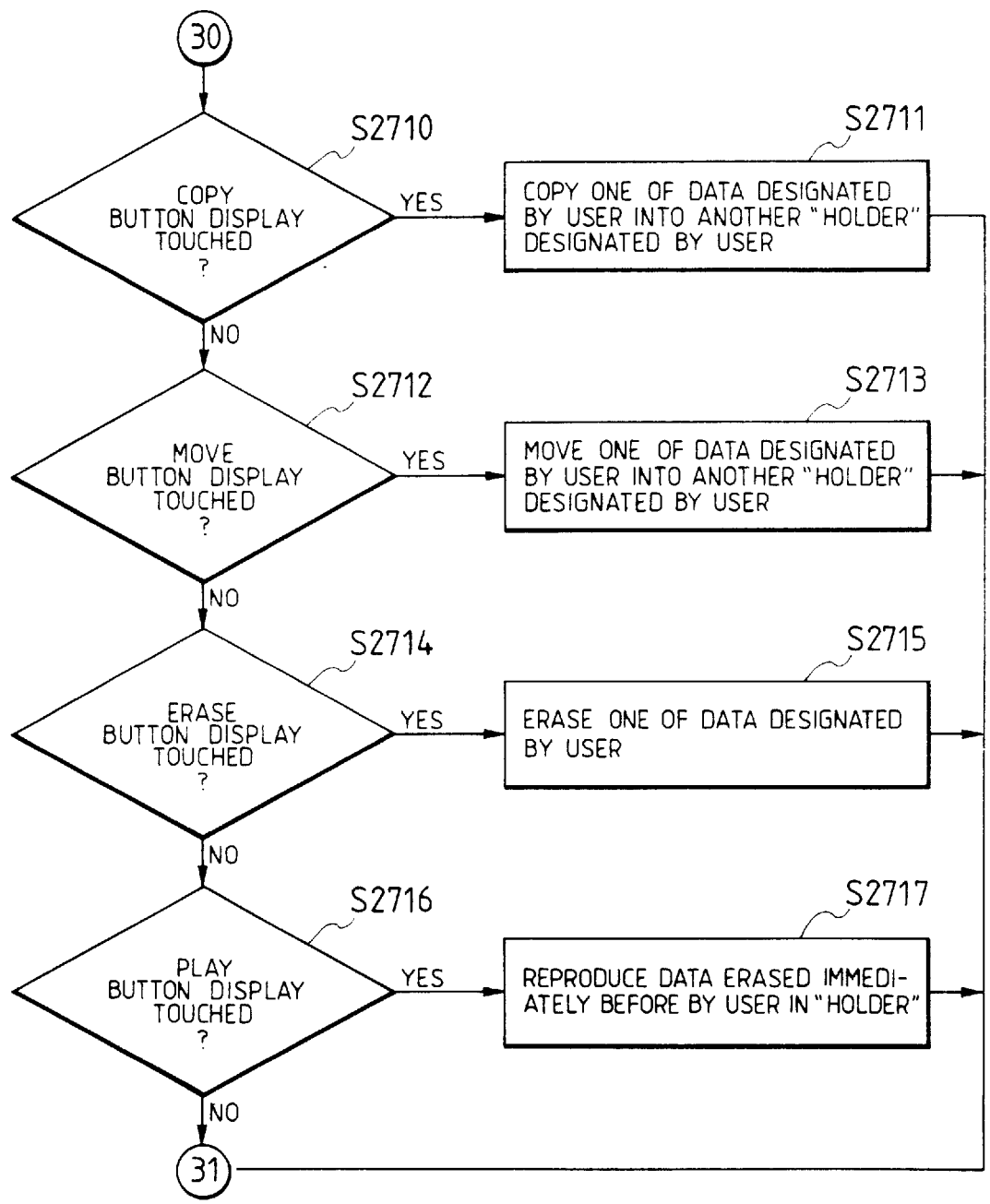
Figure 28A:
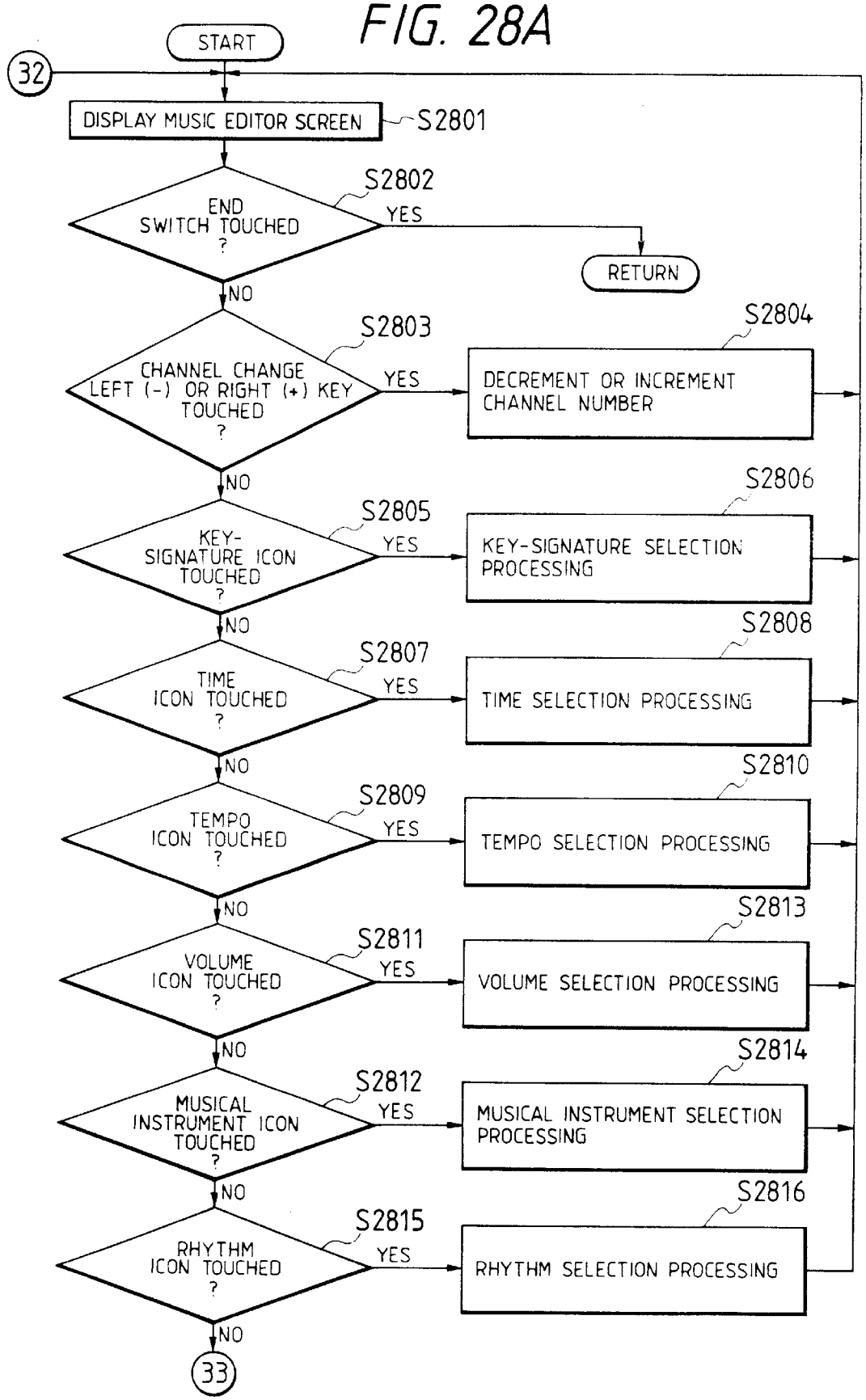
Figure 28D:
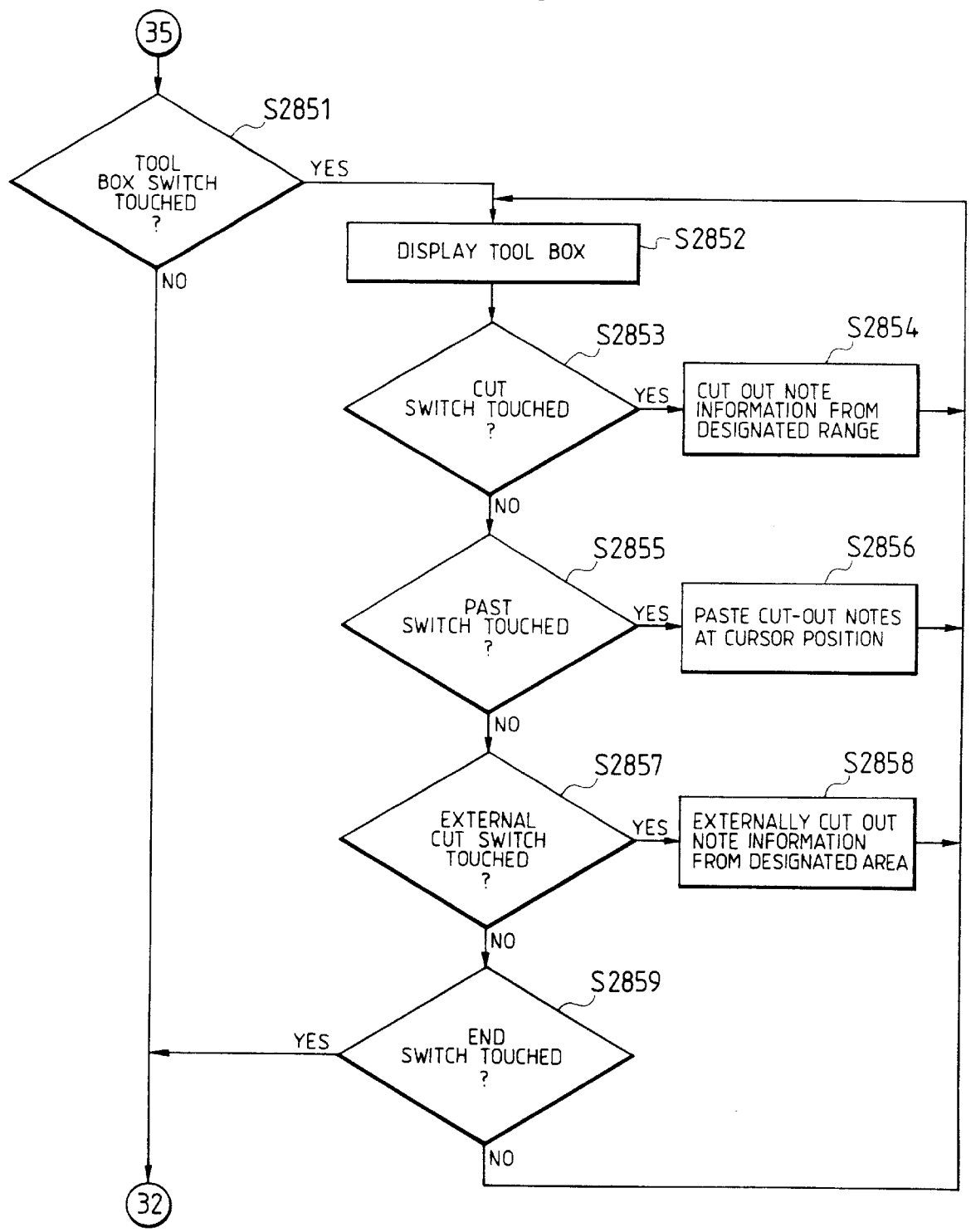

FIGS. 27A and 27B are schematic flow charts of a sheet control function for controlling various data stored in the hard disk and the microfloppy disk.

A large number of data stored in the disk are grouped into several holders which are then displayed. The user designates one holder to display, copy, move, or delete all data contained in this holder. The holder represents a holder (bundle) of documents stored in a cabinet. The holder contains sheets of, e.g., a telephone directory, music data, automatic answering telephone tapes and document data such as a business trip report.

(Description of Music Editor Function (FIGS. 28A to 28D))

FIGS. 28A to 28D are schematic flow charts of a music editor function as one of the application programs.

This function is effected when this program is loaded in the RAM area of the memory 10 and execution of this program is designated in the main menu. When the program runs, the screen is changed into an edit screen of the music editor. On this screen, the user designates a musical performance channel, a key-signature, a time, a tempo, a rhythm, a volume, a type of musical instrument, and a key (steps S2803 to S2815). When a displayed keyboard is touched, a corresponding note having a predetermined pitch is input in a music sheet (steps S2817 to S2822).

When notes are completely input and the playing icon is touched, a melody consisting of the input notes is played with a tone color of the designated musical instrument (steps S2836 to S2841). This music information can be stored, and the stored music information may be read out and reproduced (steps S2849 and S2850).

The generated musical information can be cut out by the tool box function. A function of interest is called and the cut musical information can be pasted to the function. For example, the musical information can be used as music for the automatic answering telephone and a music as a holding tone of the telephone set. In this case, the tool box icon is touched to cut out note information upon designation of a cut range with a cut switch, a paste switch, or the like, and a function for utilizing the cut note information is started and registered (steps S2851 to S2859).

(Description of Alarm Function (FIGS. 29A and 29B))

Figures 2, 29A:
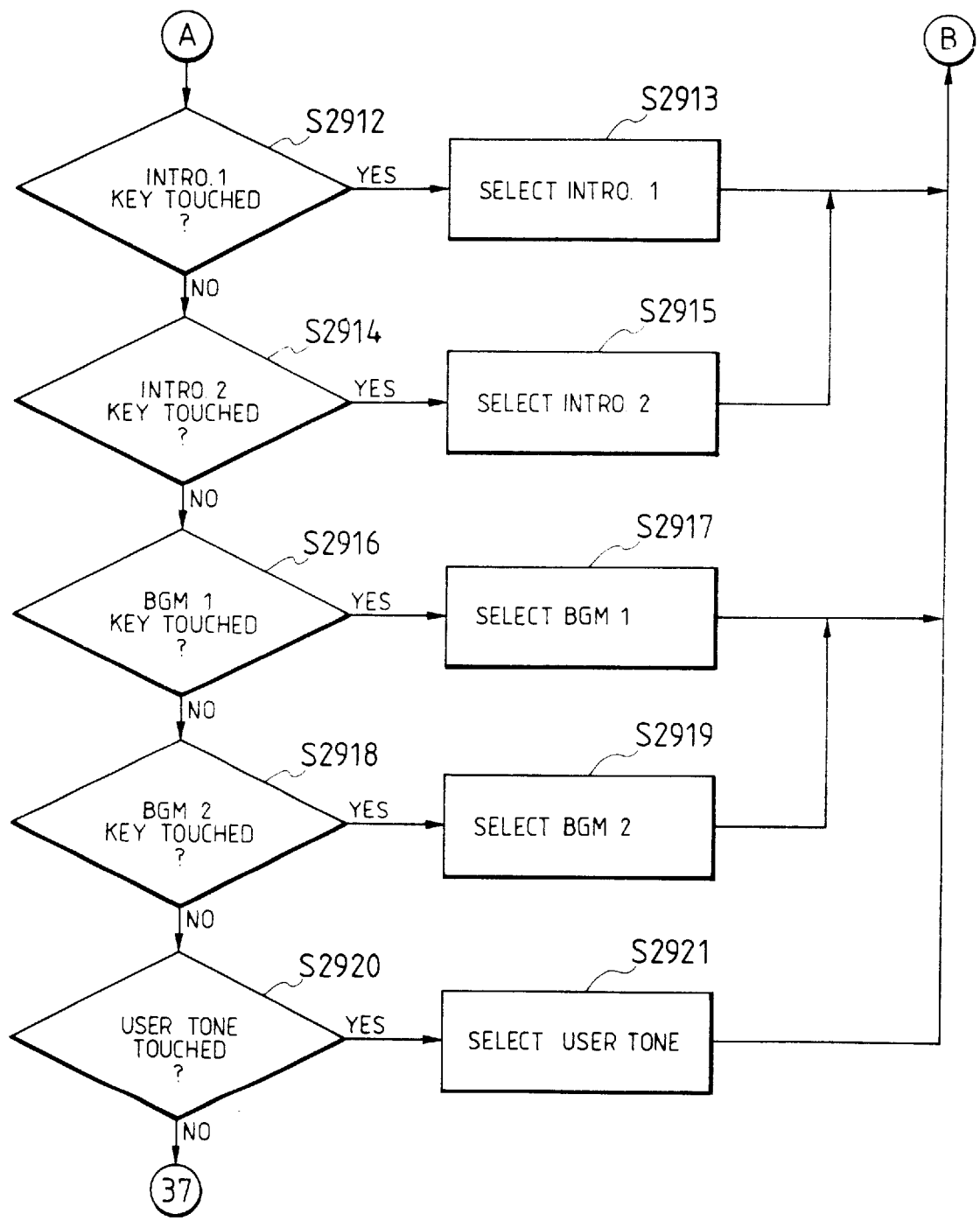
Figures 2, 29B:
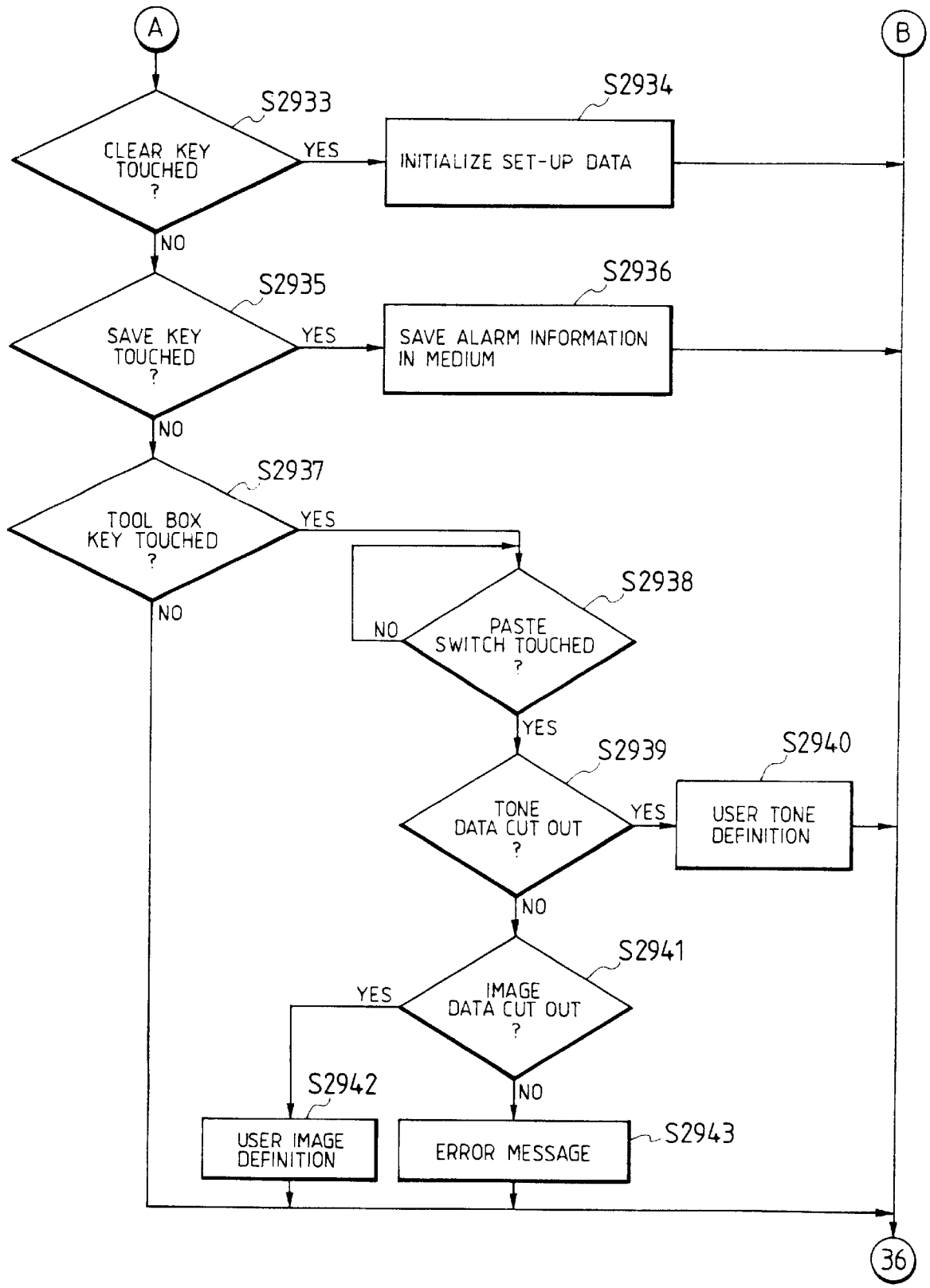

FIGS. 29A and 29B are flow charts showing alarm function set-up processing.

In this processing, an alarm time, an output tone, and output image data are set. If the music data generated by the music editor is cut out, it is registered as a user tone for alarming. If image data is cut by an image editor (to be described in detail later), it is defined as a user image for alarming.

FIG. 30 is a flow chart showing alarming processing for generating an alarm when a preset alarm time has elapsed.

When a pre-set time has elapsed, an introduction is output for one to two seconds, and an operating application program runs for about two seconds (step S3001 to S3005). Background music (BGM) is started and comment and image data which are input by the user are displayed until an end instruction is input, sound generation is terminated, or another event is generated (steps S3006 to S3009).

Figure 31:
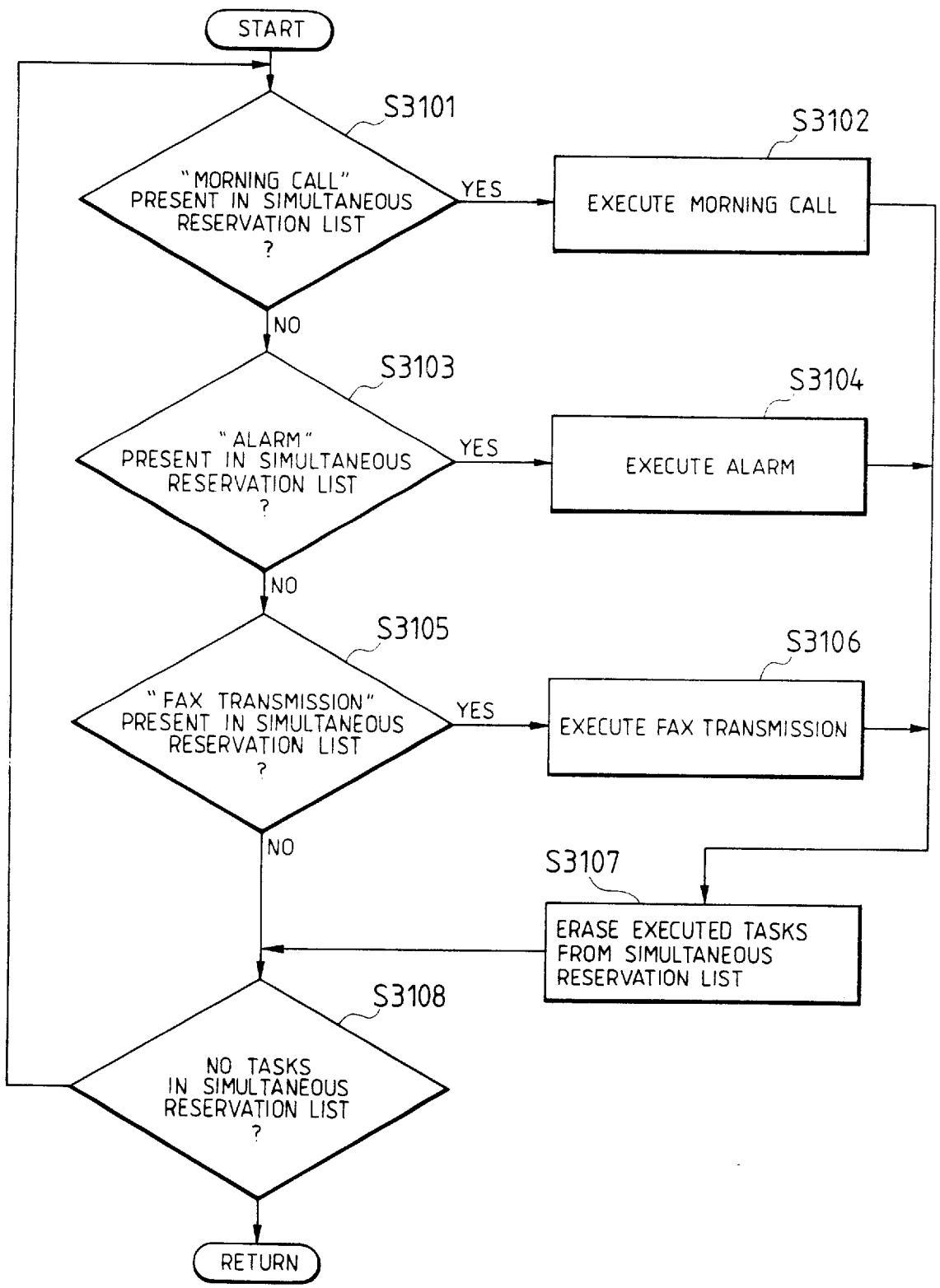
FIG. 31 is a flow chart of processing wherein priorities are taken into considerations when a plurality of functions are simultaneously set.
Figure 32A:
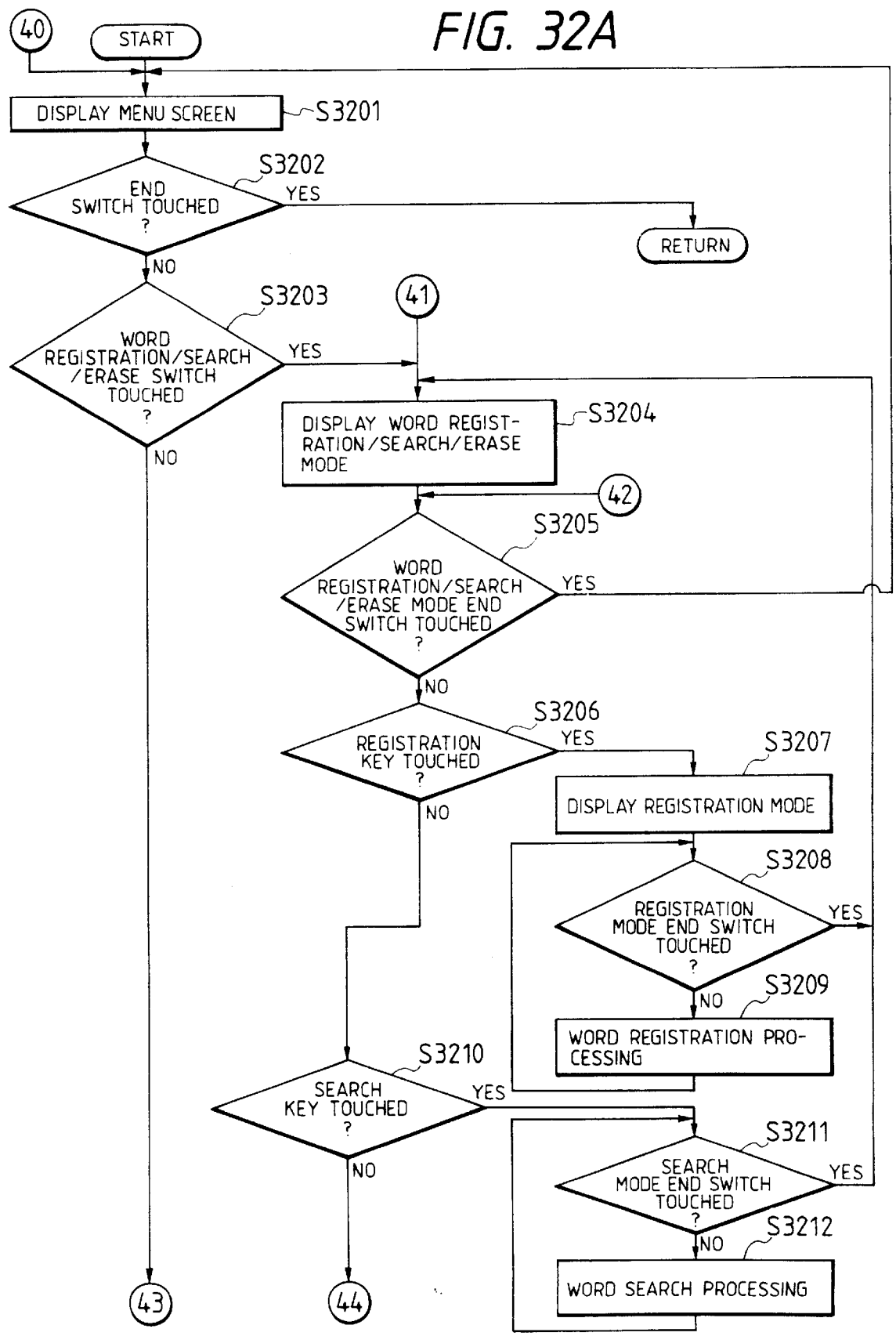
FIGS. 32A to 32D are schematic flow charts of a user dictionary function.
Figure 32B:
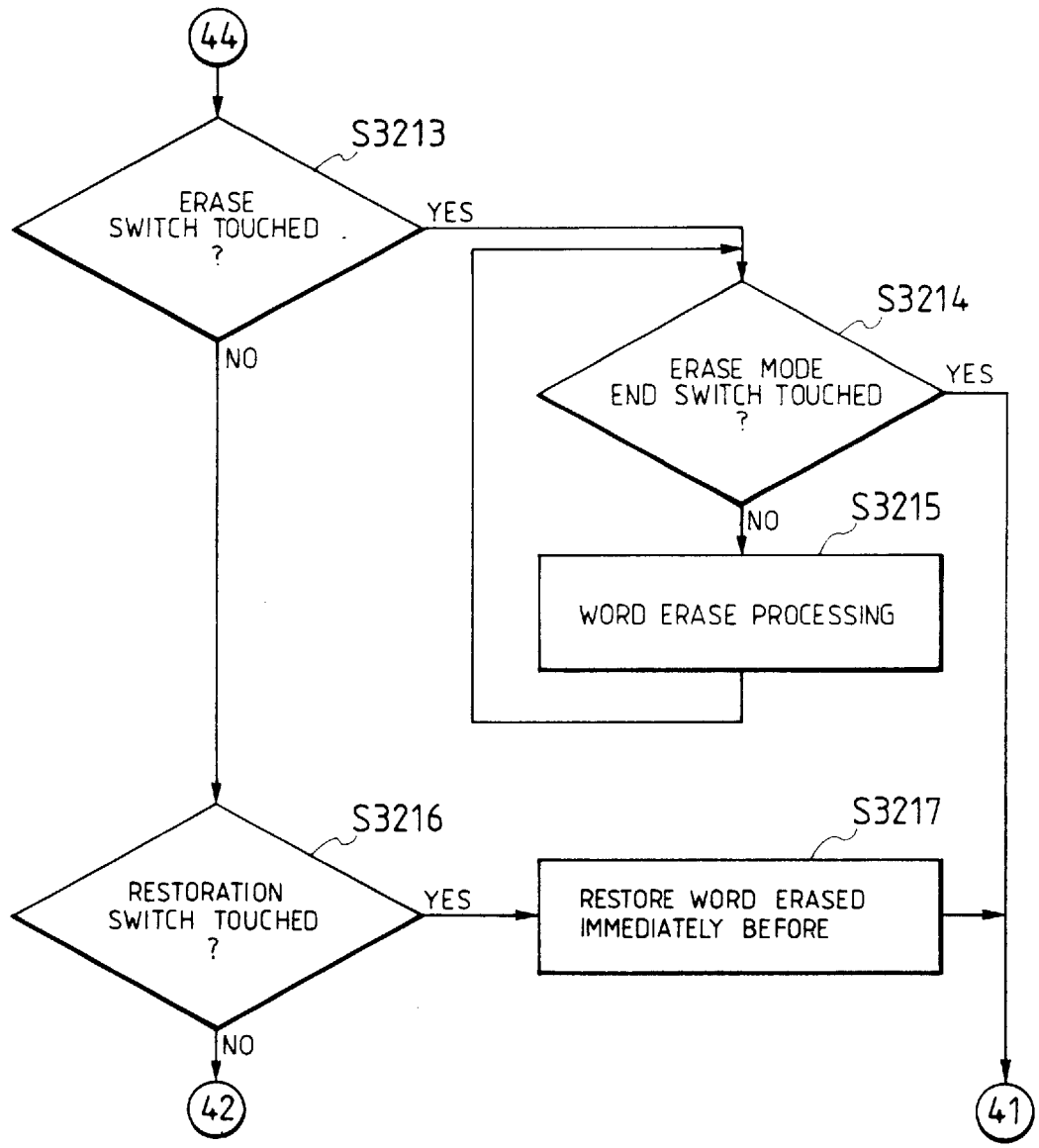
Figure 32C:
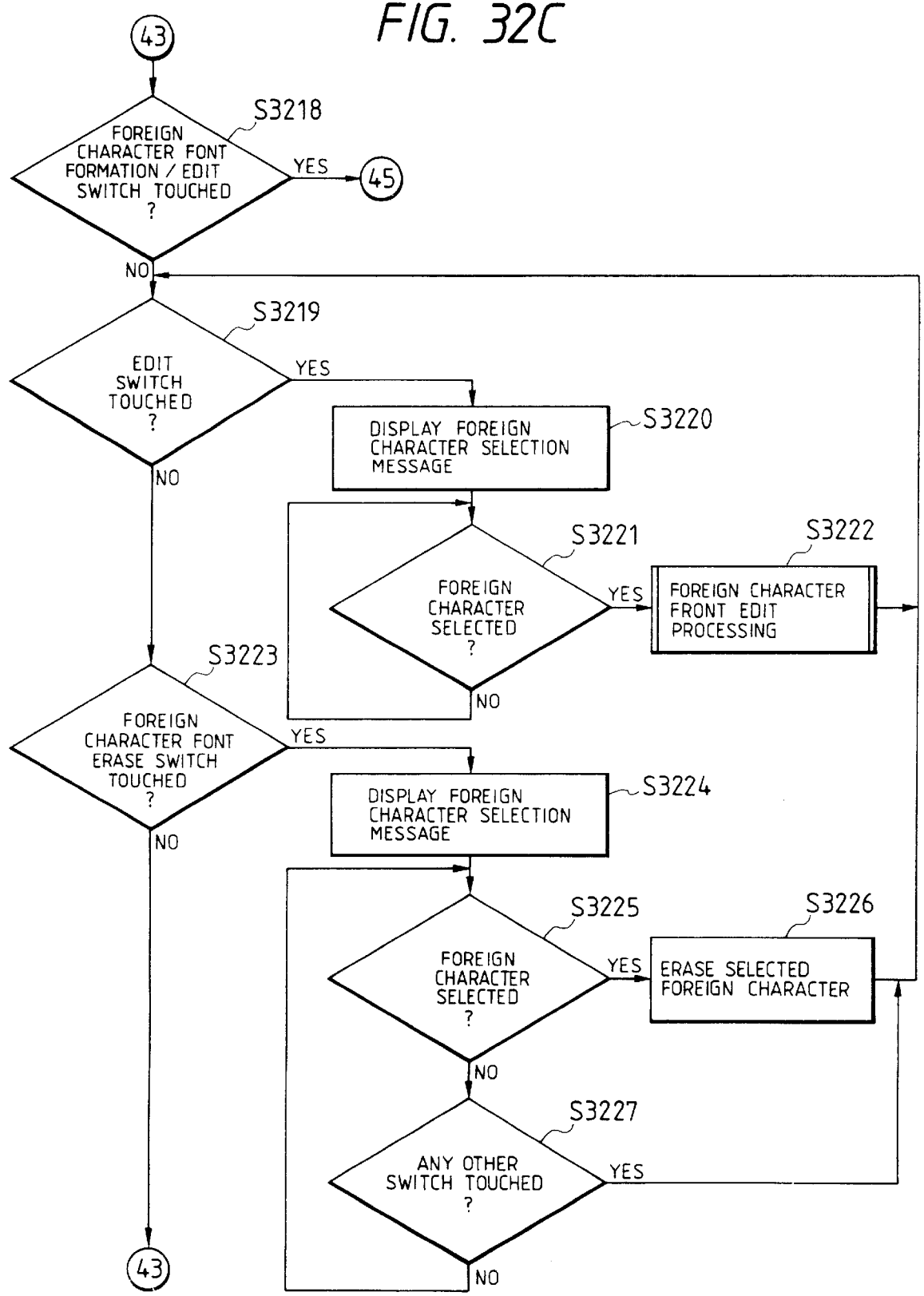
Figure 32D:
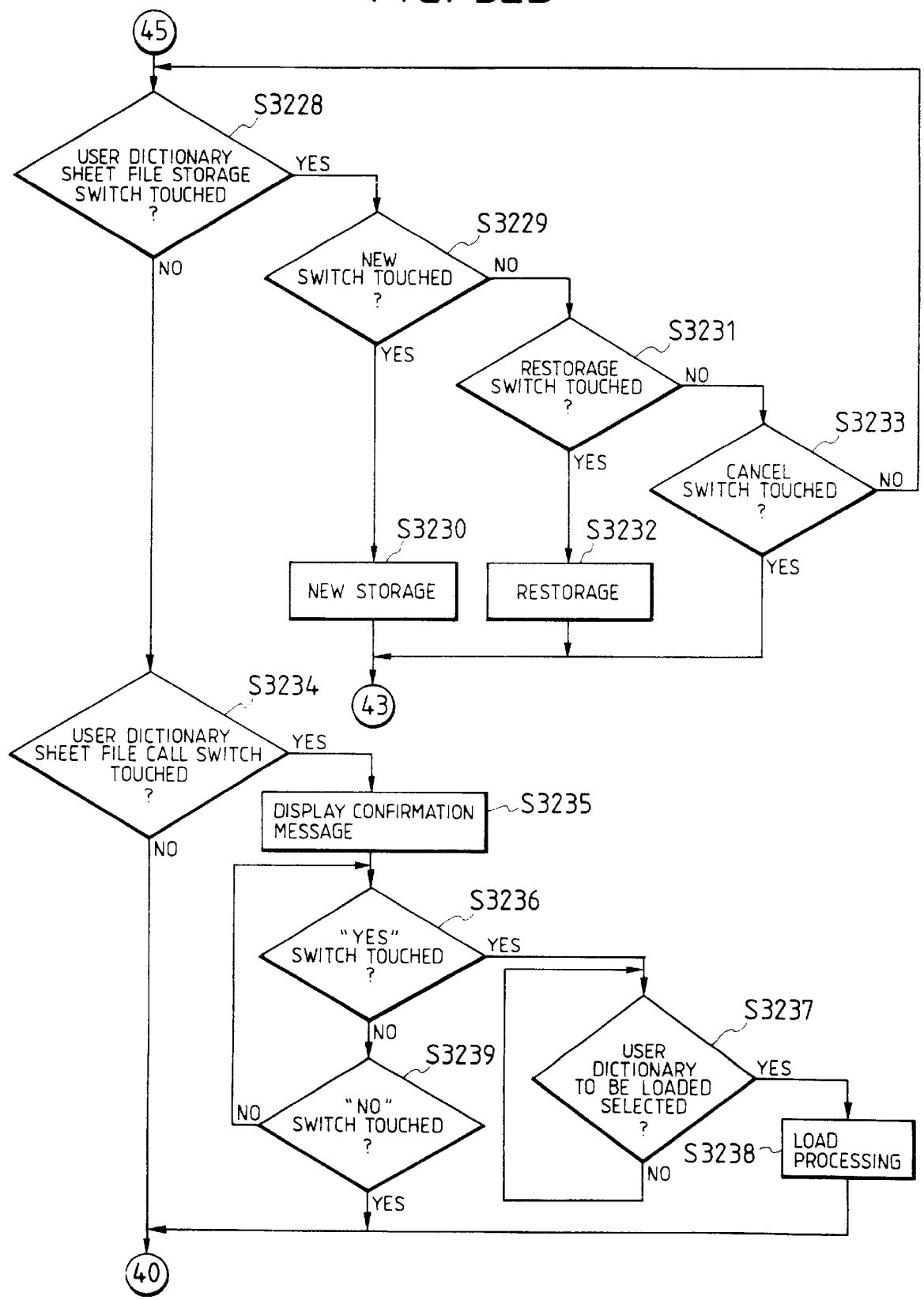

FIG. 31 is a flow chart showing processing of a plurality of reserved functions executed when pre-set times have elapsed.

First, a morning call function is checked in step S3101. If the morning call function is set, it is executed in step S3102. An alarm function is then checked in step S3103. If the alarm function is set, it is executed in step S3104. Whether facsimile timer transmission is reserved is checked in step S3105. If YES in step S3105, facsimile transmission is performed in step S3106. When the operations in steps S3101, S3104, and S3106 are completed, the finished operations are deleted from the reservation list in step S3107. At the same time, whether the reservation list is empty is determined in step S3108. The above operations are repeated until the reservation list becomes empty.

(Description of User Dictionary Function (FIGS. 32A to 32D))

FIGS. 32A to 32D are schematic flow charts of a user dictionary and an external character font function.

In the operations of FIGS. 32A to 32D, registration, search, addition, and deletion of a word by a user can be performed (steps S3203 to S3216), and registration and deletion of the external character font and addition and deletion of the user dictionary can be performed (steps S3219 to S3239).

(Description of Morning Call Function (FIGS. 33A to 34))

Figure 33A:
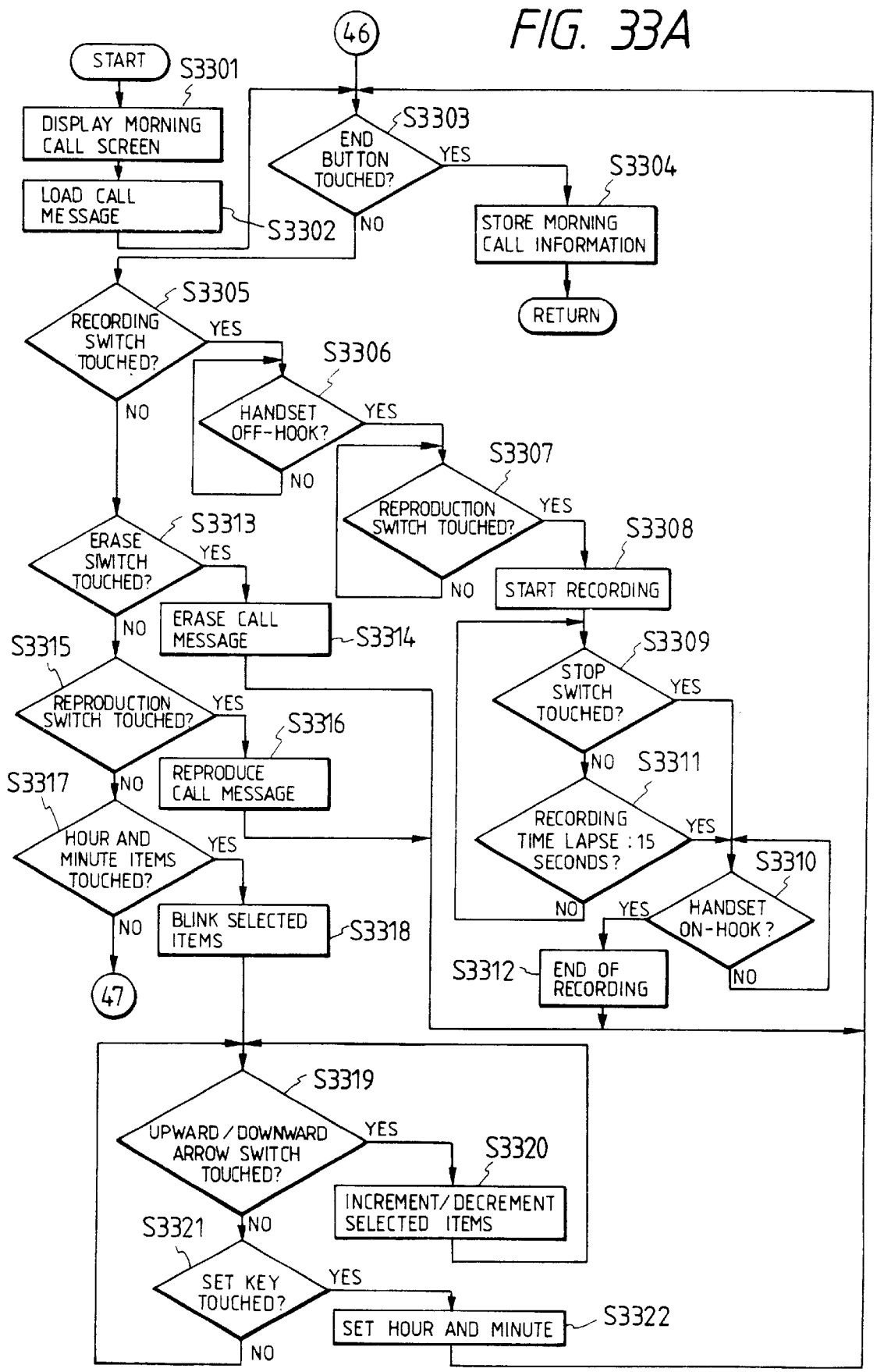
FIGS. 33A and 33B are schematic flow charts for a morning call set-up function.
Figure 33B:
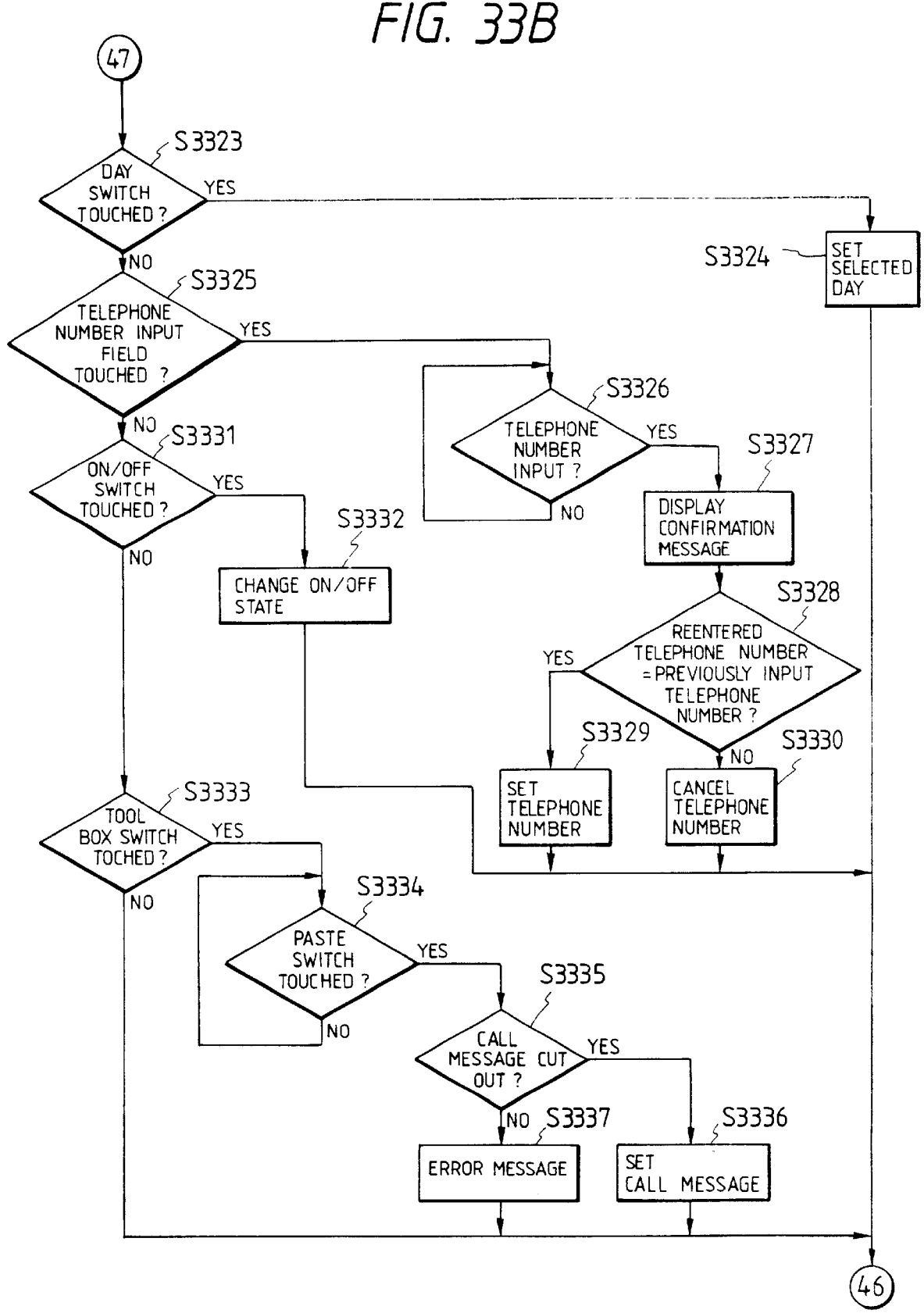

FIGS. 33A and 33B are schematic flow charts of a morning call set-up function.

When this function is effected, a morning call screen is displayed, and a call message is loaded. The recording (REC) switch is touched, the handset is picked up, and the play switch is touched. Under these conditions, recording of speech or the like is recorded from the handset. This recording can be performed for a maximum of 15 seconds. The recorded message or the like is cut as a call message by a paste function of the tool box. This call message is used as a morning call message. A morning call day and a telephone number of a party to be called are input, thereby completing setting of the morning call function.

Figure 34:
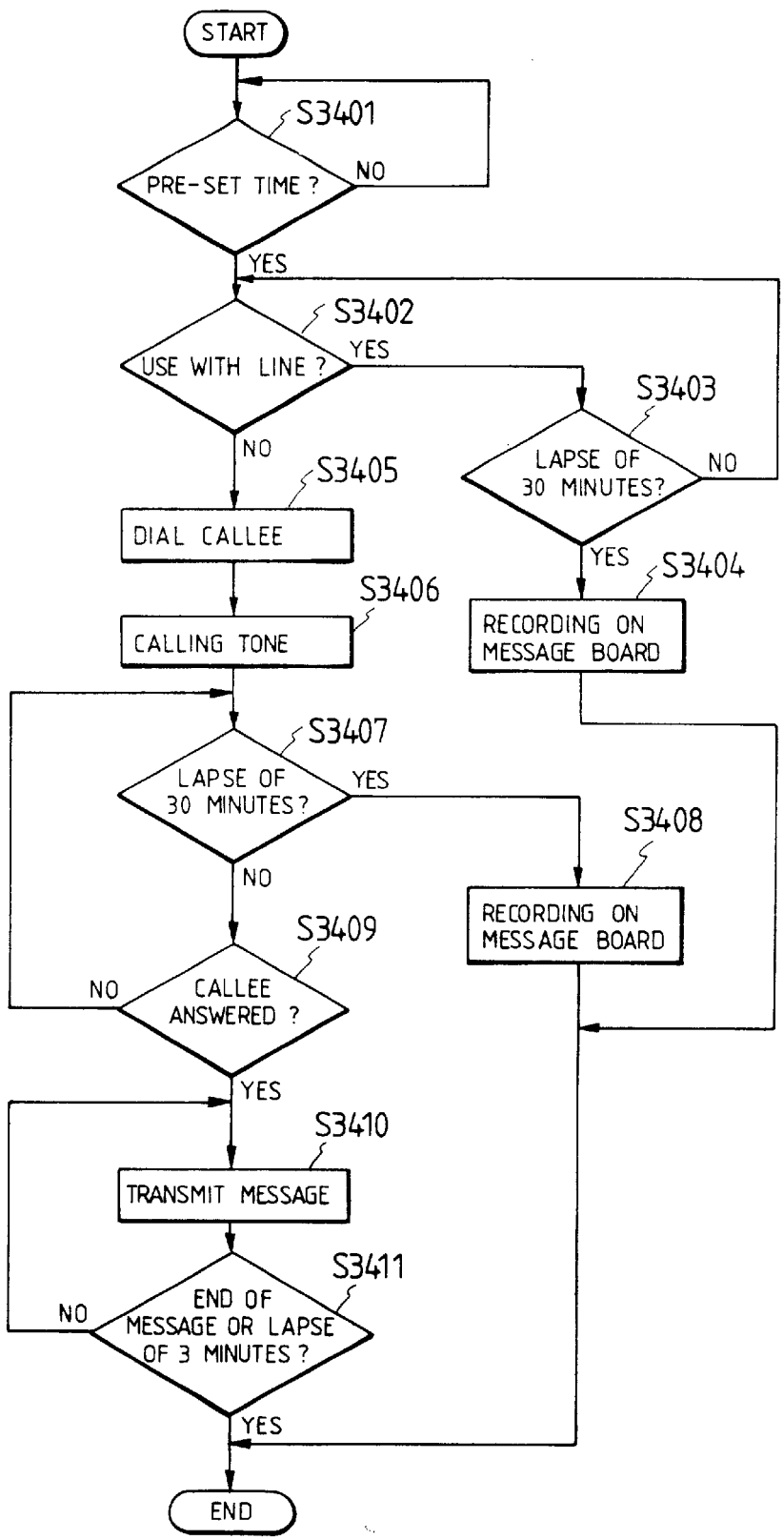
FIG. 34 is a schematic flow chart showing an operation of a morning call.

FIG. 34 is a flow chart showing an operation of the morning call function.

When a pre-set time has elapsed and the telephone line is not busy, a call is made for a call destination to transmit a message. At this time, when the telephone line is kept busy after a lapse of 30 minutes, or when the called party does not answer the phone after a lapse of 30 seconds, this is recorded on the message board and is displayed at the upper right corner of the CRT screen.

(Description of Telephone Directory Function (FIGS. 35 to 36C))

Figure 35:
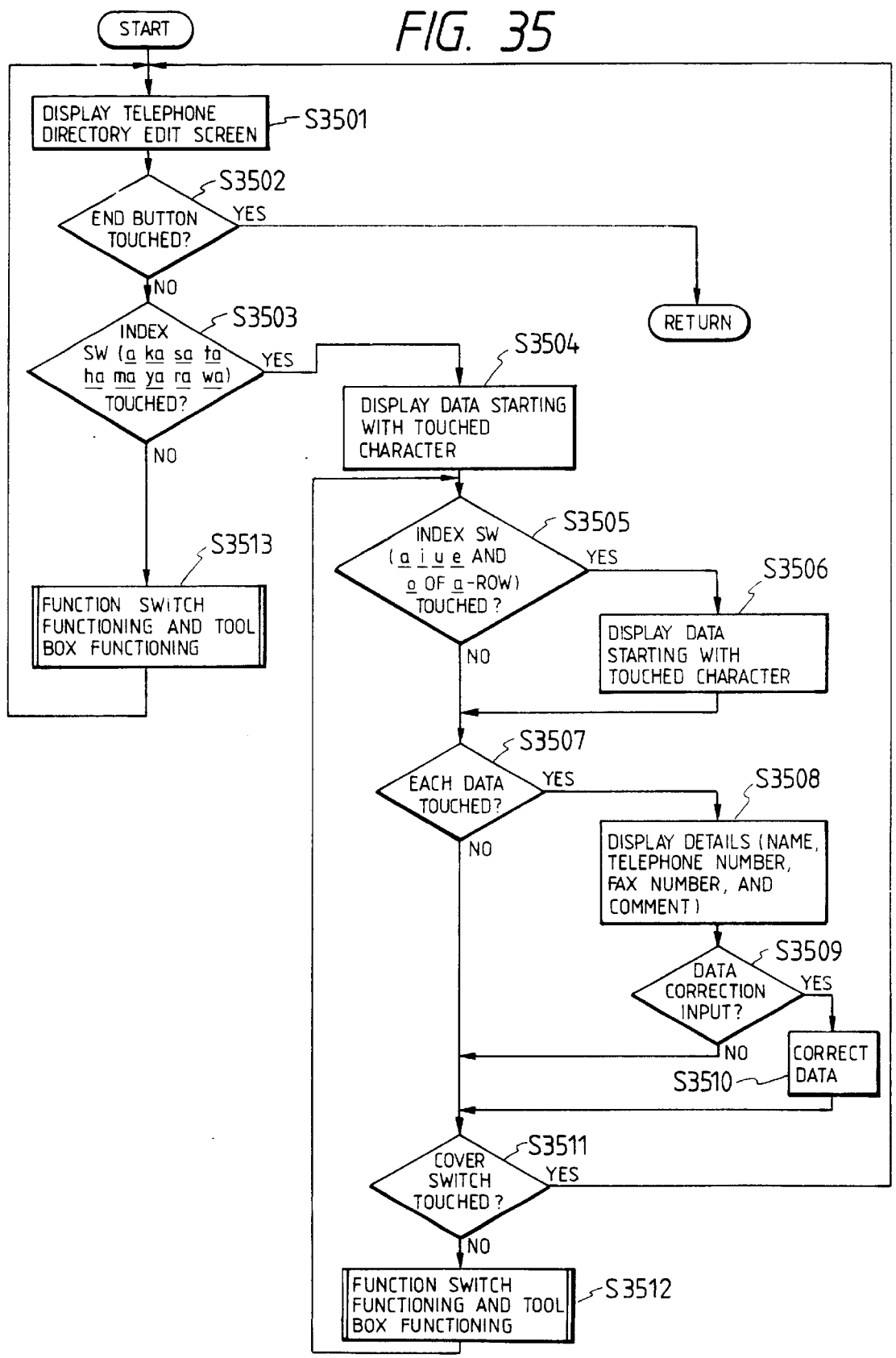
FIG. 35 is a schematic flow chart of a telephone directory function.

FIG. 35 is a schematic flow chart of a telephone directory function.

When a telephone directory screen is displayed and an index switch is touched, data (e.g., name) starting with a touched character is displayed. When each data is touched, its detailed data such as a name, a telephone number, a facsimile number, and a comment are displayed.

Figure 36A:
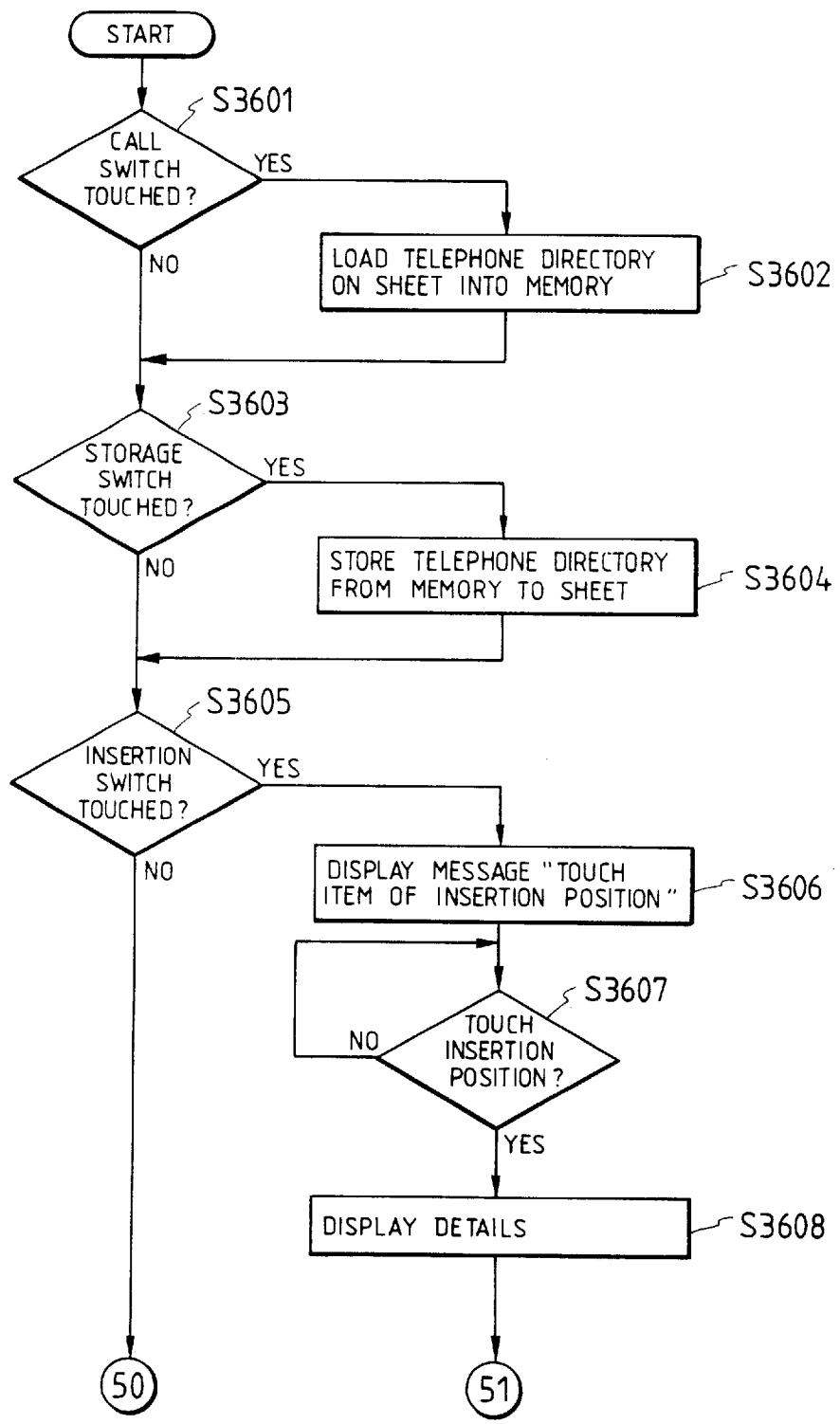
FIGS. 36A to 36C are schematic flow charts of a function switch function and a tool box function in the telephone directory function.
Figure 36B:
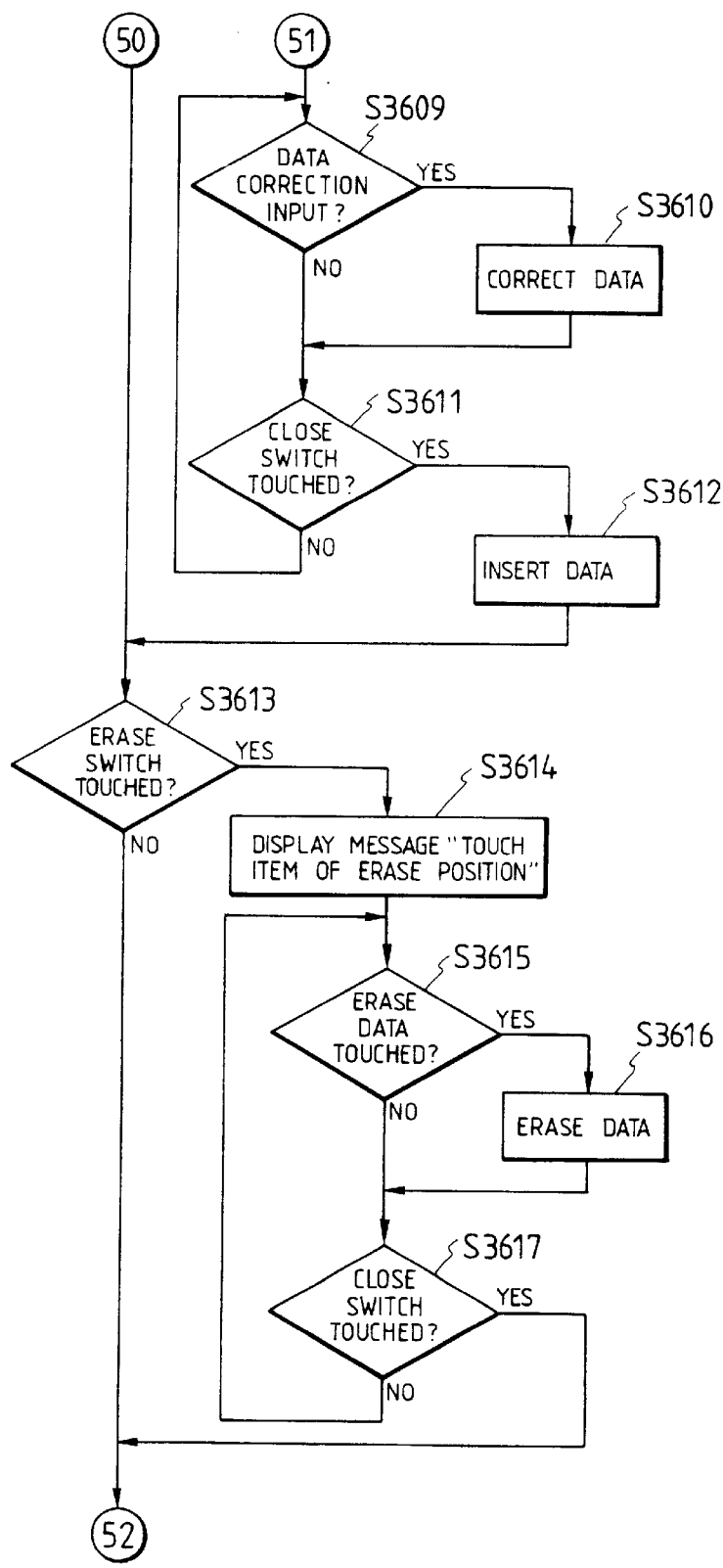
Figure 36C:
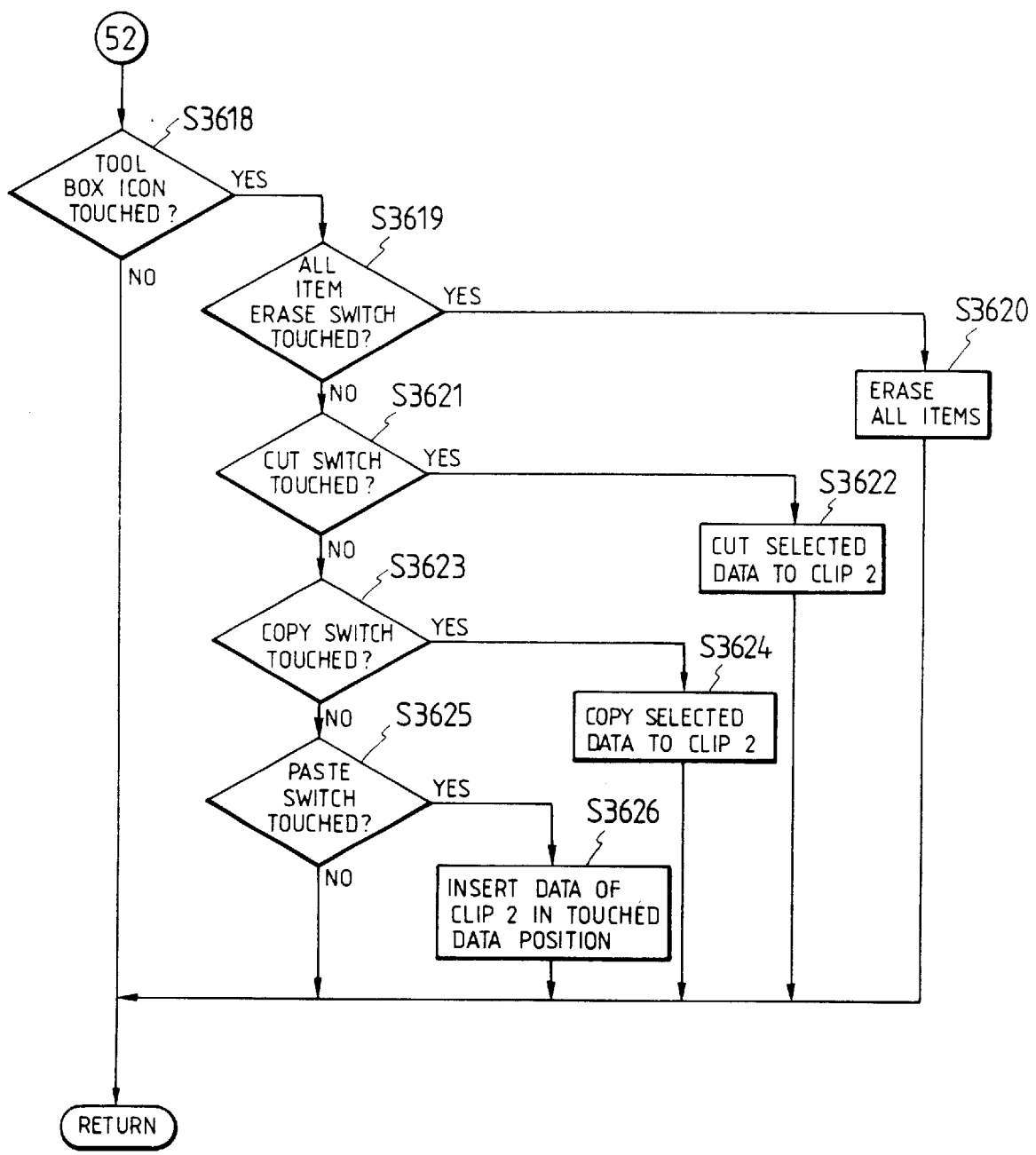

FIGS. 36A to 36C are flow charts of a function switch and tool box functions in the telephone directory function.

A telephone directory on a sheet can be loaded in a memory, and the telephone directory in the memory can be corrected, deleted, or stored in the sheet.

(Image Editor Function (FIGS. 37A to 37C))

Figure 37A:
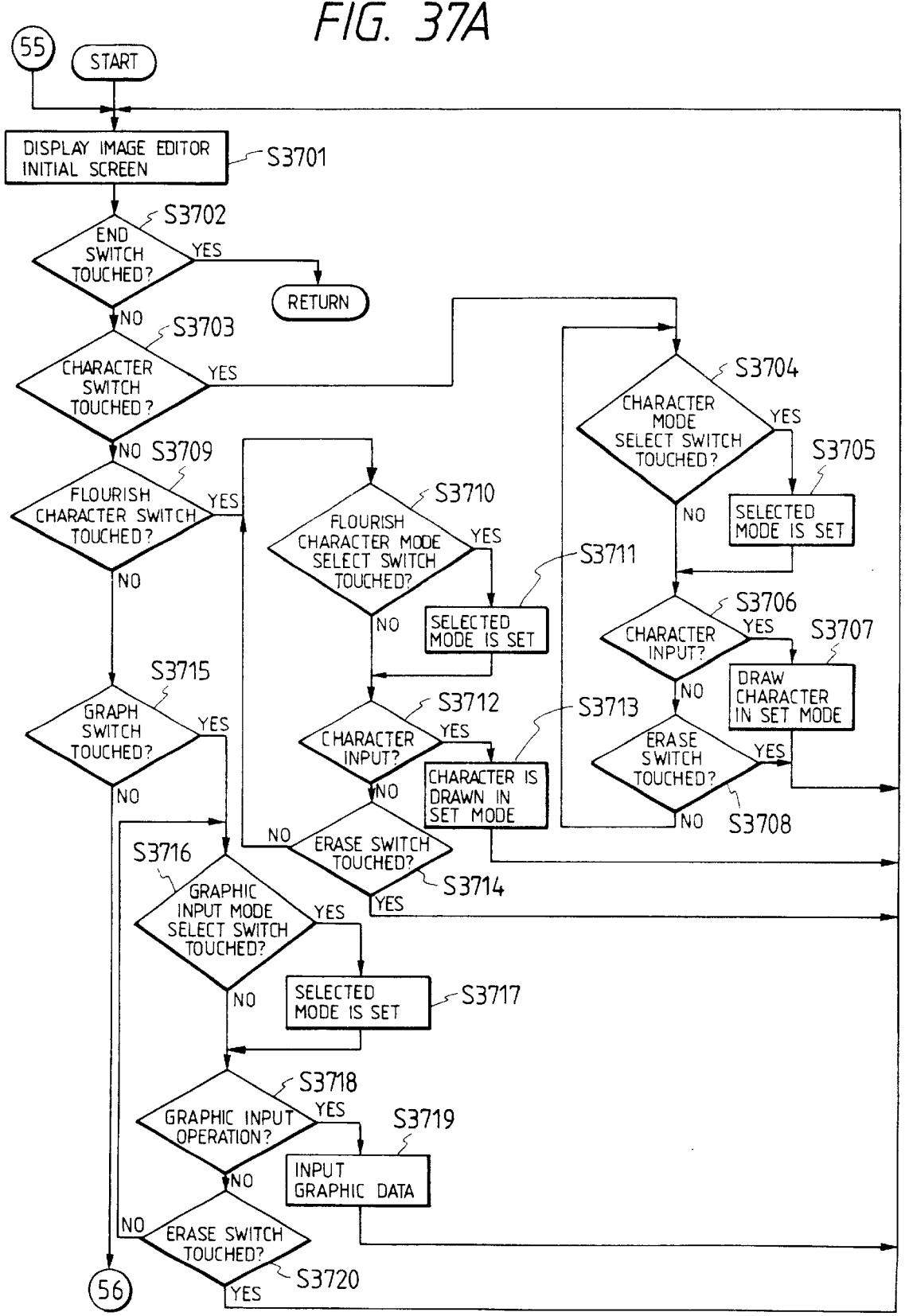
FIGS. 37A to 37C are schematic flow charts of an image editor function.
Figure 37B:
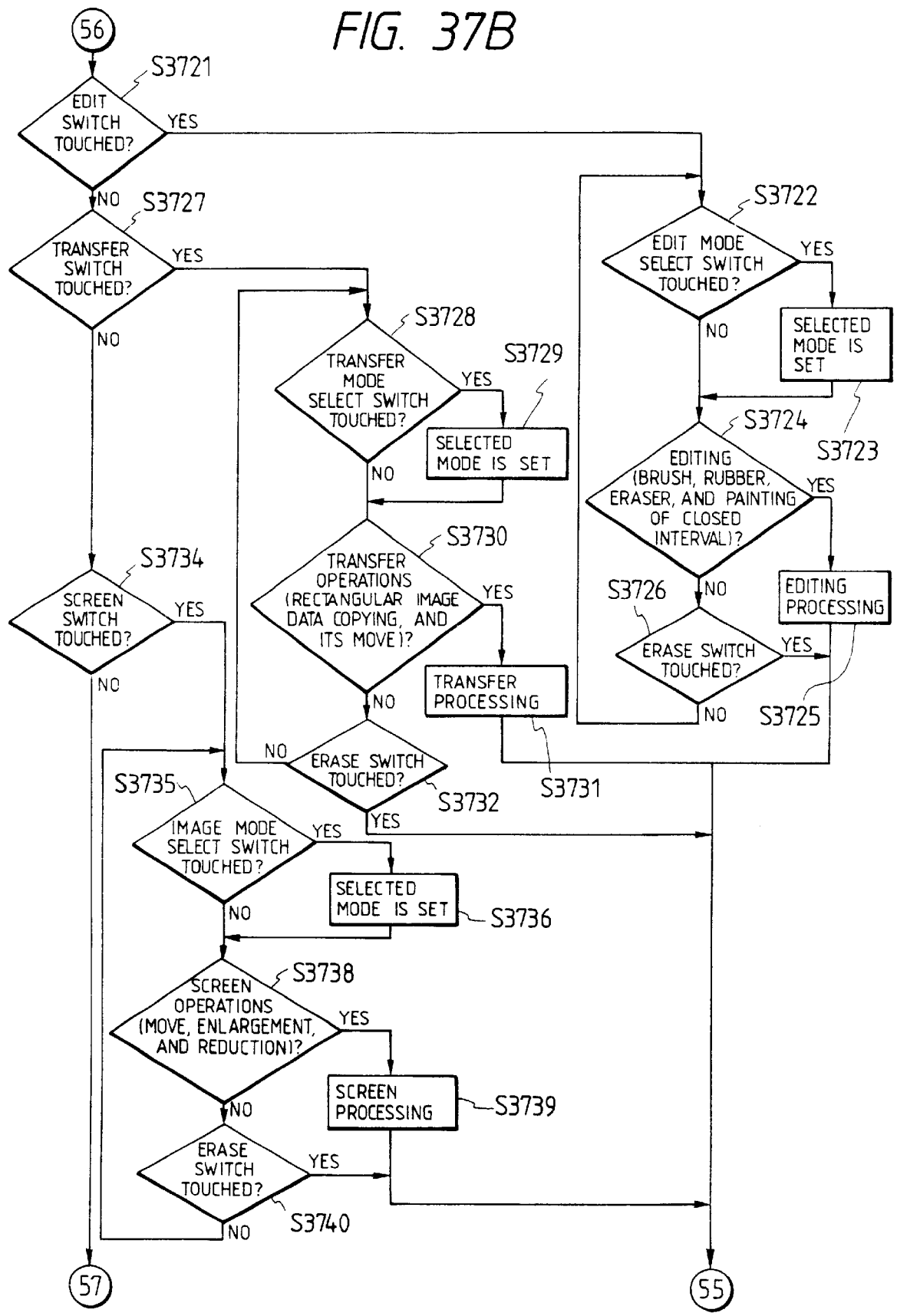
Figure 37C:
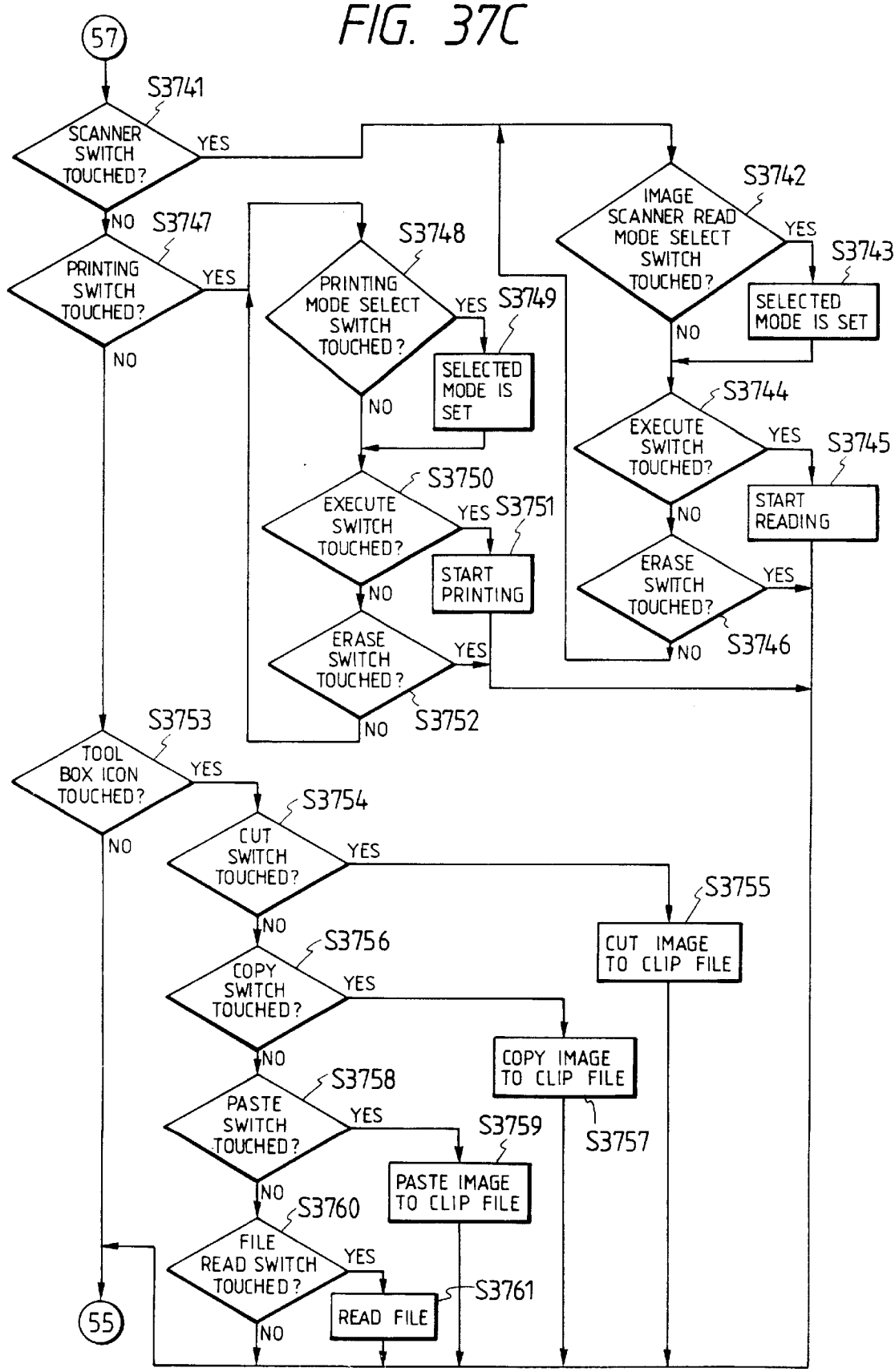

FIGS. 37A to 37C are flow charts showing general processing of an image editor function.

A character can be input in a mode selected by touching a character switch, and a flourish character can be input. At the same time, a graphic image can be input by a graphic switch. In addition, image data can be edited, moved, copied, and expanded/reduced. Image data can be read by an image scanner, and printing upon touching of a printing switching can be performed.

(Description of Automatic Answering Telephone Function (FIGS. 38 to 46B))

Figure 38:
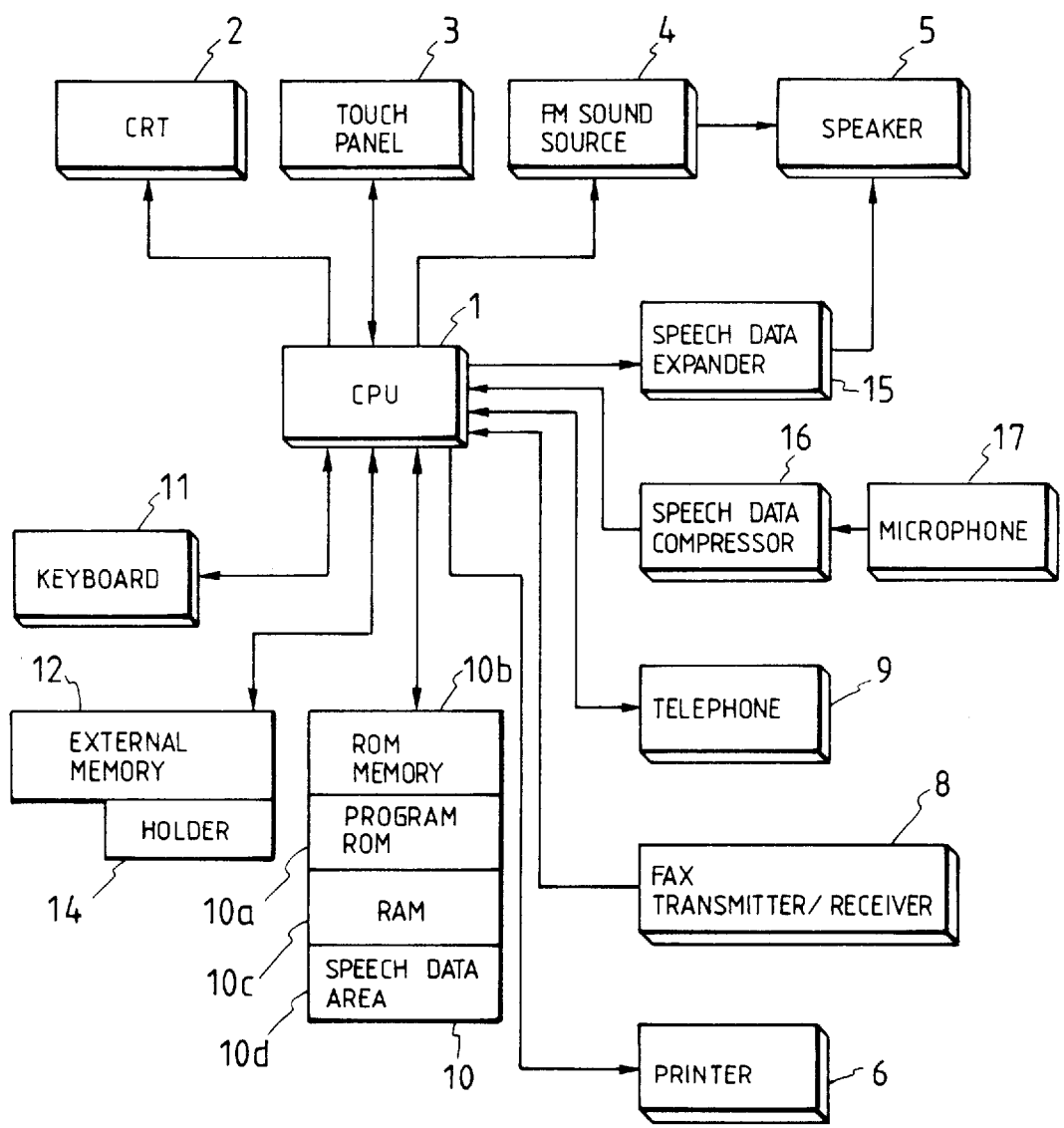
FIG. 38 is a block diagram showing a schematic arrangement of a main part of an apparatus having a tape recorder function.

FIG. 38 is a schematic block diagram showing a main part of an apparatus which causes a tape recorder to record speech and serves as an automatic answering telephone set. The same reference numerals as in FIG. 1 denote the same part in FIG. 38, and a detailed description thereof will be omitted.

This apparatus includes a speech data expander 15 for expanding speech data in a memory 10 and a speech data compresser 16 for compressing speech information input from a microphone 17 and a handset 321 of the telephone set. The speech information is compressed and converted into a digital signal. The digital signal is stored in the memory 10 and a holder 14 of an external memory 12.

The memory 10 includes a program ROM 10a for storing a system program, a manager program, and other application programs, a ROM 10b for storing a character front and a dictionary, and a RAM 10c, serving as a working area of a CPU 1, for storing application programs, document information, and speech information which are loaded from the external memory 12. The RAM 11c includes a speech data area 10d for storing digital speech data and a video RAM for displaying data on a CRT 2.

The external memory 12 comprises a microfloppy disk or a hard disk. The external memory 12 includes a holder 14 for storing document information and speech information. User application programs are stored in the external memory 12.

Figure 39:
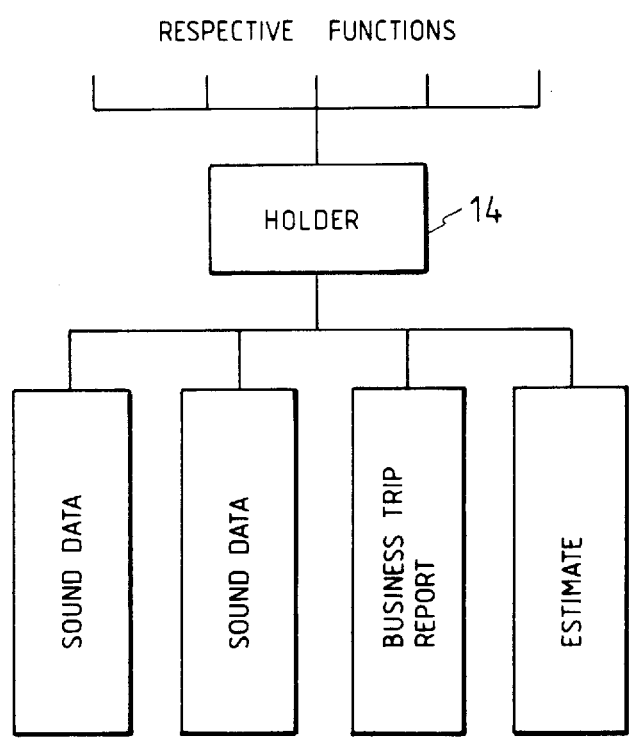
FIG. 39 is a view showing the positional relationship between a holder and the respective functional blocks.

FIG. 39 is a diagram showing a relationship between the holder 14 and other function programs.

The holder 14 can be accessed by each of a plurality of functions. A plurality of data sheets are included in one holder. Each data sheet includes music data, image data, speech data recorded by a tape recorder function (to be described later), various document data, and other data such as a telephone directory.

Figure 40A:
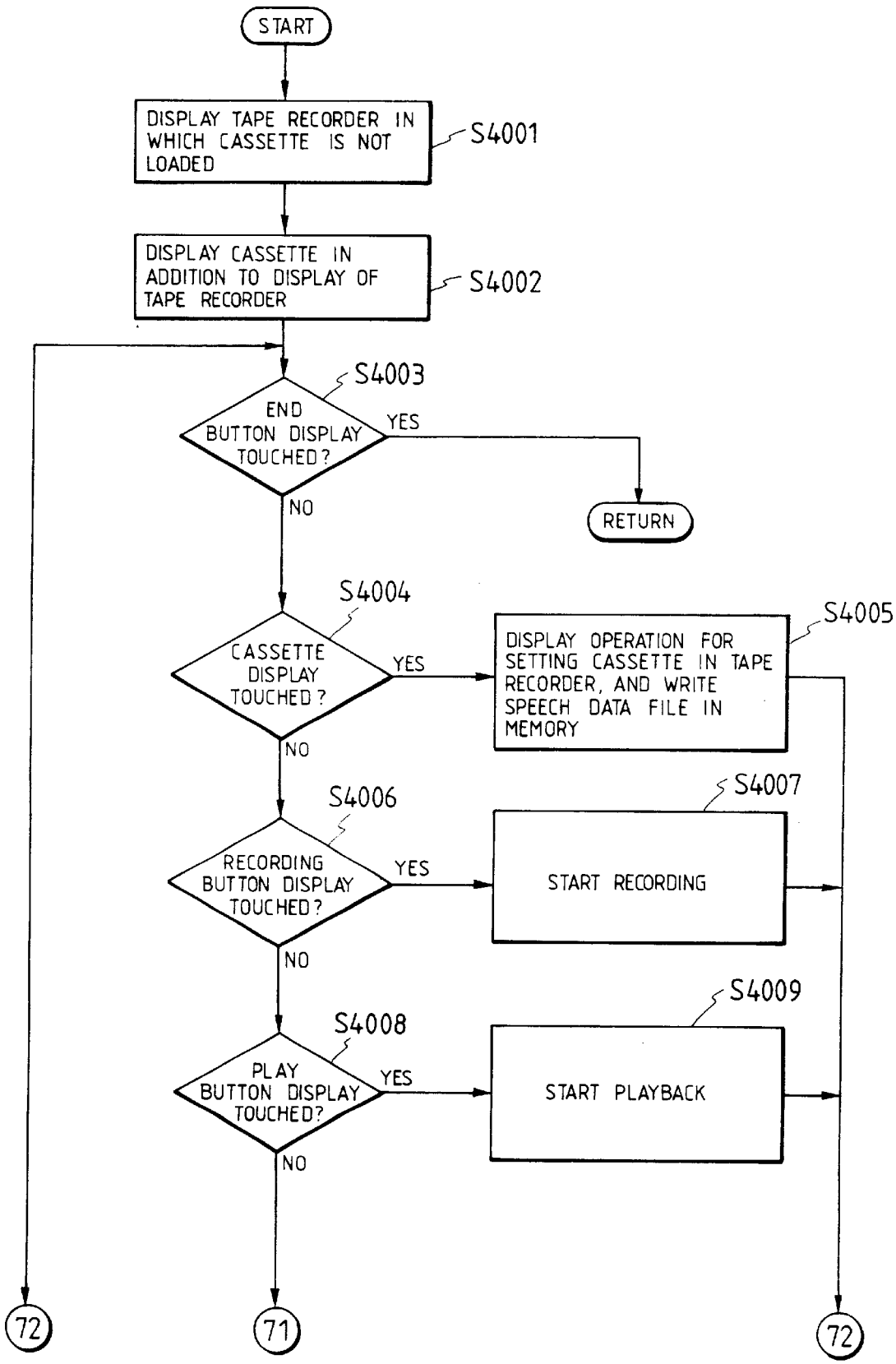
FIGS. 40A and 40B are schematic flow charts of the tape recorder function.
Figure 40B:
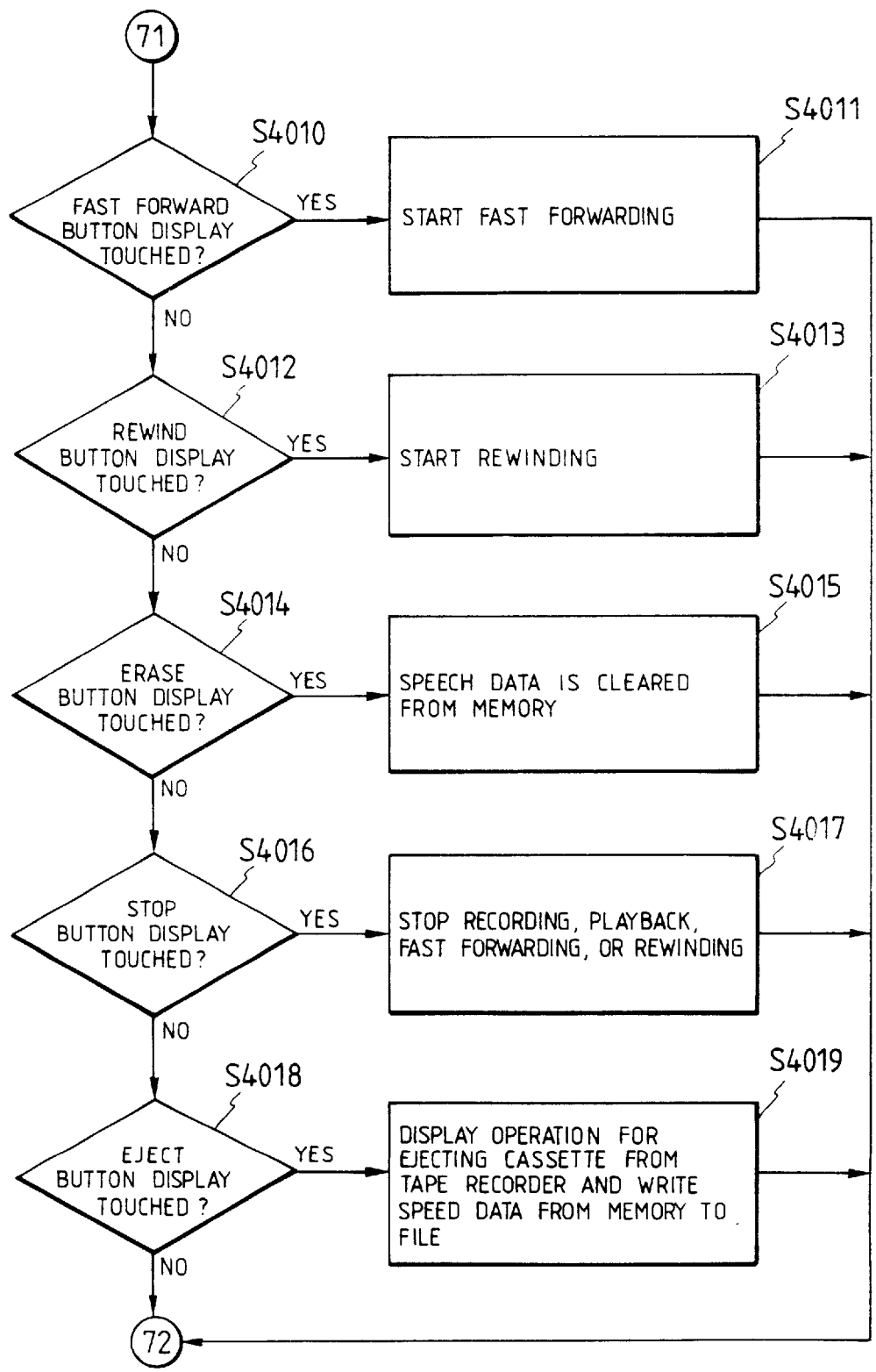

FIGS. 40A and 40B are flow charts showing general processing of the tape recorder function of this embodiment.

This function program is normally stored in a floppy disk serving as the external memory 12 and is loaded in an empty area of the memory 10 by the user. A tape recorder function icon in the main menu is touched on a touch panel 3 to start the tape recorder function.

Figure 43:
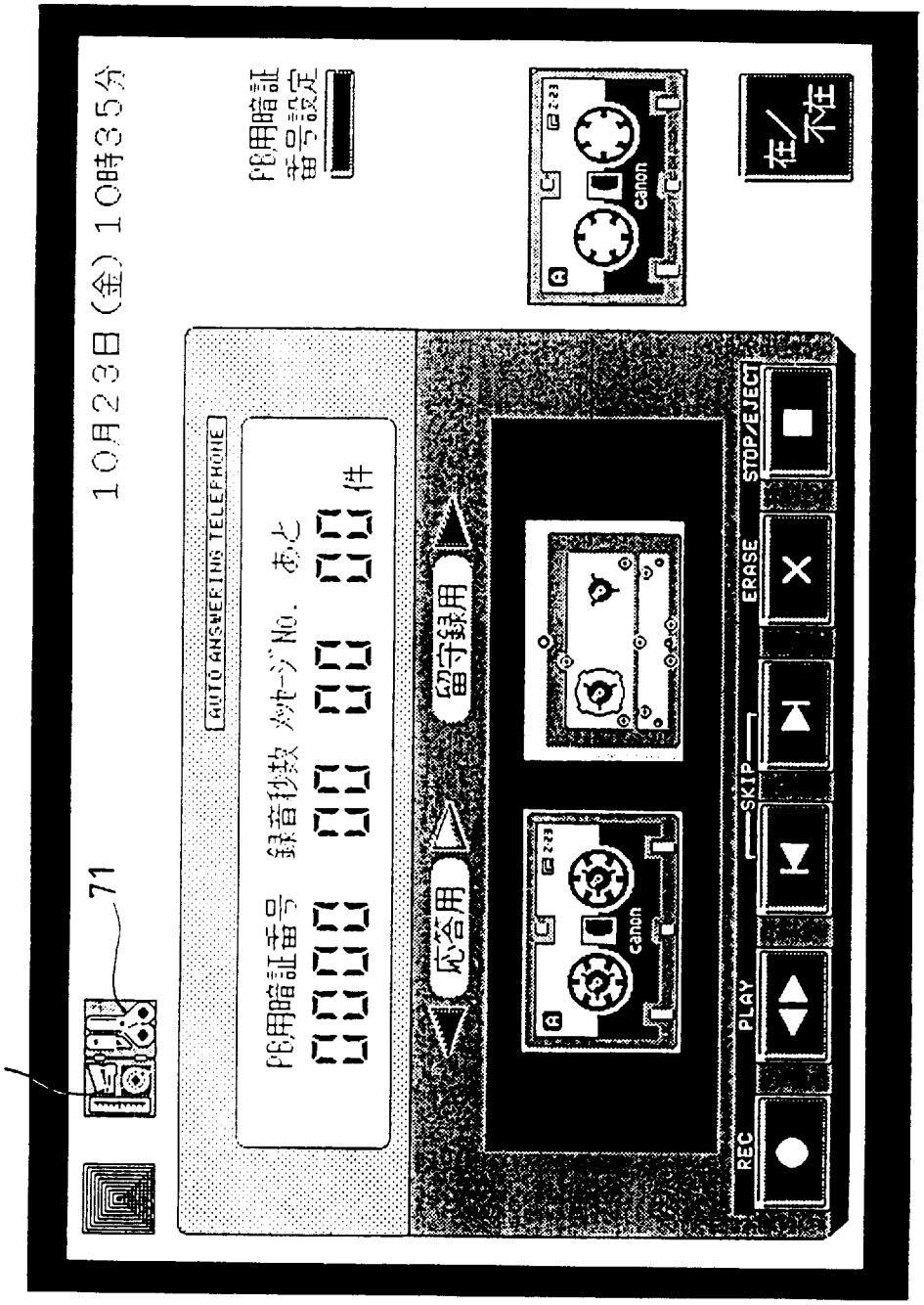
FIGS. 43 to 45 are views showing front views of the tape recorder display states.
Figure 44:
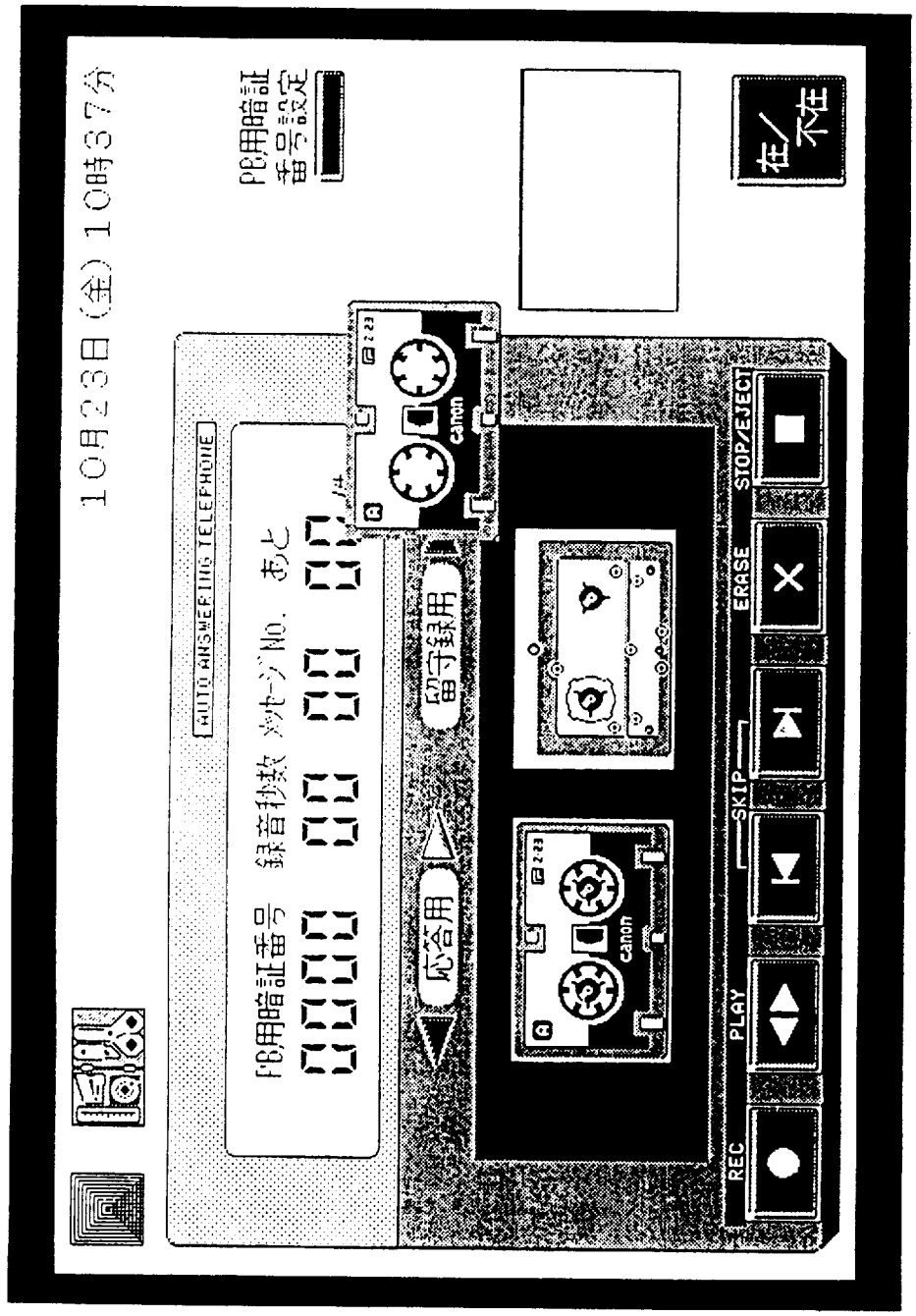

When this program runs, a tape recorder in which a cassette tape is not loaded is displayed on the screen of the CRT 2 in step S4001. In step S4002, a cassette tape is displayed outside the tape recorder (FIG. 43). In step S4004, when the cassette displayed outside the tape recorder shown in FIG. 43 is touched on the touch panel 3, a display is performed in step S4005 such that a cassette tape is set in the recorder (FIG. 44). At the same time, speech data recorded in a virtual cassette tape is read out from a data sheet of the holder 14 and is stored in a speech data area 121 of the memory 10.

Figure 45:
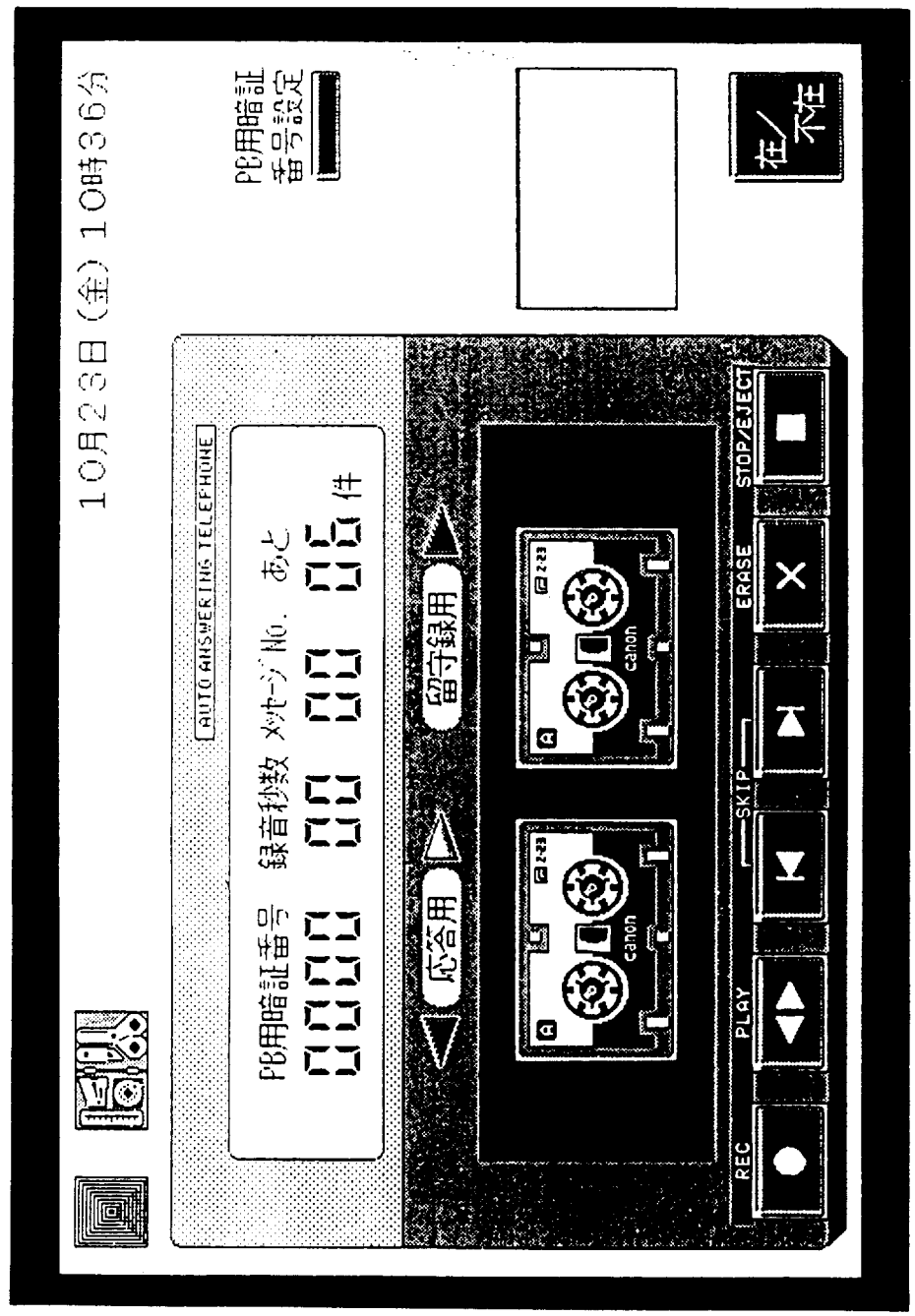

FIG. 45 shows a state in which a cassette tape is set in the cassette recorder.

In step S4006, when a recording key (REC) of the recorder is touched in step S4006, the recording mode is set. The flow advances to step S4007 to start recording. This recording operation is performed such that speech data input from the microphone 17 or the like is compressed by the speech data compressor 16 into digital data which is then stored in the memory 10. When the play key (PLAY) is touched in step S4008, the tape is reproduced in step S4009. In practice, the digital speed data compressed in the speech data area 10d in the memory 10 is expanded by the speech data expander 15 and is reproduced.

When a fast forward key (SKIP) is depressed in step S4010 and a rewind key (SKIP) is depressed in step S4012, fast forwarding and rewinding are performed in steps S4011 and S4013, respectively.

When an erase key (ERASE) is touched in step S4014, speech data is erased from the speech data area 11d of the memory 10 and the external memory 12. When a stop key (STOP) is touched in step S4016, recording, reproduction, fast forwarding, or rewinding is stopped in step S4017. When an eject key (EJECT) or the cassette tape in the recorder is touched in step S4018, the cassette tape is ejected from the tape recorder in step S4019, and the speech data is written from the memory 10 to the holder 14 of the external memory 12.

Figure 41:
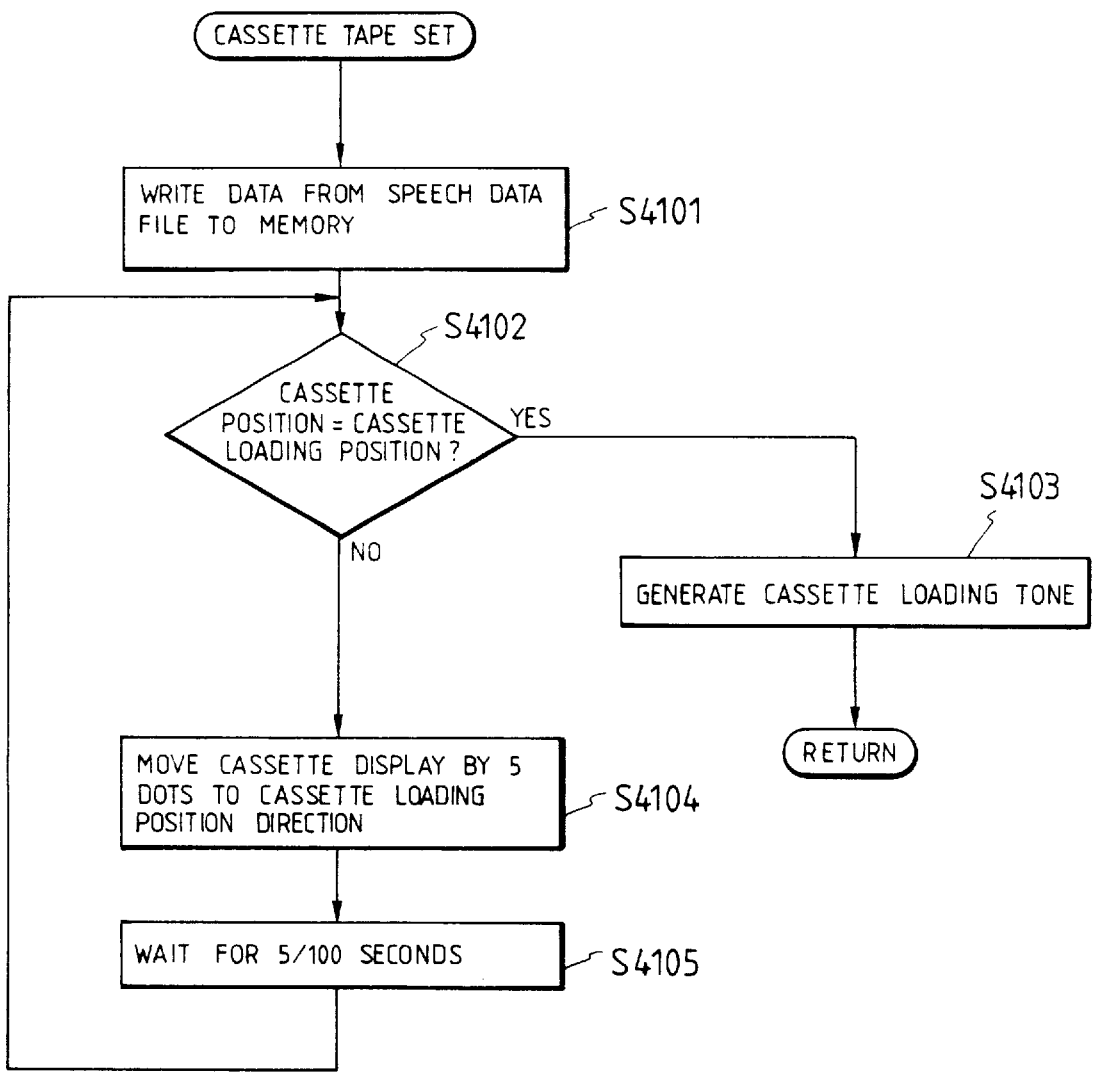
FIG. 41 is a flow chart of cassette tape loading processing.

FIG. 41 is a flow chart of cassette tape setting processing in step S4005 of FIG. 40A.

The speech data in the speech data file of the holder is stored in the speech data area 11d of the memory 10 in step S4101. In step S4104, the cassette outside the cassette recorder is moved on the screen of the CRT 2 from a state of FIG. 43 by 5 bits in a cassette loading direction. After a lapse of about 5/100 seconds in step S4105, the flow returns to step S4102 again to determine whether the cassette tape is moved to the loading position of the tape recorder. When the cassette tape is moved in the tape loading direction and is perfectly loaded, the flow advances to step S4103. A cassette tape loading tone is generated to end the processing.

The cassette tape is loaded in the same manner as in an actual cassette recorder.

Figure 42:
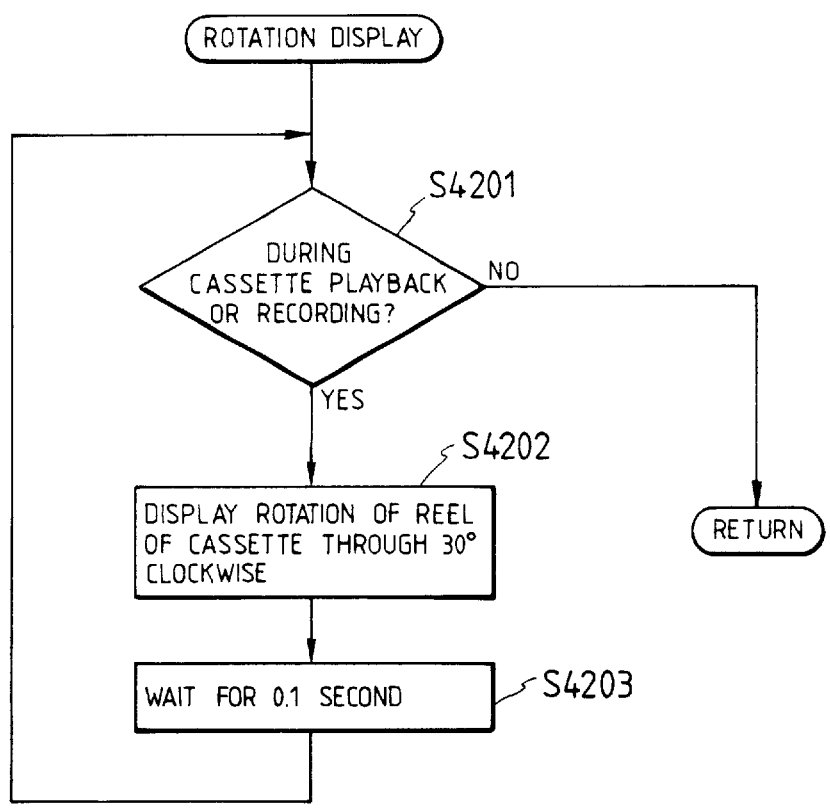
FIG. 42 is a flow chart of rotation display processing of a reel shaft of a cassette.

FIG. 42 is a flow chart showing processing of display of cassette tape rotation. When the cassette tape is reproduced or recorded in step S4201, the flow advances to step S4202. The reel shaft of the cassette tape is displayed while being rotated through about 30° clockwise. After a lapse of 0.1 second, the flow returns to step S4201. During recording or reproduction, the reel shaft of the cassette tape is displayed in a rotated state.

This function can be read and effected by, e.g., the automatic answering telephone function and the morning call function.

Figures 2, 46A:
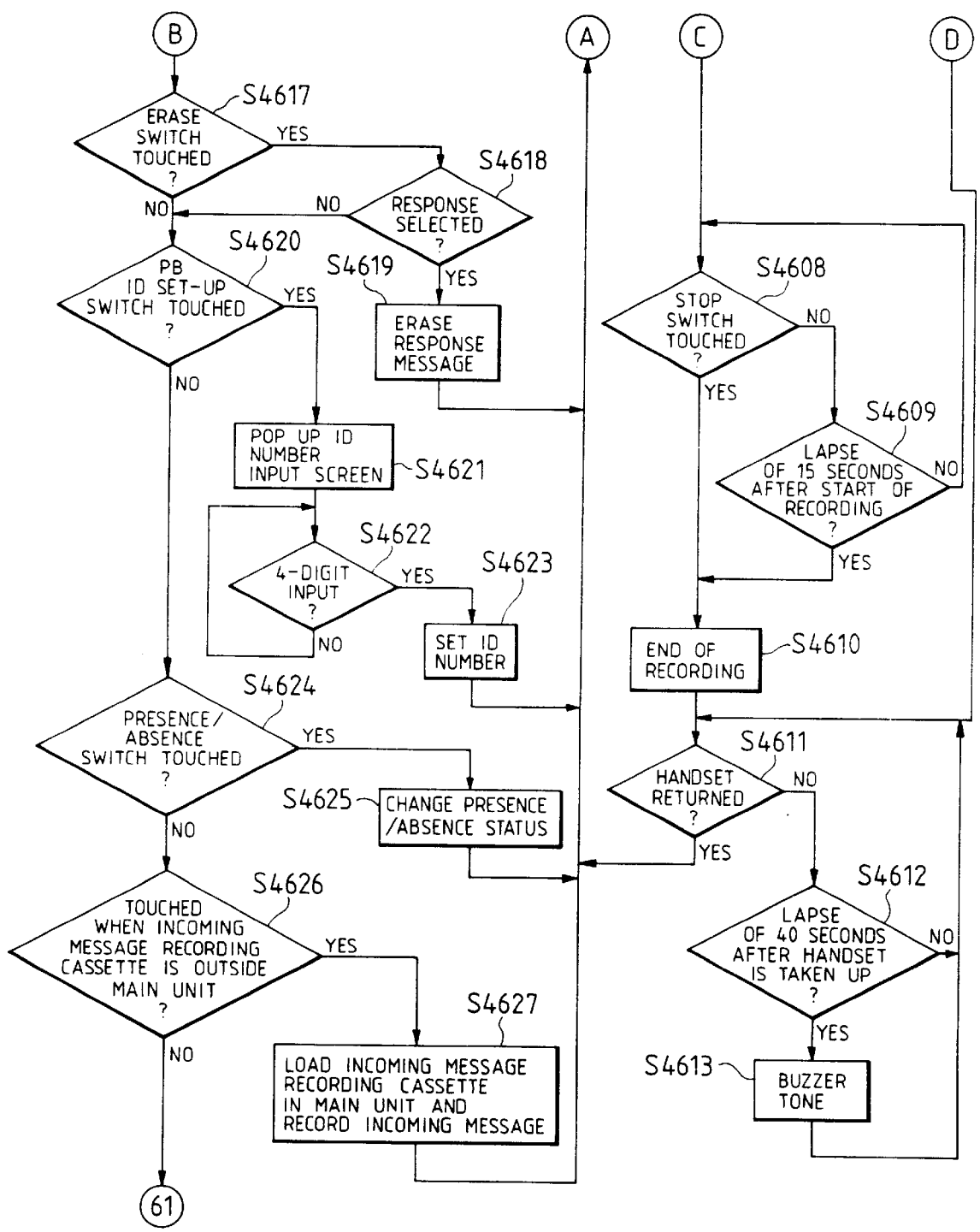
Figures 2, 46B:
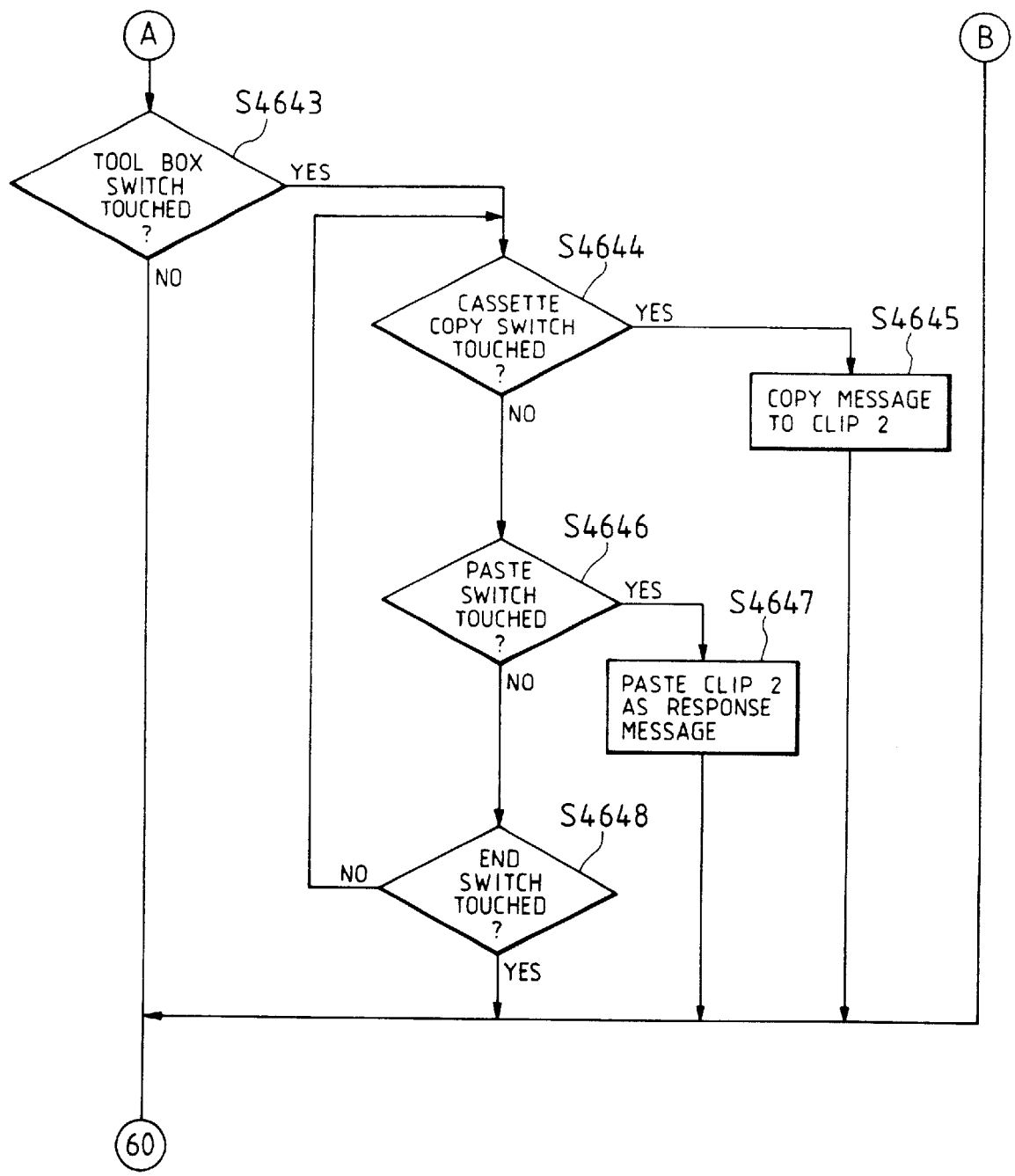

FIGS. 46A and 46B are flow charts showing an operation of the automatic answering telephone set-up function. An application of the tape recorder function will be described on the basis of the above function.

When the automatic answering telephone function is designated by the touch panel 3 from the main menu, an automatic answering telephone set-up function screen or an automatic answering telephone application program screen is displayed in step S4601, as shown in FIG. 43. Recording is started when the recording (REC) switch is touched in step S4603, the handset of the telephone set is picked up in step S4604, and the PLAY key is touched. Recording continues for a maximum of 15 seconds until the stop key (STOP) is touched (steps S4606 to 4613).

When the play key (PLAY) is touched in step S4614, the flow advances to step S4615 to determine whether a response cassette tape is set. If YES in step S4615, the response message is reproduced in step S4616. When an erase key (ERASE) is touched in step S4617, the response message is erased in steps S4618 and S4619 in the same manner as described above.

Steps S4620 to S4623 are executed to input a 4-bit ID number for a key telephone set. In steps S4624 and S4625, presence/absence switching is performed to effect the automatic answering telephone function.

When an incoming message cassette tape outside the apparatus, as shown in FIG. 43, is touched in step S4626, the incoming message tape is loaded in the tape recorder in step S4627, and an incoming message can be recorded. When the incoming message recording cassette tape loaded in the tape recorder, as shown in FIG. 45, is touched in step S4628, the tape is ejected from the tape recorder in step S4629, as shown in FIG. 44.

In steps S4630 to S4642, reproduction (play), rewinding (REWIND), fast forwarding (FORWARD), erasure (ERASE) and the like of the incoming message recording tape loaded in the tape recorder are performed.

In step S4643, when icons 70 and 71 of the tool box are touched in step S4643 to read out a tool box function, the flow advances to step S4644 to check if the cut function is selected. When cutting is performed, a message is cut in step S4645, and the cut message is stored in the memory 10. This cut message can be accessed and used by another function. When paste is designated in step S4646, for example, a response message such as music data which has been cut out by another function can be stored in the holder 14 and can be used as automatic answering telephone response music.

According to this embodiment as described above, a digital recording function of speech or the like is provided. Images of actual devices such as a cassette tape recorder and a cassette are displayed, and the displayed keys and the cassette tape are touched to designate inputs on the screen, thereby easily recording information.

Figure 47:
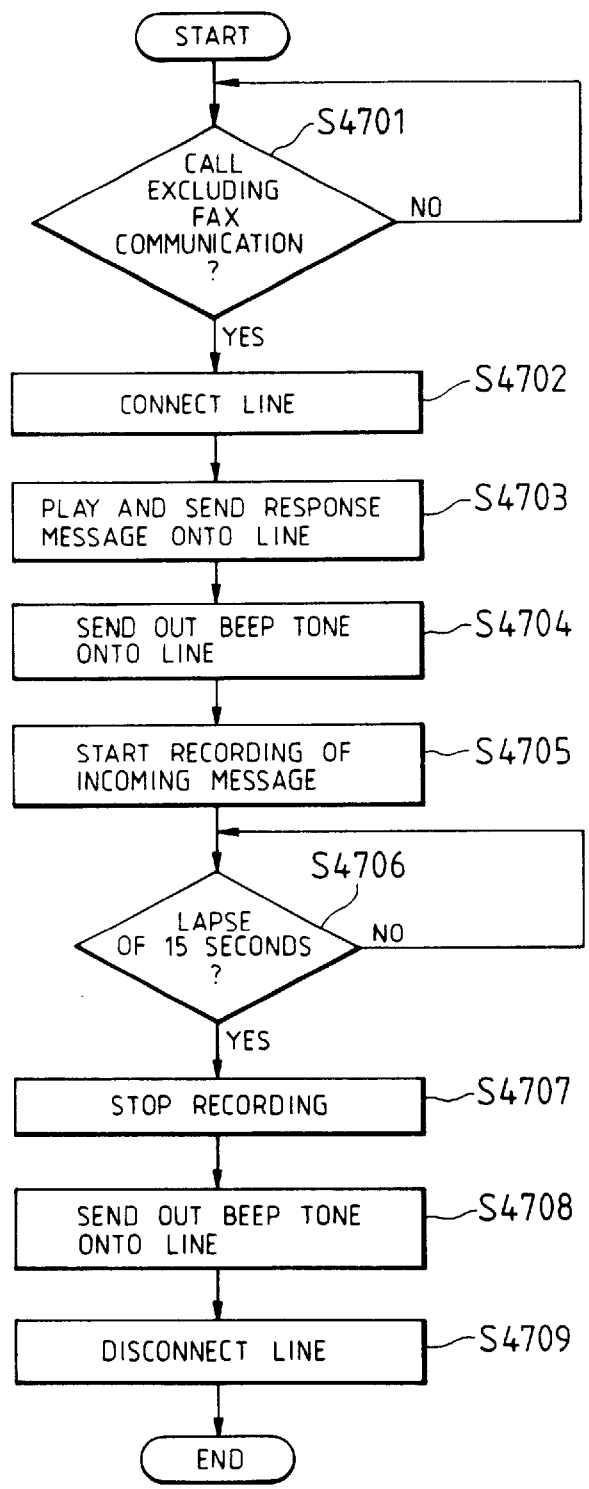
FIG. 47 is a schematic flow chart showing a recording function of a message board message in the automatic answering telephone function.

FIG. 47 is a schematic flow chart of a recording function of an incoming message in the automatic answering telephone.

When a call excluding facsimile communication is made, the telephone set is connected to the telephone line (steps S4701 and S4702), and the recorded response message is reproduced onto the telephone line (step S4703). A beep tone is generated and then an incoming message is recorded (steps S4704 and S4705). When a message is recorded within 15 seconds, recording is stopped and a beep tone is output again onto the telephone line. The telephone set is disconnected from the telephone line, and processing is ended (steps S4706 to S4709).

Figure 48A:
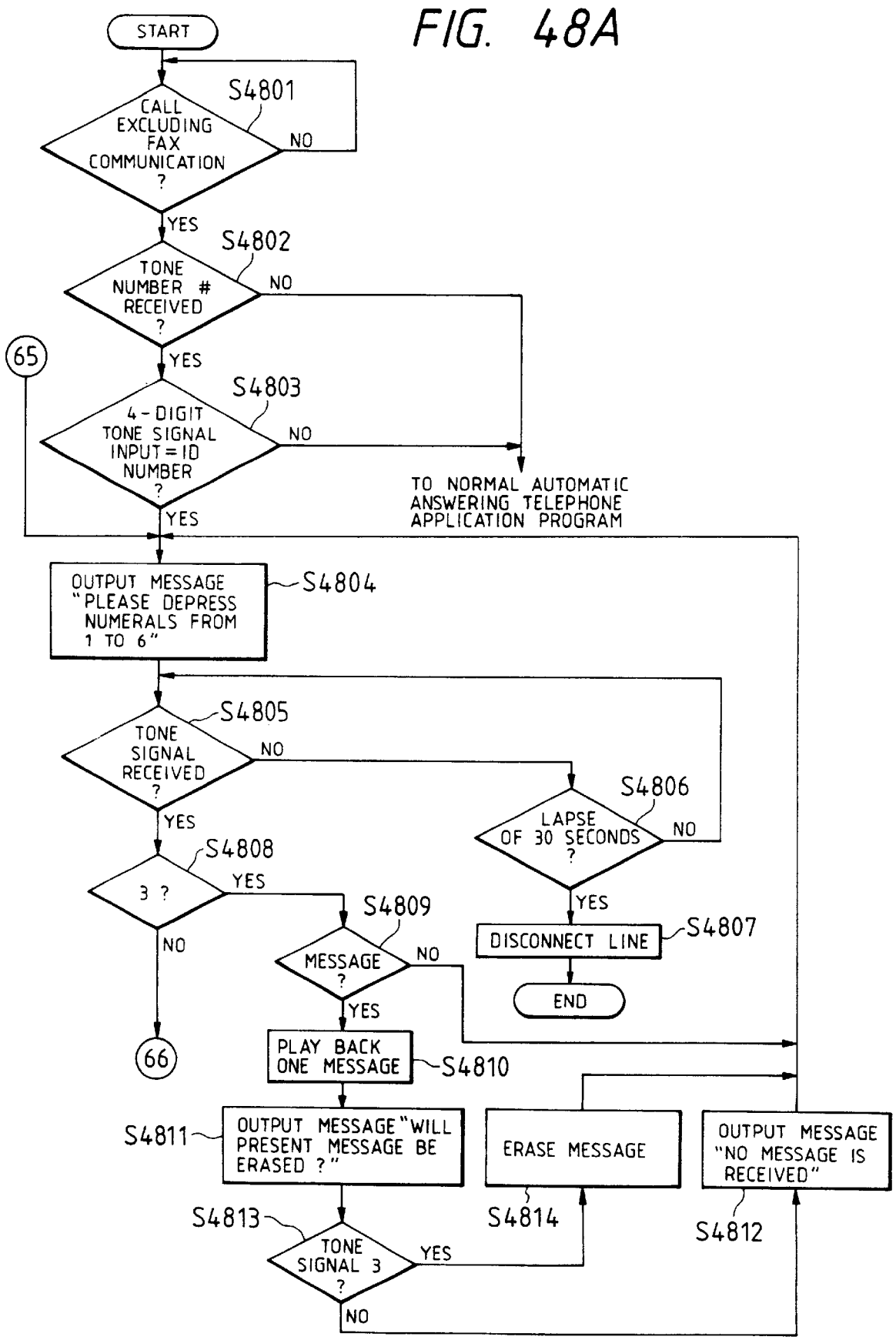
FIGS. 48A and 48B are schematic flow charts for explaining a PB receive operation in the automatic answering telephone.
Figure 48B:
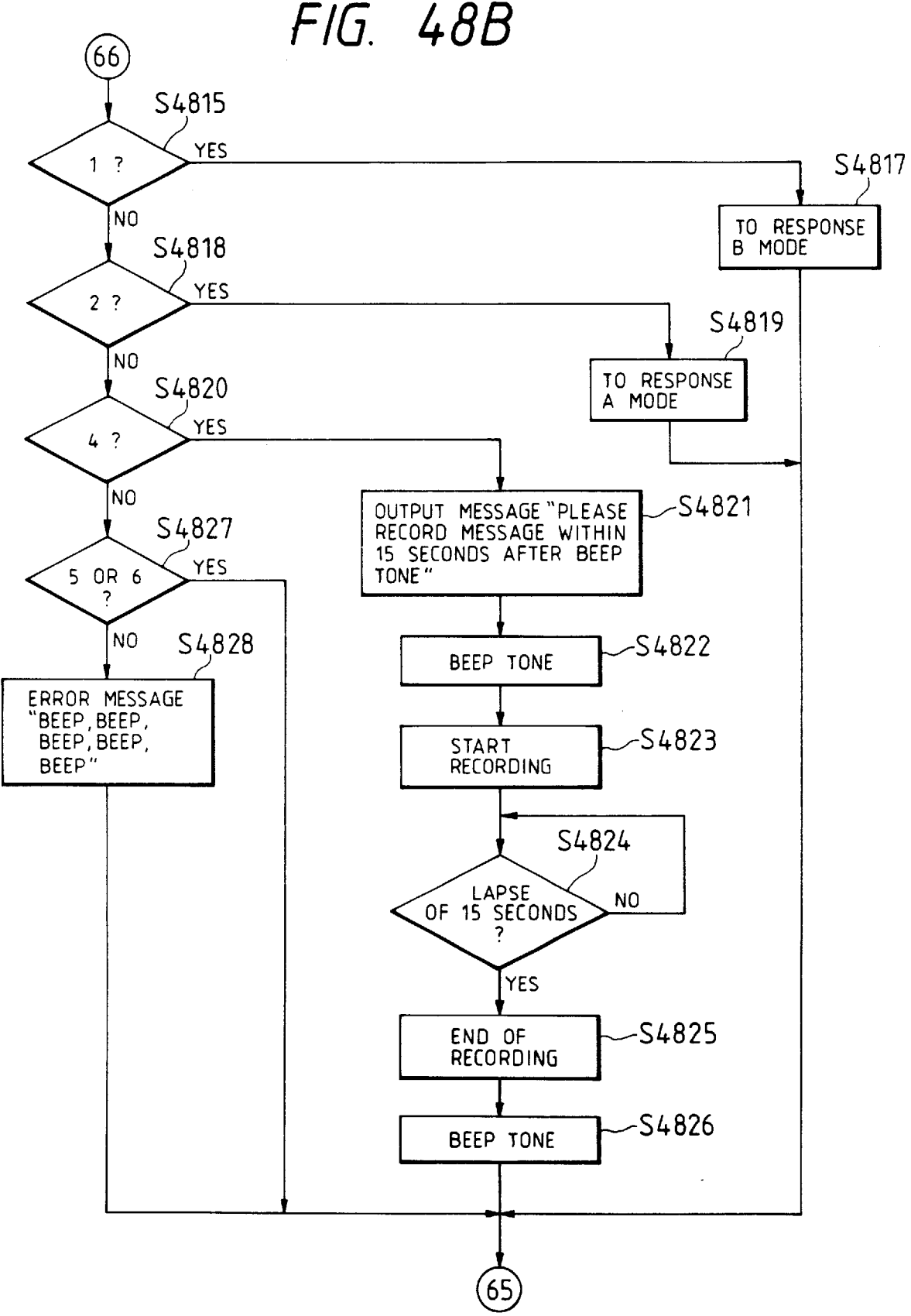

FIGS. 48A and 48B are schematic flow charts of push button (PD) "receive" operation in the automatic answering telephone. In this case, a call is made from an external key telephone set to generate a tone signal; thereby designating erasure of the message and a change in response mode in the apparatus.

(Description Associated with Respective Functions (FIG. 49))

Figure 49:
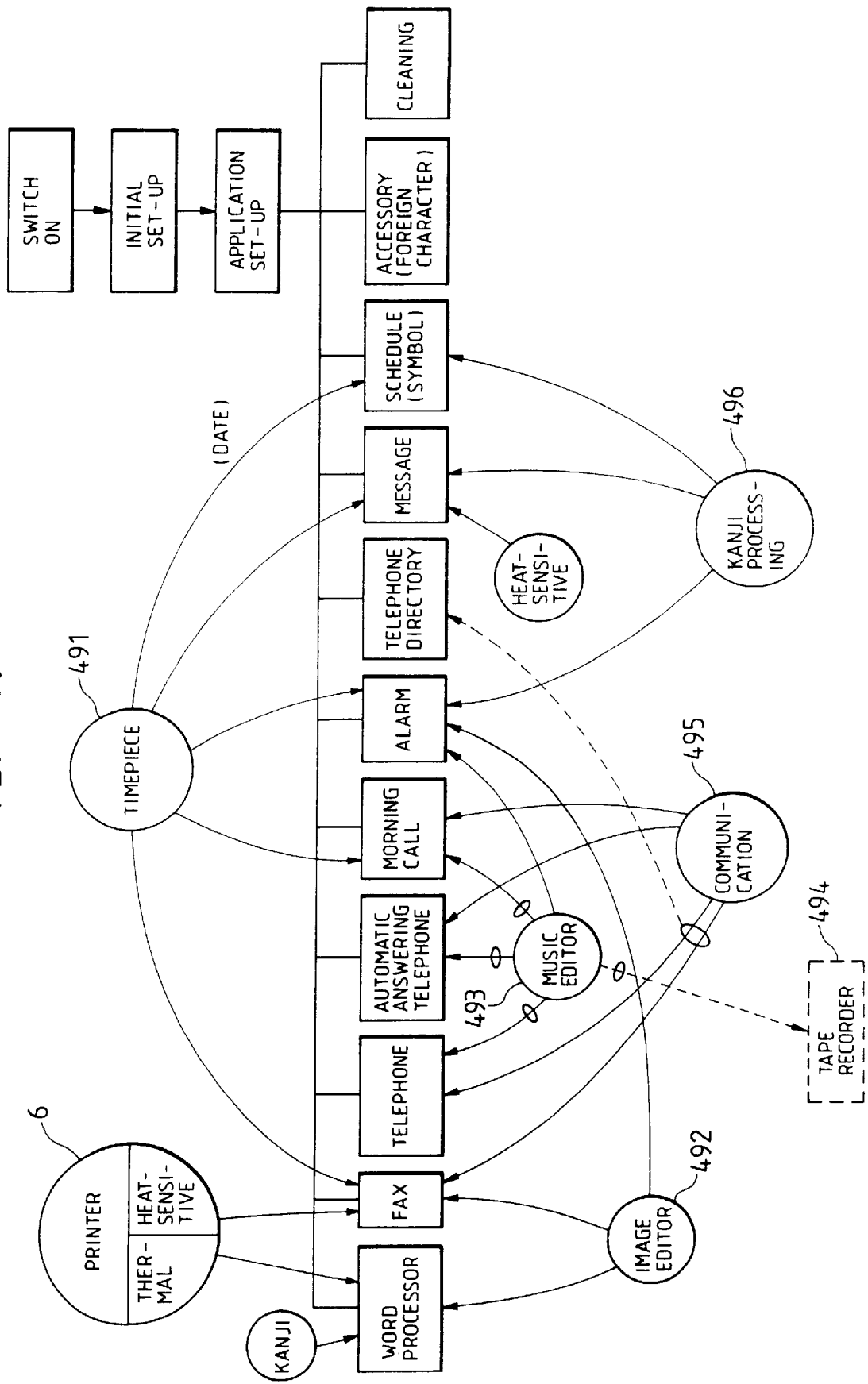
FIG. 49 is a chart showing correspondence of data in each mode.

FIG. 49 is a chart showing correspondences of functions in the respective modes, and more specifically, a correspondence between data formed by a given function and other functions.

Printing on the heat-sensitive roll paper at the line printer (of the printer 6) is performed by a facsimile mode, an electronic calculator, or a message function. Printing on normal paper at the thermal transfer printer is performed in the wordprocessor mode. A timepiece function 491 is used in a facsimile function, a morning call function, an alarm function, a message function, a schedule function, and the like. An image editor function 492 by the image reader 7 is used in a wordprocessor mode, a facsimile function, and an alarm function. Music information (including speech data generated by a tape recorder function 494) is stored as digital information in the memory and can be used as a holding tone of a telephone set, music of the automatic answering telephone, morning call music, a message tone, an alarm tone, and the like.

A communication function 495 is used as a facsimile function and a telephone function (including an automatic answering telephone and a morning call). A kanji processing function 496 is used as a wordprocessing function, an alarm function, a message function, and a schedule function.

The multifunctional information processing apparatus as described above in detail has a plurality of independent functions which can be selectively effected. In addition, data generated by a given function can be used for other functions. Therefore, the data can be commonly used.

In the multifunctional information processing apparatus according to the present invention, when a function having a higher priority such as a telephone call is started during execution of a given function, the function having a higher priority can be automatically effected. In this case, an operating state of the previous program and various data can be preserved. Upon completion of the function having the higher priority, the previous program is restored from the interrupt timing thereof, thereby providing good operability.

What is claimed is:

1. A multifunctional information processing apparatus which includes at least two of a telephone, a facsimile machine and an electronic computer, each of which is operated according to an application function, and a printer for printing information from said facsimile machine and said computer, said information processing apparatus comprising:

display means for displaying a plurality of pieces of information representing respective application functions;

first selection means for selecting one of the plurality of pieces of information displayed by said display means;

second selection means for selecting a predetermined one of the application functions in response to a signal received from an external device via the communication line;

means for executing the predetermined one application function selected by said second selection means in response to the signal from the external device during a time in which data is being printed by printing means in accordance with one of the application functions corresponding to the one piece of information selected by said first selection means;

memory means; and means for storing, in said memory means, communication data received from the external device during execution of the predetermined one application function by said executing means.

2. An apparatus according to claim 1, further comprising means for editing each of the plurality of pieces of information displayed by said display means.

3. An apparatus according to claim 1, wherein each of the plurality of pieces of information comprises an icon.

4. An information processing method of operating a multifunctional information processing apparatus which includes at least two of a telephone, a facsimile machine and an electronic computer, each of which is operated according to an application function, and a printer for printing information from said facsimile machine and said computer and which communicates with a remote external device via a communication line, said method comprising:

a step of displaying a plurality of pieces of icon information representing respective application functions in a display device;

a first step of selecting one of the plurality of pieces of icon information displayed in said display step;

a second step for selecting a predetermined one of the application functions in response to a signal from the external device via the communication line;

a step of executing the predetermined one application function selected in said second selection step in response to the signal from the external device during a time in which data is being printed by printing means in accordance with one of the application functions corresponding to the one piece of icon information selected by said first selection means; and a step of storing communication data received from the external device during execution of the predetermined one application function in said executing step.

5. A method according to claim 4, further comprising the step of editing each of the plurality of pieces of icon information displayed by the display device in said display step.

6. A storage medium for storing a program used in a multifunctional information processing apparatus which includes at least two of a telephone, a facsimile machine and an electronic computer, each of which is operated according to an application function, and a printer for printing information from said facsimile machine and said computer and which communicates with a remote external device via a communication line, and which also displays a plurality of pieces of icon information representing respective application functions in a display device, and selects one of the plurality of pieces of icon information displayed by the display device, with the programs comprising:

a step of displaying a plurality of pieces of icon information representing respective application functions in a display device;

a first step of selecting one of the plurality of pieces of icon information displayed in said display step;

a second step for selecting a predetermined one of the application functions in response to a signal from the external device via the communication line;

a step of executing the predetermined one application function selected in said second selection step in response to the signal from the external device during a time in which data is being printed by printing means in accordance with one of the application functions corresponding to the one piece of icon information selected by said first selection means; and a step of storing communication data received from the external device during execution of the predetermined one application function in said executing step.

7. A storage medium according to claim 6, wherein the program further comprises the step of editing each of the plurality of pieces of icon information displayed by the display device.

* * * * *

UNITED STATES PATENT AND TRADEMARK OFFICE
CERTIFICATE OF CORRECTION

PATENT NO. : 5,805,297
DATED : September 8, 1998
INVENTOR(S) : YOJI FURUYA ET AL.

It is certified that error appears in the above-identified patent and that said Letters Patent is hereby corrected as shown below:

On the title page, item

[56], OTHER PUBLICATIONS

"In "Birrell et al," "Com. of AMC," should read -- Com. of the ACM,--.

IN THE DRAWINGS

Figure 19A, "SENTENSE" should read --SENTENCE--.
and "THERE OF" should read --THEREOF--.

Figure 28B, "CORSOR" should read --CURSOR--.

Figure 29B-1, "POPED IMAGE" should read --POPPED IMAGE--.

COLUMN 15

Line 18, "signal;" should read --signal,--.

Signed and Sealed this

Twenty-fifth Day of May, 1999

Attest:

Q. TODD DICKINSON

Attesting Officer    Acting Commissioner of Patents and Trademarks